(12) United States Patent
Yamagishi et al.

(10) Patent No.: US 8,527,606 B2
(45) Date of Patent: Sep. 3, 2013

(54) NETWORK SYSTEM, NETWORK HOUSEHOLD APPLIANCE, CONTENT/METADATA SYNCHRONOUS PROCESSING METHOD, AND COMPUTER PROGRAM

(75) Inventors: Yasuaki Yamagishi, Kanagawa (JP); Yasuhiro Yukawa, Tokyo (JP)

(73) Assignee: Sony Corporation, Tokyo (JP)

( * ) Notice: Subject to any disclaimer, the term of this patent is extended or adjusted under 35 U.S.C. 154(b) by 306 days.

(21) Appl. No.: 12/596,371

(22) PCT Filed: Oct. 17, 2008

(86) PCT No.: PCT/JP2008/068877
§ 371 (c)(1),
(2), (4) Date: Mar. 1, 2010

(87) PCT Pub. No.: WO2009/051233
PCT Pub. Date: Apr. 23, 2009

(65) Prior Publication Data
US 2010/0174680 A1    Jul. 8, 2010

(30) Foreign Application Priority Data

Oct. 17, 2007 (JP) ................................. 2007-270609
May 7, 2008 (JP) ................................. 2008-121713

(51) Int. Cl.
*G06F 15/16* (2006.01)
(52) U.S. Cl.
USPC ................. 709/217; 707/999.01; 348/E5.002
(58) Field of Classification Search
USPC ....................................................... 709/217
See application file for complete search history.

(56) References Cited

U.S. PATENT DOCUMENTS

| | | | |
|---|---|---|---|
| 2002/0073109 A1 * | 6/2002 | Toriumi | ........................ 707/204 |
| 2007/0250844 A1 | 10/2007 | Collacott | |
| 2009/0319535 A1 * | 12/2009 | Webber et al. | .................. 707/10 |

FOREIGN PATENT DOCUMENTS

| | | |
|---|---|---|
| GB | 2 407 242 A | 4/2005 |
| JP | 2002-182961 | 6/2002 |
| JP | 2006-053633 | 2/2006 |
| JP | 2006-53633 | 2/2006 |
| WO | WO 03/079589 A2 | 9/2003 |
| WO | WO 2006/012378 A1 | 2/2006 |
| WO | WO 2006/073282 A1 | 7/2006 |
| WO | WO 2006/109359 A1 | 10/2006 |

OTHER PUBLICATIONS

Extended European Search Report dated Feb. 24, 2012 for European Applicaion No. 08839296.4, 7 pages.
Feb. 5, 2013, Japanese Office Action for related application No. JP 2008-121713.
Oct. 24 2012 Communication Pursuant to Article 94(3) EPC for related EP Patent Application No. 08 839 296.4.

* cited by examiner

*Primary Examiner* — Hua Fan
(74) *Attorney, Agent, or Firm* — Sherr & Jiang, PLLC

(57) ABSTRACT

[Object] To provide a network system capable of efficiently carrying out synchronous processing by positively notifying a home network appliance of an update content of a content or metadata.

[Solving Means] A subscriber in a home network appliance acquires via a network an update notification message that stores update information of a content or metadata and in which a filter attribute for categorizing the update notification message is set. The appliance includes a service client that updates, by an application corresponding to a specific service, the content or the metadata in a local content/metadata database using the update information within the update notification message. The subscriber manages a correspondence between the service client and the filter attribute and specifies the service client that provides the update information within the update notification message based on the filter attribute set in the update notification message and the correspondence.

8 Claims, 44 Drawing Sheets

XML schema for defining format of update notification message

```
<schema xmlns="http://www.w3.org/2001/XMLSchema" xmlns:update="urn:update"
targetNamespace="urn:update"
        elementFormDefault="qualified" attributeFormDefault="unqualified">
 <element name="event" type="update:EventType"/>
 <complexType name="EventType">
  <sequence>
   <element name="eventCategory" type="anyURI" minOccurs="0"
maxOccurs="unbounded"/>
   <element name="transaction" type="update:TransactionType"
maxOccurs="unbounded"/>
  </sequence>
  <attribute name="publisher" type="Sring" use="required"/>
 </complexType>
 <complexType name="TransactionType">
  <sequence>
   <element name="updateInfo" type="update:UpdateInfoType" maxOccurs="unbounded"/>
  </sequence>
  <attribute name="transactionID" type="integer" use="required"/>
  <attribute name="updateType" use="required">
   <simpleType>
    <reSriction base="Sring">
     <enumeration value="full"/>
     <enumeration value="delta"/>
    </reSriction>
   </simpleType>
  </attribute>
 </complexType>
 <complexType name="UpdateInfoType">
  <sequence>
   <element name="updateUnit" type="update:UpdateUnitType"/>
  </sequence>
  <attribute name="dateOfEvent" type="dateTime" use="optional"/>
  <attribute name="validFrom" type="dateTime" use="optional"/>
  <attribute name="validTo" type="dateTime" use="optional"/>
 </complexType>
 <complexType name="UpdateUnitType">
  <choice>
   <element name="updateDetail" type="Sring"/>
   <element name="updateReference" type="anyURI"/>
  </choice>
 </complexType>
</schema>
```

FIG.2

Full-update notification message of transactionId=01 (initial state)

```
<event xmlns="urn:update"   <transaction transactionID="01"
updateType="full">
  <updateInfo dateOfEvent="2001-01-01T01:01:01+09:00">
    <updateUnit>
      <updateDetail> Addition of route element A (initial state)[add<A>] </updateDetail>
    </updateUnit>
  </updateInfo>
 </transaction>
</event>
```

Data on which full update of transactionId=01 is reflected

Differential-update notification message of transactionId=02

```
<event xmlns="urn:update" ... publisher="ServiceProvider-A">
 <transaction transactionID="02" updateType="delta">
  <updateInfo dateOfEvent="2001-01-01T01:01:03+09:00">
   <updateUnit>
    <updateDetail> Addition of element B[add<B>to<A>] </updateDetail>
   </updateUnit>
  </updateInfo>
 </transaction>
</event>
```

Data on which differential update of transactionId=02 is reflected

Differential-update notification message of transactionId=03

```
<event xmlns="urn:update" ... publisher="ServiceProvider-A">
 <transaction transactionID="03" updateType="delta">
  <updateInfo date0fEvent="2001-01-01T01:01:06+09:00"/>
  <updateUnit>
   <updateDetail> Deletion of element B and addition of element C[[remove<B>from<A>]and[add<C>to<A>]] </updateDetail>
  </updateUnit>
 </updateInfo>
 </transaction>
</event>
```

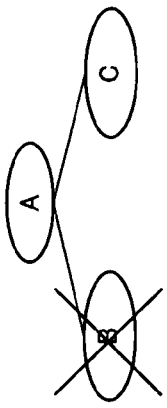

```
<A>
 <C/>
</A>
```

Data on which differential-update of transactionId=03 is reflected

FIG.10

Full-update notification message of transactionId=04

```
<event xmlns="urn:update" … publisher="ServiceProvider-A">
<transaction transactionID="04" updateType="full">
<updateInfo dateOfEvent="2001-01-01T01:01:10+09:00">
<updateUnit>
<updateDetail> Addition of elements A, C, and D[[add<A>]and[add<C>to<A>]and[add<D>to<C>]]</updateDetail>
</updateUnit>
</updateInfo>
</transaction>
</event>
```

Data on which full update of transactionId=04 is reflected

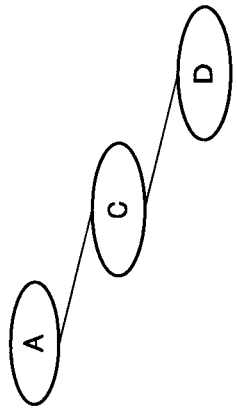

```
<tva:TVAMain ... >
  <tva:ProgramDescription>
    <tva:ServiceInformationTable>

<tva:ServiceInformation serviceId="Channel-B" fragmentId="1234" fragmentVersion="1011">
        <tva:Name>MusicTV Channel</tva:Name>   Name of channel is 「MusicTV Channel」
        <tva:ServicePackRef>ServicePack-D</tva:ServicePackRef>
      </tva:ServiceInformation>

<tva:ServiceInformation serviceId="Channel-C" fragmentId="5678" fragmentVersion="1011">
        <tva:Name>MTV Special Channel</tva:Name>   Name of channel is 「MTV Special Channel」
        <tva:ServicePackRef>ServicePack-D</tva:ServicePackRef>
      </tva:ServiceInformation>

<tva:ServiceInformation serviceId="ServicePack-D" fragmentId="1375" fragmentVersion="1011">
        <tva:Name>ServicePack-D</tva:Name>
        <tva:PurchaseItem>
          <tva:Price currency="JPY">600.00</tva:Price>   Price is 600 yen
          <tva:Purchase>
            <tva:PurchaseType href="PlayForPeriod"/>   Indicates monthly payment
            <tva:QuantityUnit href="month"/>
            <tva:QuantityRange max="1"/>
          </tva:Purchase>
        </tva:PurchaseItem>
      </tva:ServiceInformation>

</tva:ServiceInformationTable>
  </tva:ProgramDescription>
</tva:TVAMain>
```

FIG.32

NETWORK SYSTEM, NETWORK HOUSEHOLD APPLIANCE, CONTENT/METADATA SYNCHRONOUS PROCESSING METHOD, AND COMPUTER PROGRAM

CROSS REFERENCE TO RELATED APPLICATIONS

This application is a national phase application based on PCT/JP2008/068877, filed Oct. 17, 2008, which claims the priority of Japanese Patent Application Nos. 2007-270609, filed Oct. 17, 2007 and 2008-121713, filed May 7, 2008, the contents of all of which are incorporated herein by reference.

TECHNICAL FIELD

The present invention relates to a network system, a network household appliance, a content/metadata synchronous processing method, and a computer program.

BACKGROUND ART

In a home network appliance (single or plural) that receives a plurality of services including a broadcast service, an IPTV (Internet Protocol Television) service, a package distribution service of a DVD (DVD: Digital Versatile Disc), a BD (Blu-ray Disc), an HDDVD (High Definition DVD), and the like, contents or metadata of the contents that are distributed across those plurality of media and networks are distributed using protocols that depend on the media. Moreover, when the contents or metadata thereof distributed by the protocols that depend on the media and services are updated, if the protocols each support an update function, update processing is carried out by a method that depends on that protocol. Therefore, in a case where the contents or the metadata are updated on a provider side, if an application capable of detecting those update events is activated on a client side, the update detection and the update processing can be carried out.

Patent Document 1 discloses a technique in which a user terminal periodically polls, with respect to a content distribution server providing contents or metadata of the contents, whether the metadata is updated, and when the metadata is updated, requests the updated metadata of the content distribution server and acquires it.

Patent Document 1: Japanese Patent Application Laid-open No. 2006-053633 (paragraph 0083)

DISCLOSURE OF THE INVENTION

Problems to be Solved by the Invention

Along with a development of a broadcast-communication fusion environment, occasions of such contents or metadata distributed via a plurality of media and networks being accumulated in a home network device keep increasing. In a case where contents or metadata having the same content are accumulated in a home network device via a plurality of different media and networks/services, there is a possibility that, when any one of those is updated, the contents or metadata that have the same content but have been distributed and accumulated via other different media and networks/services are updated similarly.

If there is provided a mechanism capable of solving a mutual correspondence (correspondence based on which the same content or similar contents can be judged as such) among identifiers of the contents or metadata managed in domains respectively provided for the different media and networks/services, by updating one of the contents or metadata, it is possible to detect (analogize) an update event of the other content or metadata that is in correspondence therewith, and, when detected, carry out processing that uses an update protocol (distribution protocol). However, generally, identifier management systems that can solve the correspondences of the contents or metadata that are managed in the domains are not ensured among different media and networks/services, and automation of such a synchronous management cannot be expected.

As an example where an unconformity in the synchronous management becomes a problem, it is assumed that there is metadata-1 with respect to an encrypted content-α provided from a service provider-A shown in FIG. 28, and price information is contained therein, and similarly, there is metadata-2 with respect to an encrypted content-β provided from a service provider-B, and price information is also contained therein. The content-α and the content-β are contents having the same title X. An offer price from the service provider-A is assumed to be higher than that of the service provider-B. In other words, it is assumed that there exists a relationship of "value of price information of metadata-1>value of price information of metadata-2".

Normally, for raising performance of retrieval processing within a home network, a database for managing contents downloaded and accumulated in the home network stores contents of metadata thereof. Here, it is assumed that, at a certain time (e.g., time when first-run period ends), for a change in price strategies, both the service provider-A and the service provider-B lower the prices of the title X. The service provider-A and the service provider-B update contents of prices of the respectively-managed metadata-1 and metadata-2. Regarding new prices, it is assumed that the offer price from the service provider-A is lower than the offer price from the service provider-B. In other words, it is assumed that the relationship has changed to "value of price information of metadata-1<value of price information of metadata-2".

It is assumed that, by chance, a distribution application of the service provider-B is operated in a certain home network device, and the update of the price information of the metadata-2 is thus detected. Meanwhile, a distribution application of the service provider-A is not activated, so only the content corresponding to the metadata-2 among the contents of the database is updated. In this state, when a content purchase navigation application is activated in the certain home network device and processing of referencing the database to compare the offer prices from the providers in an acquisition of a viewing license of the title X is executed, because the price of the metadata-1 is not updated, the relationship becomes "value of price information of metadata-1>value of price information of metadata-2", with the result that a user purchases a license to view the content from the service provider-B, the service provider-A loses its business opportunity, and the user loses an opportunity to purchase a cheaper one.

In view of the problems as described above, the present invention aims to provide a network system, a network household appliance, a content/metadata synchronous processing method, and a computer program that are capable of efficiently carrying out synchronous processing by positively notifying a network household appliance within a home network of an update content of a content or metadata.

Means for Solving the Problems

To solve the problems above, according to the present invention, there is provided a network system including: an update notification message generation means for generating, for each service, an update notification message that stores update information of a content or metadata of the content, or a reference to the update information; a filter attribute setting means for setting, in the update notification message for each service delivered from the update notification message generation means, a filter attribute for categorizing the message; an update notification message accumulation section to accumulate the update notification message in which the filter attribute has been set by the filter attribute setting means; a local content/metadata storage section that is provided in a home network appliance and stores the content of a specific service or the metadata thereof; an update means realized by an application corresponding to the specific service, for updating the content or the metadata in the local content/metadata storage section using the update information; and an update information provision means for managing in advance a correspondence between the application and the filter attribute, specifying, based on the filter attribute set in the update notification message acquired from the update notification message accumulation section via a network and the correspondence, an application that provides the update information within the update notification message, and providing the update information by activating the application.

According to the network system of the present invention, even when the application corresponding to the service is not activated, it is possible to specify the application that provides the update information within the update notification message based on the filter attribute set in the acquired update notification message and the preset correspondence between the application and the filter attribute, and update, by activating the application, the content or the metadata in the local content/metadata storage section using the update information. Accordingly, synchronous processing can favorably be carried out by positively notifying the network household appliance within the home network of the update content of the content or the metadata.

In the network system according to the present invention, the filter attribute is information for specifying the service. Accordingly, the application corresponding to the service can be specified efficiently.

Further, in the network system according to the present invention, the filter attribute may be information for specifying a category of the content. Accordingly, the corresponding application can be specified efficiently and activated for each category of the contents.

Further, in the network system according to the present invention, the update notification message generation means may generate, as the update information, full-update information as a full-update content of the content or the metadata and differential-update information as an update content of only a differential update while periodically switching them, and set, in the update notification message, attribute information that indicates an update method of the update information of each update notification message, and the update information provision means may acquire, from the update notification message accumulation section via the network, based on the attribute information set in the update notification message accumulated in the update notification message accumulation section, the update notification message necessary for synchronizing the content or the metadata in the local content/metadata storage section with the content or the metadata on a side of a provider of the service. By thus using both the full update and the differential update, it becomes possible to efficiently carry out the update processing and, even if by any chance an omission of the update information occurs, efficiently carry out recovery processing.

Furthermore, in the network system according to the present invention, the update notification message may store, as the update information, the update information of the content or the metadata, the network system may further include a second update notification message accumulation section to accumulate the update notification message acquired from the update notification message accumulation section by the update information provision means via the network, and the update information provision means may acquire, from the second update notification message accumulation section, the update notification message necessary for synchronizing the content or the metadata in the local content/metadata storage section with the content or the metadata on a side of a provider of the service. With such a structure, it becomes unnecessary to acquire via the network the update notification message for recovering synchronization between the content or the metadata in the local content/metadata storage section and the content or the metadata on the service provider side, with the result that the synchronous processing can be carried out efficiently.

According to another aspect of the present invention, there is provided a network household appliance capable of acquiring, from an update notification message accumulation section to accumulate an update notification message that stores update information of a content or metadata of the content, or a reference to the update information, and in which a filter attribute for categorizing the message is set, the update notification message via a network, the network household appliance including: a local content/metadata storage section to store the content of a specific service or the metadata of the content thereof; an update means realized by an application corresponding to the specific service, for updating the content or the metadata in the local content/metadata storage section using the update information; and an update information provision means for managing in advance a correspondence between the application and the filter attribute, specifying, based on the filter attribute set in the update notification message acquired from the update notification message accumulation section via the network and the correspondence, an application that provides the update information within the update notification message, and providing the update information by activating the application.

According to the network household appliance of the present invention, even when the application corresponding to the service is not activated, it is possible to specify the application that provides the update information within the update notification message based on the filter attribute set in the acquired update notification message and the preset correspondence between the application and the filter attribute, and update, by activating the application, the content or the metadata in the local content/metadata storage section using the update information. Accordingly, synchronous processing can favorably be carried out by positively notifying the network household appliance within the home network of the update content of the content or the metadata.

In the network household appliance according to the present invention, the filter attribute is information for specifying the service. Accordingly, the application corresponding to the service can be specified efficiently.

Further, in the network household appliance according to the present invention, the filter attribute may be information for specifying a category of the content. Accordingly, the corresponding application can be specified efficiently and activated for each category of the contents.

Further, in the network household appliance according to the present invention, the update notification message may store, as the update information, full-update information as a full-update content of the content or the metadata and differential-update information as an update content of only a differential update while periodically switching them, the update notification message may be set with attribute information that indicates an update method of the update information of each update notification message, and the update information provision means may acquire, from the update notification message accumulation section via the network, based on the attribute information set in the update notification message accumulated in the update notification message accumulation section, the update notification message necessary for synchronizing the content or the metadata in the local content/metadata storage section with the content or the metadata on a side of a provider of the service. By thus using both the full update and the differential update, it becomes possible to efficiently carry out the update processing and, even if by any chance an omission of the update information occurs, efficiently carry out recovery processing.

Furthermore, in the network household appliance according to the present invention, the update notification message may store, as the update information, the update information of the content or the metadata, the network household appliance may further include a second update notification message accumulation section to accumulate the update notification message acquired from the update notification message accumulation section by the update information provision means via the network, and the update information provision means may acquire, from the second update notification message accumulation section, the update notification message necessary for synchronizing the content or the metadata in the local content/metadata storage section with the content or the metadata on a side of a provider of the service. With such a structure, it becomes unnecessary to acquire via the network the update notification message for recovering synchronization between the content or the metadata in the local content/metadata storage section and the content or the metadata on the service provider side, with the result that the synchronous processing can be carried out efficiently.

According to another aspect of the present invention, there is provided a content/metadata synchronous processing method including the steps of: generating, by an update notification message generation means, for each service, an update notification message that stores update information of a content or metadata of the content, or a reference to the update information; setting, by a filter attribute setting means, in the update notification message for each service delivered from the update notification message generation means, a filter attribute for categorizing the message; accumulating, in an update notification message accumulation section, the update notification message in which the filter attribute has been set; updating, using the update information, the content or the metadata in a local content/metadata storage section that is provided in a home network appliance and stores the content or the metadata of a specific service, by an update means realized by an application corresponding to the specific service; and managing in advance, by an update information provision means, a correspondence between the application and the filter attribute, specifying, based on the filter attribute set in the update notification message acquired from the update notification message accumulation section via a network and the correspondence, an application that provides the update information within the update notification message, and providing the update information by activating the application.

According to the content/metadata synchronous processing method of the present invention, even when the application corresponding to the service is not activated, it is possible to specify the application that provides the update information within the update notification message based on the filter attribute set in the acquired update notification message and the preset correspondence between the application and the filter attribute, and update, by activating the application, the content or the metadata in the local content/metadata storage section using the update information. Accordingly, synchronous processing can favorably be carried out by positively notifying the network household appliance within the home network of the update content of the content or the metadata.

According to another aspect of the present invention, there is provided a computer program causing a computer to operate as a network household appliance capable of acquiring, from an update notification message accumulation section to accumulate an update notification message that stores update information of a content or metadata of the content, or a reference to the update information, and in which a filter attribute for categorizing the message is set, the update notification message via a network, the computer program causing the computer to function as: a local content/metadata storage section to store the content of a specific service or the metadata of the content thereof; an update means realized by an application corresponding to the specific service, for updating the content or the metadata in the local content/metadata storage section using the update information; and an update information provision means for managing in advance a correspondence between the application and the filter attribute, specifying, based on the filter attribute set in the update notification message acquired from the update notification message accumulation section via the network and the correspondence, an application that provides the update information within the update notification message, and providing the update information by activating the application.

According to the computer program of the present invention, even when the application corresponding to the service is not activated, it is possible to specify the application that provides the update information within the update notification message based on the filter attribute set in the acquired update notification message and the preset correspondence between the application and the filter attribute, and update, by activating the application, the content or the metadata in the local content/metadata storage section using the update information. Accordingly, synchronous processing can favorably be carried out by positively notifying the network household appliance within the home network of the update content of the content or the metadata.

Effect of the Invention

According to the present invention, it is possible to efficiently carry out the synchronous processing by positively notifying the network household appliance within the home network of the update content of the content or the metadata.

BEST MODES FOR CARRYING OUT THE INVENTION

Hereinafter, embodiments of the present invention will be described in detail with reference to the drawings.

[Update Notification Distribution Model]

FIG. 1 is a diagram showing a model of an update notification distribution system for contents or metadata of the contents according to an embodiment of the present invention.

As shown in the figure, in the update notification distribution system of this embodiment, a publisher 10 generates an update notification message 1 that stores update information of a content or metadata of the content and publicly releases it to a queue/channel 20, and a subscriber 30 consumes the update notification message 1. The publisher 10 is an entity operated on a service provider side, and the subscriber 30 is an entity executed on a home network side. The subscriber 30 acquires the update notification message 1 publicly released to the queue/channel 20 and notifies a service client within the home network, with the result that the service client carries out, by updating a content or metadata of the content stored in a local database using the update information stored in the update notification message 1, synchronous processing with respect to the content or the metadata of the content that the service provider side possesses. Each of the update notification messages 1 publicly released to the queue/channel 20 is deleted upon the service client being notified by the subscriber 30.

[Structure of Update Notification Message]

The update notification message 1 has a format defined by an XML schema. FIG. 2 is an example of the XML schema. FIG. 44 is a diagram showing a data structure of the update notification message 1. Hereinafter, definitions of elements and attributes in the XML schema will be shown.

event: body of update notification message
eventCategory: category information of update notification message (filter attribute in acquiring this update notification message)
publisher: name of issuer of update notification message
transaction: atomic update processing unit (all of plural update fragments contained therein become atomic)
transactionID: sequence number with respect to update processing unit, that is unique within publisher
updateType: flag indicating full update (full) or differential update (delta)
updateInfo: update fragment
dateOfEvent: update time of update fragment (time and date of update, defined value is time and date of issue of this message)
validFrom: time and date at/on which update fragment is validated (time and date at/on which update is scheduled, defined value is current time and date)
validTo: time and date at/on which update fragment is invalidated (time and date at/on which next update is scheduled, defined value is unlimited)
updateUnit: fragment unit (unit of update content)
updateDetail: details of update content
updateReference: URI that references details of update content (when update content is not stored in this message)

It should be noted that only one of dateOfEvent and validFrom is specified. Further, it is assumed that validFrom <validTo and time and date of issue of message <validTo are satisfied.

[Structure of Filter]

In a format of the update notification message, the eventCategory attribute is used by the subscriber 30 to filter the update notification message. A category of a filtering class is expressed by the URI of the eventCategory attribute. For example, a class of an update notification of metadata and a class of an update notification of a content in a content distribution service of a service provider-A can be specified as follows.

(In case of metadata database)
eventCategory:"urn:ServiceProvider-A:contentDistributionService:metadataDatab ase"
(In case of content database)
eventCategory:"urn:ServiceProvider-A"contentDistributionService:contentDataba se"

Further, when expressing a category stored in a category database of contents such as blogs that are managed in an SNS (Social Networking Service) site to be described later, the following description is conceivable, for example.

(In case of certain category defined in SNS site)
eventCategory: "urn: SNS-Name: category: categoryName1:categoryName2: . . . "

Here, for categoryName1 and categoryName2, for example, names of categories that are named in an order of a broader concept (descending order) of the categories, such as "sport" and "baseball", are used, respectively. In this case, a value of the eventCategory attribute becomes "urn:SNS-X:category:sport:baseball:majorLeague".

A plurality of eventCategory attributes can be stored. In other words, it is possible to specify a plurality of filtering classes with respect to a single update notification message.

For example, when the update notification message is an update notification of metadata in a content distribution service of the service provider-A and a content thereof is a content corresponding to "sport:baseball:majorLeague" in a category hierarchy of the SNS site "SNS-X" as shown in FIG. 3, the eventCategory attributes become
<eventCategory>urn:ServiceProvider-A:contentDistributionService:metadataDatabase</ eventCategory> and
<eventCategory>urn:SNS-X:category:sport:baseball:majorLeague</eventCategory>.

[Full update and differential update]

The update information contained in the update notification message is categorized into a full update or a differential update. The full update is an update (overwrite, rewrite) of the entire update target data, and the differential update is a partial update of the update target data. Generally, there is a possibility that the database of the contents or metadata becomes extremely large. Thus, when only the full update is used for the update information, not only can it not be stored in the message body, but also, even when update processing is carried out by outbound acquisition based on the reference to the update content, a large load and overhead are applied to the update processing every time. Therefore, in the update notification system of this embodiment, it is possible to carry out not only the full update but also the differential update in which only a part that the update has occurred in the database is selectively updated. The flag that indicates the full update (full) or the differential update (delta) is specified by update Type as an attribute of the transaction element in the atomic update processing unit. The transactionId attribute is an identifier for uniquely identifying a sequence of the update notification messages in time series. Based on this transactionID, the subscriber 30 can grasp the order of the update events in time series.

Every time the update target data (content or metadata) of the publisher 10 is updated, the publisher 10 generates an update notification message storing the update information. However, in a case where, although the contents or metadata accumulated in the database on the publisher 10 side can be updated correctly at all times if the subscriber 30 can acquire all of a series of update notification messages without omission, a highly-reliable messaging protocol as in conveying the update notification message by a UDP (User Datagram Protocol) packet cannot be used, it is difficult to be assured. Because the omission of the update notification message can be detected by monitoring a continuity of the transaction identifiers, a system of simultaneously adopting complementary acquisition processing from the subscriber 30 side, like acquiring the omitted update notification message every time the omission is detected is conceivable. However, because the complementary acquisition processing cannot be carried out when presupposing a complete one-way/broadcast type, the following full update and differential update are both used for improving update efficiency.

FIG. 4 is a sequence diagram of the update processing that uses both the full update and the differential update.

In the figure, an example in which the upper half is a sequence of the differential updates and the lower half is a sequence of the full updates is shown. Each section in a horizontal direction is divided at timings at which the update notification messages are generated on the publisher 10 side. The full-update sequence is an update sequence at adequate cycles for recovering a snapshot of the entire content or metadata that the publisher 10 side possesses. When an update notification message storing differential-update information (hereinafter, referred to as "differential-update notification message") is generated, all updates from when the differential-update notification message of one message before is generated to when the current differential-update notification message is generated are reflected on the description of the update content. On the other hand, when an update notification message storing full-update information (hereinafter, referred to as "full-update notification message") is generated, transactionId is assumed to be the same as that of the differential-update notification message of one message before, and the description of the update content thereof becomes one on which all updates up to the time when the differential-update notification message of one message before is generated are reflected.

When the subscriber 30 newly carries out the synchronous processing on the entire data, for example, carries out the update by newly acquiring an update notification message from a timing TM between transactionId=104 and transactionId=105 in FIG. 4, the subscriber 30 first acquires via a bidirectional network a full-update notification message of transactionId=101 that is stored in the queue/channel 20 and is most-recent full-update information before the timing TM, next acquires differential-update notification messages of subsequent transactionIds=102, 103, and 104, and requests the update of the service client via the home network.

The processing of the subscriber 30 will be described in more detail using a processing flow of the subscriber 30 of FIG. 5. First, the subscriber 30 acquires, from the queue/channel 20, the latest update notification message, that is, the most-recent update notification message before the timing TM, for example, the update notification message of transactionId=104 in the case of FIG. 4 (Step S101). Based on the updateType attribute of the transaction element of the acquired update notification message, the subscriber 30 judges which of the full-update information and the differential-update information the update information stored in the update notification message is (Step S102), and if judged as the full-update information, requests the update by the full-update information of the service client (Step S103). Upon receiving the update request from the subscriber 30, the service client carries out the synchronous processing by updating the content or metadata accumulated in the local database based on the full-update information.

On the other hand, when the update information stored in the acquired latest update notification message is the differential-update information in Step S102, the full-update notification message storing the latest and most-recent full-update information before the timing TM, for example, the update notification message of transactionId=101 in the case of FIG. 4, is acquired from the queue/channel 20, and the service client is requested to make an update by the full-update information (Step S104).

Subsequently, the subscriber 30 acquires, from the queue/channel 20, the differential-update notification messages from transactionId of the full-update notification message acquired in Step S104 (transactionId=101 in the example of FIG. 4) to one transaction before transactionId of the differential-update notification message acquired in Step S101 (transactionId=104 in the example of FIG. 4), and requests the update by the differential-update information of the service client (Step S105).

In descriptions below, the subscriber 30 requests the update by the differential-update information of the service client every time the differential-update notification message is received from the queue/channel 20 via the one-way network (Step S106).

Further, as shown in FIG. 6, in an environment where the bidirectional network cannot be used, that is, an environment where only the one-way network can be used, the subscriber 30 waits until a timing at which the next full-update notification message is received via the one-way network (transactionId=105 in the example of FIG. 4) to thus acquire the full-update notification message (Steps S201 and S202), and requests the update by the full-update information stored in the full-update notification message, of the service client (Step S203). Hereinafter, every time the differential-update notification message is received from the queue/channel 20 via the one-way network, the subscriber 30 requests the update by the differential-update information of the service client (Step S204). Accordingly, the synchronous processing of the contents or metadata stored in the local database of the service client is carried out in the environment where only the one-way network can be used.

Hereinafter, in either of the network environments, it is unnecessary for the subscriber 30 to acquire the full-update notification message when the differential-update notification messages can be acquired without omission. When it is detected on the subscriber 30 side that the differential-update notification message has been omitted by some kind of an accident, recovery processing is carried out by the same procedure as that of the synchronous processing shown in FIG. 5 or 6.

[Time Control of Update Processing in Service Client]

Next, time control of the update processing in the service client will be described.

The update processing in the service client is carried out as follows based on information specified by the dateOfEvent attribute, the validFrom attribute, the validTo attribute, and the like of the updateInfo element of the update notification message.

FIG. 7 is a flowchart related to the time control of the update processing in the service client.

Upon receiving an update request from the subscriber 30, the service client judges, after acquiring the current time (Step S301), whether the dateOfEvent attribute is specified in the update notification message (Step S302). If the dateOfEvent attribute is specified, the service client compares a time and date at/on which the update fragment specified as the validTo attribute in the update notification message is invalidated with the current time (Step S309). If the current time has not exceeded the update fragment invalidation time and date, that is, when the update information is within an expiration date, the service client carries out the update processing based on the update information of the update notification message (Step S308). Meanwhile, if the current time has exceeded the update fragment invalidation time and date, the service client cancels the update processing (Step S310).

Furthermore, because only one of the dateOfEvent attribute and the validFrom attribute is specified in the update notification message, when judged in the judgment of Step S302 that the dateOfEvent attribute is not specified in the update notification message, it is judged whether the validFrom attribute is specified in the update notification message (Step S303). If unspecified, in the same manner as in the descriptions above, the service client compares the time and date at/on which the update fragment specified as a value of the validTo attribute is invalidated with the current time (Step S309), and carries out the update processing or cancels the update processing in accordance with the result of the comparison (Steps S308 and S310).

When it is judged in Step S303 that the validFrom attribute is specified, the service client compares a time and date at/on which the update fragment as a value of the validFrom attribute is validated with the current time (Step S304). When the current time has reached the time and date at/on which the update fragment is validated, the service client compares, in the same manner as in the descriptions above, the time and date at/on which the update fragment specified as the value of the validTo attribute is invalidated with the current time (Step S309), and carries out the data update processing or cancels the update processing in accordance with the result of the comparison.

When it is judged in Step S304 that the current time has not exceeded the time and date at/on which the update fragment is validated, the service client waits until the update fragment reaches the time and date at/on which the update fragment is validated (Steps S305, S306, S307), and carries out the update processing (Step S308).

[Specific Example of Update Processing]

Next, as a specific example of the update processing, an update sequence in a case where a data structure on the subscriber 30 side is expressed by a hierarchy structure of an XML node will be shown.

FIG. 8 is a diagram showing a full-update notification message of transactionId=01 (initial state), data on which the full update is reflected, and a model thereof. A value of the updateType attribute that indicates the type of the update (full update/differential update) is "full", and a content of the updateDetail element that indicates details of the update content is "addition of route element A (initial state) [add<A>]". In other words, it shows that, as the initial state, a full update in which the route element A is added has occurred.

FIG. 9 is a diagram showing a differential-update notification message of transactionId=02, data on which the differential update is reflected, and a model thereof. Here, the value of the updateType attribute that indicates the type of the update (full update/differential update) is "delta", and the content of the updateDetail element that indicates details of the update content is "addition of element B [add<B>to <A>]". In other words, a differential update in which the element B is added under the route element A has occurred.

FIG. 10 is a diagram showing a differential-update notification message of transactionId=03, data on which the differential update is reflected, and a model thereof. The value of the updateType attribute that indicates the type of the update (full update/differential update) is "delta", and the content of the updateDetail element that indicates details of the update content is "deletion of element B and addition of element C [[remove<B>from<A>] and [add<C>to <A>]]". This indicates that a differential update in which the element B is deleted from below the route element A and the element C is added has occurred.

FIG. 11 is a diagram showing a differential-update notification message of transactionId=04, data on which the differential update is reflected, and a model thereof. Here, the value of the updateType attribute that indicates the type of the update (full update/differential update) is "delta", and the content of the updateDetail element that indicates details of the update content is "addition of element D [add<D>to <C>]". In other words, it shows that an update in which the element D is added under the element C has occurred.

FIG. 12 is a diagram showing a full-update notification message of transactionId=04, data on which the full update is reflected, and a model thereof. The value of the updateType attribute that indicates the type of the update (full update/differential update) is "full", and the content of the updateDetail element that indicates details of the update content is "addition of elements A, C, and D [[add<A>] and [add<C>to <A>] and [add<D>to <C>]]". In other words, here, an update of all the elements A, C, and D has occurred.

[Method of Expressing Details of Update Content]

Next, a method of expressing details of the update content will be described.

The method of expressing the details of the update content described in the updateDetail element or described in a file referenced from the updateReference element depends on the publisher. For example, for expressing the update, the publisher might use XSLT (XML Stylesheet Language Transformations) or an XQuery (XQuery Update Facility), and other publishers might use an SQL (Structured Query Language) or other database manipulation languages. When storing the update content in the update notification message, all of the content is text-encoded. When describing it in the file referenced from the updateReference element, binary data can also be used. Thus, an expression method that depends on a database as a management target of each publisher or an expression method that only the service client that undertakes the update processing can interpret is used.

[Update Notification Message Distribution Protocol]

Next, a distribution protocol of the update notification message will be described.

As the update notification message distribution protocol, there are a unicast protocol and a multicast protocol.

First, a case of the unicast protocol will be described.

The subscriber 30 transmits an update notification message acquisition request to a server-side script executed on the queue/channel 20 side by an HTTP (Hyper Text Transfer Protocol), and the server-side script transmits an update notification message in response to the acquisition request. The subscriber 30 periodically executes the acquisition request at short cycles. A URL syntax in this case is defined as follows.
http://<serverSideScript>?<queryParameter> serverSideScript is a file name of a script for each publisher 10. queryParameter is a parameter of an argument that is passed over to that script.

queryParameter becomes any of the following patterns.

Pattern 1)
p=lastDelta
Pattern that requests differential-update notification message having latest transactionId.

Pattern 2)
p=lastFull
Pattern that requests full-update notification message having latest transactionId.

Pattern 3)
Sequence of transactionID=<transactionID>with '&' as separator
Pattern that requests all differential-update notification messages having series of specified transactionIds.

Pattern 4)
fromTransactionId=<transactionId_1>&endTransactionId=>transactionId_2>

Pattern that requests all update notification messages from transactionId_1 to transactionId_2.

Next, a case of the multicast protocol will be described.

Using an IP multicast, the publisher 10 stores the update notification message in a UDP packet. The update notification message is periodically and repeatedly transmitted. An upper limit of a size of the update notification message is set so that, when stored in an IP packet, the message is within a lower-layer MTU (Maximum Transmission Unit) (so as not to induce IP fragmentation). A multicast address, a port number, a cycle count, and a repetition count are described in http://<configuration file> or the like. By the subscriber 30 side acquiring the file in advance, the client side is notified in advance.

[Example of Network System]

Next, a structure of a network system adopting the update notification system above will be described.

FIG. 13 is a block diagram showing a structure of the network system.

As shown in the figure, a network system 100 is constituted of a plurality of service providers 40A, 40B, and 40C for distributing contents or metadata of the contents for each service, and a home-network-side appliance 50 in which devices or applications that receive the distribution services of those contents or metadata exist. The service providers 40A, 40B, and 40C respectively include publishers 10A, 10B, and 10C for generating update notification messages and queue/channel's 20A, 20B, and 20C for publicly releasing the update notification messages generated by the publishers 10A, 10B, and 10C on a network 90. On the other hand, the home-network-side appliance 50 includes the subscriber 30 for acquiring the update notification messages from the queue/channel's 20A, 20B, and 20C of the service providers 40A, 40B, and 40C, respectively, via the network 90, and a plurality of service clients 60*a*, 60*b*, and 60*c* each as an application corresponding to each service, each of which undertakes the update processing of the contents or metadata for each service stored in a local database. The subscriber 30 and the service clients 60*a*, 60*b*, and 60*c* are connectable via a home network 70.

The subscriber 30 acquires the update notification messages from the queue/channel's 20A, 20B, and 20C of the service providers 40A, 40B, and 40C, respectively, via the network 90, and selectively provides update information as update information within the update notification messages (content of updateDetail element) or references to the update information (content of updateReference element) to the service clients 60*a*, 60*b*, and 60*c* through filtering. Based on the acquired update information, the service clients 60*a*, 60*b*, and 60*c* carry out updates of the contents/metadata stored in local content/metadata databases 61*a*, 61*b*, and 61*c*.

Further, when the service clients 60*a*, 60*b*, and 60*c* as provisional destinations of the update information are not activated, the subscriber 30 activates the service clients 60*a*, 60*b*, and 60*c* and provides the update information or references to the update information. Based on the update information acquired based on the provided update information or references to the update information, the service clients 60*a*, 60*b*, and 60*c* respectively update the contents or the metadata in the local content/metadata databases 61*a*, 61*b*, and 61*c* and carry out synchronous processing. Here, the protocol used when the subscriber 30 passes over the update information to the service clients 60*a*, 60*b*, and 60*c* is implemented in each of the service clients 60*a*, 60*b*, and 60*c*.

The queue/channel's 20A, 20B, and 20C of the respective service providers 40A, 40B, and 40C are capable of acquiring, from category databases managed by a plurality of SNS sites 80, categories defined in the SNS sites 80, and setting the categories as eventCategory as a filter attribute of the update notification messages.

Next, a structure and processing sequence of the service providers 40A, 40B, and 40C will be described.

FIG. 14 is a diagram showing the structure of the service providers 40A, 40B, and 40C, and FIG. 15 is a diagram showing the processing sequence of the service providers 40A, 40B, and 40C.

The publishers 10A, 10B, and 10C each include a content/metadata management server 11, a content/metadata master database 12, and an update notification generator 13.

The content/metadata management server 11 generates and updates a content or metadata of the content (hereinafter, described as "content(s)/metadata") in accordance with an instruction from a user given via a user interface or an instruction from an application (S401).

The content/metadata master database 12 is a database for storing the contents/metadata generated and updated by the content/metadata management server 11.

The update notification generator 13 carries out a periodical detection of the updates with respect to the contents/metadata stored in the content/metadata master database 12, and upon detecting the update, carries out processing of generating an update notification message storing update information thereof and passing over the generated update notification message to a filter manager 21 of the queue/channel 20A, 20B, or 20C (S402).

On the other hand, the queue/channel's 20A, 20B, and 20C each include the filter manager 21, an update notification message database 22, an SNS category aggregator 23, and a message distribution server 24.

The SNS category aggregator 23 collects categories from the category databases of the SNS sites 80 and notifies the filter manager 21 of the collected categories (S403).

The filter manager 21 carries out processing of setting the eventCategory attribute of the update notification message passed over from the update notification generator 13 based on the category notified by the SNS category aggregator 23, and storing it in the update notification message database 22 (S404).

The update notification message database 22 is a database for storing the update notification message in which the eventCategory attribute has been set by the filter manager 21.

The message distribution server 24 carries out a multicast transfer of the update notification message stored in the update notification message database 22 to the subscriber 30 via the network 90, or carries out retrieval of the update notification message from the update notification message database 22 in response to the request from the subscriber 30 and a unicast transfer of the retrieved update notification message (S405).

FIG. 16 is a diagram showing a structure of the SNS category aggregator 23 and the SNS sites 80, and FIG. 17 is a diagram showing a processing sequence of collecting the categories from the category databases of the SNS sites 80 by the SNS category aggregator 23.

The SNS sites 80 each include a category management application 81 and a category database 82. The category management application 81 carries out processing of storing categories defined in correspondence with contents of blogs and the like registered by the user using the SNS site 80 in the category database 82 (S501). The category database 82 is a database for storing categories. As described above, the SNS category aggregator 23 carries out processing of collecting the categories from the category database 82 of the SNS site 80 and notifying the filter manager 21 (S502).

Next, a structure and processing sequence of the home-network-side appliance (network household appliance) 50 will be described.

FIG. 18 is a diagram showing the structure of the home-network-side appliance 50, and FIG. 19 is a diagram showing the processing sequence of the home-network-side appliance 50.

The subscriber 30 includes a message distribution client 31, a residential message database 32, and a residential message distribution server 33.

The message distribution client 31 carries out processing of storing in the residential message database 32 a filter attribute of the update notification message input by the user via the user interface in S601 or a filter attribute of the update notification message given based on a filter registration request of the update notification message from the service clients 60a, 60b, and 60c (S602). For example, update information of what kind of category of what service is to be acquired is registered in the residential message database 32 for each of the service clients 60a, 60b, and 60c. Moreover, the message distribution client 31 stores in the residential message database 32 the update notification message transmitted through multicast from the message distribution server 24 of each of the queue/channel's 20A, 20B, and 20C or the update notification message from the queue/channel's 20A, 20B, and 20C as a response to the transmission of the message acquisition request (S603).

The residential message distribution server 33 periodically retrieves the update notification message from the residential message database 32 and provides, to the corresponding service client 60a, 60b, or 60c via the home network 70, update information within the update notification message (content of updateDetail element) or a reference to the update information (content of updateReference element), based on the filter attributes of the service clients 60a, 60b, and 60c registered in the residential message database 32. At this time, when the corresponding service client 60a, 60b, or 60c is not activated, that service client 60a, 60b, or 60c is activated and the update information or the reference to the update information is provided (S604).

For example, consideration will be given to a case where a filter attribute is registered in the residential message database 32 so that an update notification message of metadata of the category "sport" in the distribution service of the service provider 40A reaches the service client 60. In this case, if the eventCategory attribute of the update notification message retrieved from the residential message database 32 is the "update notification of metadata of the category "sport" in the content distribution service of the service provider 40A", the residential message distribution server 33 activates the service client 60a for notifying the service client 60a of the update information within the update notification message or the reference to the update information.

Upon acquiring the update information or the references to the update information from the residential message distribution server 33, the service clients 60a, 60b, and 60c update the contents/metadata stored in the respective local content/metadata databases 61a, 61b, and 61c based on the update information or the references to the update information (S605).

FIG. 20 is a diagram showing an example of notifications of update notification messages among the plurality of service providers 40A, 40B, and 40C and the plurality of service clients 60a, 60b, and 60c.

Here, the subscriber 30 carries out the filtering of the update information so that the service client 60a acquires the update information of the service provider 40A, the service client 60b acquires the update information of the service provider 40B, and the service client 60c acquires the update information of the service provider 40C. It should be noted that the category attributes of the contents/metadata are not specified.

First, an update notification message of transactionId=100 from the service provider 40A is stored in the residential message database 32 of the subscriber 30, and the residential message distribution server 33 detects the update notification message from the residential message database 32 and notifies the service client 60a of update information within the update notification message or a reference to the update information. It should be noted that the notification of the update information or the reference to the update information from the residential message distribution server 33 to the service clients 60a, 60b, and 60c is carried out in accordance with the protocol of each of the service clients 60a, 60b, and 60c.

Next, when an update notification message of transactionId=67 from the service provider 40C is stored in the residential message database 32 of the subscriber 30, the residential message distribution server 33 detects the update notification message from the residential message database 32 and notifies the service client 60c of update information within the update notification message or a reference to the update information.

Subsequently, when an update notification message of transactionId=988 from the service provider 40B is stored in the residential message database 32 of the subscriber 30, the residential message distribution server 33 detects the update notification message from the residential message database 32 and notifies the service client 60b of update information within the update notification message or a reference to the update information.

After that, an update notification message of transactionId=989 from the service provider 40B, an update notification message of transactionId=68 from the service provider 40C, and an update notification message of transactionId=101 from the service provider 40A are successively stored in the residential message database 32 of the subscriber 30, and the residential message distribution server 33 detects those update notification messages and successively notifies the service client 60b of update information within the update notification message of transactionId=989 from the service provider 40B or a reference to the update information, the service client 60c of update information within the update notification message of transactionId=68 from the service provider 40C or a reference to the update information, and the service client 60a of update information within the update notification message of transactionId=101 from the service provider 40A or a reference to the update information.

Based on the registered contents of the filter attributes, the subscriber 30 can thus provide the update information within the update notification messages generated in the service providers 40A, 40B, and 40C or the references to the update information to the corresponding service clients 60a, 60b, and 60c.

Next, a content/metadata update processing sequence that is based on a reference to the update information within the update notification message will be described.

FIG. 21 is a diagram showing a structure for the update processing of contents/metadata that is based on the reference to the update information within the update notification message, and FIG. 22 is a sequence diagram of the update processing of contents/metadata that is based on the reference to the update information within the update notification message.

On the service provider 40 side, a database synchronous information provision server 25 for accepting update information reference requests from the service clients 60a, 60b, and 60c and transmitting the corresponding contents/metadata to the service clients 60a, 60b, and 60c as a response is provided. Upon receiving the update information reference requests from the service clients 60a, 60b, and 60c, the database synchronous information provision server 25 retrieves update information of the contents/metadata as the corresponding reference destinations that are stored in the content/metadata master database 12, and transmits the update information as a response to the service clients 60a, 60b, and 60c as reference request sources (S701). The service clients 60a, 60b, and 60c receive the update information as a response from the database synchronous information provision server 25, and use the update information to update the contents/metadata stored in the respective local content/metadata databases 61a, 61b, and 61c (S702).

As described above, by storing the references to the update information in the update notification messages instead of real data of the update information and by the service clients 60a, 60b, and 60c that have acquired the update notification messages acquiring the update information based on the references to the update information, it is possible to shift times at which the real data of the update information is transmitted toward the plurality of service clients 60a, 60b, and 60c from the service providers 40A, 40B, and 40C side, time-disperse loads on the service providers 40A, 40B, and 40C side, and efficiently carry out the update processing.

Next, failure recovery processing of the local content/metadata databases 61a, 61b, and 61c in the service clients 60a, 60b, and 60c, respectively, will be described.

FIG. 23 is a diagram showing a structure for the failure recovery processing in a case where a failure has occurred in the local content/metadata database 61a of the service client 60a, and FIG. 24 is a sequence diagram of the failure recovery processing.

Each of the service providers 40A, 40B, and 40C includes the database synchronous information provision server 25 for retrieving, when a reference request of failure recovery update information is received from the service clients 60a, 60b, and 60c, all pieces of update information of corresponding contents/metadata that are stored in the content/metadata master database 12, and transmitting the update information as a response to the service client 60a as a request source.

Upon detection of a failure in the local content/metadata database 61a of the service client 60a, the failure recovery processing is started (S801). In the failure recovery processing, the service client 60a first transmits an update notification message acquisition request to the residential message distribution server 33 within the subscriber 30 via the home network 70. Upon receiving the update notification message acquisition request, the residential message distribution server 33 extracts, among the update notification messages stored in the residential message database 32, based on the filter attribute of the service client 60a registered in the residential message database 32, all relevant update notification messages, and transmits them to the service client 60a (S802).

Here, when real data of the update information is stored in the update notification message, the service client 60a uses the update information within the update notification message acquired in S803 to carry out the failure recovery processing of the local content/metadata database 61a (S804). Further, when only the reference to the update information is stored in the update notification message, the service client 60a transmits a failure recovery update information reference request to the database synchronous information provision server 25 of the service provider (supposedly, service provider 40A) as a destination of the reference to the update information via the home network 70 and the network 90. Upon receiving the update information reference request from the service client 60a, the database synchronous information provision server 25 retrieves update information of the corresponding content/metadata that is stored in the content/metadata master database 12, and transmits the update information to the service client 60a as the request source (S805). Upon acquiring the update information from the database synchronous information provision server 25, the service client 60a uses the update information to carry out the failure recovery processing of the local content/metadata database 61a (S804).

It should be noted that the failure recovery processing above also similarly applies to a case where a failure has occurred in the local content/metadata database of other service clients and a case where the service provider as the destination of the reference to the update information is a different service provider.

With this system, it becomes possible to carry out the failure recovery processing of the local content/metadata databases 61a, 61b, and 61c by using the update notification messages stored in the residential message database 32 within the home network without necessarily having to access the service providers 40A, 40B, and 40C, in a case where the local content/metadata databases 61a, 61b, and 61c of the respective service clients 60a, 60b, and 60c require recovery processing due to some kind of a failure. Accordingly, loads for processing transactions accompanying the failure recovery processing of the local content/metadata databases 61a, 61b, and 61c can be suppressed.

In the structure above, an example where the subscriber 30 and the service clients 60a, 60b, and 60c are within the home network 70 has been shown. However, the system of the present invention can also be applied to a case where the service clients 60a, 60b, and 60c are outside the home network 70, the example of which is shown next.

Game devices that are based on package media such as a PSP (registered trademark) and PlayStation (registered trademark) are not always connected to the network 90 at all times. Moreover, in a case where the game device is taken to a travel destination or the like, the game device needs to be connected to the network 90 for acquiring update information from the subscriber 30 on the home network 70 or directly from the queue/channel's 20A, 20B, and 20C of the service providers 40A, 40B, and 40C, respectively. In this case, a cellular phone is mounted to the game device (including a form of a short-distance connection using bluetooth (registered trademark)) so that update information is acquired via a mobile telephone network or HOTSPOT (registered trademark) (in a case where the cellular phone has a wireless LAN function).

FIG. 25 is a diagram showing an update sequence in a form in which a service client 60d implemented on a cellular phone 120 representatively carries out update processing of a content or metadata stored in a game device 110.

The service client 60d of the cellular phone 120 is activated (S901). When the game device 110 is connected with a local channel (irrespective of being in or out of physical contact), the service client 60d of the cellular phone 120 acquires a latest update notification message from the update notification message database 22 within the queue/channel 20 of the service provider 40 (S902). Based on an attribute of the transaction element contained in the acquired update notification message, the service client 60d of the cellular phone 120 judges which of the full-update information and the differential-update information the latest update information is, and if judged as the full-update information, requests an update by the full-update information via the local channel connection of an application of the game device 110 (S903).

Further, when the acquired latest update information is the differential-update information, an update notification message containing most-recent full-update information of the past is acquired from the queue/channel 20 of the service provider 40, pieces of differential-update information ranging from the update notification message acquired in S903 to the update notification message that is one message before that acquired in S902 are additionally acquired from the queue/channel, and the application of the game device 110 is requested to make an update by those acquired pieces of differential-update information via the local channel connection (S904).

Hereinafter, the service client 60*d* of the cellular phone 120 requests the update by the differential-update information of the application of the game device 110 connected to local channel every time the differential-update notification message is received from the queue/channel 20 (S906).

It should be noted that the transmission of the update information from the service client 60*d* of the cellular phone 120 to the application of the game device 110 may be provided via a memory device such as an SD (registered trademark) memory card or a memory stick (registered trademark).

Incidentally, in the network system 100 described heretofore, individual service providers 40A, 40B, and 40C are realized by, for example, hardware, programs, and the like of a computer such as a PC as shown in FIG. 26.

Specifically, a CPU 601 is connected to, via a system bus 609, a ROM 602, a RAM 603, a network interface section 604, an input section 605 constituted of a keyboard, a mouse, and the like, an output section 606 constituted of a display constituted of a CRT (Cathode Ray Tube) and an LCD, a speaker, and the like, a media interface section 607, and a storage section 608 constituted of a hard disk drive, a nonvolatile memory, and the like.

The network interface section 604 processes a wired or wireless connection with respect to the network 90. The storage section 608 stores programs for causing the computer to execute functions as a specific server, various types of data, and the like. The CPU 601 loads, to the RAM 603, from the ROM 602 and the storage section 608, a program for causing the computer to function as the publisher or queue/channel in the service provider, and carries out operational processing for interpretive execution. The media interface section 607 is suitably mounted with a removable medium 2 such as a magnetic disk, an optical disk, a magnetooptical disk, or a semiconductor memory, and programs read out therefrom are installed in the storage section 608 as necessary.

Further, in the service provider, the publisher and the queue/channel may be programs that are operated on different computers, or may be programs that are operated on a single computer.

Furthermore, in the home-network-side appliance 50, the subscriber and the service client may be programs implemented in a TV, or programs operated as application programs installed in the PC, for example. Moreover, the subscriber and the service client may be operated by programs incorporated in different appliances.

FIG. 27 is a block diagram showing a hardware structure of the network household appliance in which the subscriber and the service client are implemented. As shown in the figure, a CPU (Central Processing Unit) 501 is connected to, via a system bus 502, a ROM (Read Only Memory) 503, a RAM (Random Access Memory) 504, an input operation section 505, a display section 506, an audio output section 507, a network interface section 508, an optical communication section 511, and a storage section 512.

The input operation section 505 includes various keys and processes inputs of various instructions and data from the user. An instruction input by the user using the input operation section 505 is supplied to the CPU 501 by an input interface section (not shown) via the system bus 502. The display section 506 is constituted of, for example, a display device such as an LCD (Liquid Crystal Display) and a display control circuit for driving the display device. The audio output section 507 is constituted of a circuit that converts a digital audio signal into an analog audio signal, a speaker, and the like. The network interface section 508 processes a wired or wireless connection with respect to the network 90.

The optical communication section 511 is an interface for processing communication with a remote controller or other external appliances, and is specifically used for performing communication with the external appliance with light such as infrared rays as a wireless medium. Moreover, in addition to light, other wireless media such as radio waves, sonic waves, and electromagnetic waves may be used. The storage section 512 is, for example, a storage apparatus such as a hard disk drive or a semiconductor memory.

The ROM 503 is a read-only memory in which programs for causing the computer to execute the functions as the subscriber and the service client, data, and the like are stored permanently. It should be noted that the programs may be stored in the storage section 512. The RAM 504 is a memory used for writing programs loaded from the ROM 503 or the storage section 512, operational data of the programs, and the like. The CPU 501 carries out operational processing for interpretively executing the programs stored in the ROM 503 or programs loaded to the RAM 504.

(Second Embodiment)

In the embodiment described above, the case where the metadata is updated in element units has been described. Next, a method of updating, in fragment units, TV-Anytime metadata hierarchized in fragment units will be described.

A fragment is a part of the entire metadata of TV-Anytime or the like. A part can also be said to be a part of metadata constituted of one or more elements. FIG. 29 is an example of ServiceInformation metadata describing information on services of broadcast channels as TV-Anytime metadata fragments.

In FIG. 29, ServiceInformation-A, -B, and -C are ServiceInformation metadata of broadcast channels-A, -B, and -C, respectively. In those pieces of ServiceInformation metadata, it is possible for information on a service identifier, a reference to a parent service, a service name, an owner, a service genre, and the like to be described as the information on the services of the broadcast channels, for example. In this embodiment, a PurchaseItem element capable of describing a price necessary for purchasing a channel is introduced by expansion in ServiceInformation. In this example, the broadcast channel-A is 300 yen a month, the broadcast channel-B is 400 yen a month, and the broadcast channel-C is 500 yen a month.

Descriptions will be given on an update of ServiceInformation metadata in a case where a price of a broadcast channel is changed, a unit for purchase of the broadcast channel is changed, or the like. FIG. 30 is an update example of the ServiceInformation metadata in a case where the broadcast channel-B and the broadcast channel-C are put together as one and the price is set to 600 yen a month. In this example, the broadcast channel-B and the broadcast channel-C are subsumed as a single "channel pack", and ServiceInformation-D as ServiceInformation metadata of the channel pack is newly created. Moreover, information on the price of the broadcast channel-B and the broadcast channel-C put together as one is described in the PurchaseItem element within the ServiceInformation-D.

Incidentally, in a standard of current TV-Anytime, the structure hierarchized in fragment units cannot be described in ServiceInformation like the structure of the channel pack subsuming the plurality of broadcast channels as described above. In this regard, in this embodiment, for defining the structure of the channel pack subsuming the plurality of broadcast channels, a ServicePackRef element is newly introduced. The ServicePackRef element is an element for defining a reference to parental ServiceInformation (ServiceInformation-D in this case) when seen from ServiceInformation of children subsumed (ServiceInformation-B and ServiceInformation-C in this case).

FIG. 41 is a diagram for explaining update processing of the ServiceInformation metadata shown in FIG. 30, FIG. 31 is a diagram showing a specific example of the ServiceInformation metadata of the broadcasts channel-B and -C before the change shown in FIG. 30, and FIG. 32 is a diagram showing a specific example of the ServiceInformation metadata after the change shown in FIG. 30.

The ServiceInformation metadata before the change contains a ServiceInformationTable element 71. The ServiceInformationTable element 71 includes ServiceInformation elements 72 and 73 of the plurality of broadcast channels, that is, ServiceInformation elements 72 and 73 of the broadcast channel-B and the broadcast channel-C in this example. The ServiceInformation elements 72 and 73 each include a serviceId attribute 74 for identifying a service, a fragmentId attribute 75 for identifying a fragment, a fragmentVersion attribute 76 that indicates a version of the fragment, a Name element 77 describing a name of the broadcast channel, and a PurchaseItem element 78 describing information on a price. The PurchaseItem element 78 includes a Price element 79 describing the price and a Purchase element 91 describing information on the price, such as monthly payment.

On the other hand, the ServiceInformation metadata after the change contains a ServiceInformationTable element 71a. The ServiceInformationTable element 71a includes ServiceInformation elements 72a, 73a, and 92 of the plurality of broadcast channels and the channel pack. The ServiceInformation elements 72a and 73a of the respective broadcast channels subsumed each include the serviceId attribute 74 for identifying the service, the fragmentId attribute 75 for identifying the fragment, the fragmentVersion attribute 76 that indicates the version of the fragment, the Name element 77 describing the name of the broadcast channel, and a ServicePackRef element 93. The ServiceInformation element 92 of the channel pack includes the serviceId attribute 74 for identifying the service, the fragmentId attribute 75, the fragmentVersion attribute 76, the Name element 77 describing the name of the channel pack, and a PurchaseItem element 94 describing information on the price. The PurchaseItem element 94 includes a Price element 95 describing the price and a Purchase element 96 describing the information on the price, such as monthly payment.

Next, descriptions will be given on an operation in a case where, in an IPTV system including an IPTV server that distributes metadata and an IPTV client terminal that acquires the metadata, ServiceInformation metadata is updated in fragment units.

FIG. 33 is a diagram showing a structure of an IPTV system 100. As shown in the figure, the IPTV system 100 includes an IPTV server 110, an IPTV client terminal 120, and a network 130 capable of connecting those two, such as the Internet.

The IPTV server 110 includes a metadata generation section 111, a metadata server database 112, a metadata distribution section 113, an IPTV media server 114, and the like.

The metadata generation section 111 generates metadata. The metadata server database 112 retains the metadata generated by the metadata generation section 111. The metadata distribution section 113 distributes the metadata retained in the metadata server database 112 to the IPTV client terminal 120 via the network 130. The IPTV media server 114 transmits a content to the IPTV client terminal 120 via the network 130.

The IPTV client terminal 120 includes a metadata reception section 121, a metadata client database 122, a user interface processing section 123, and an IPTV media client 124.

The metadata reception section 121 receives the metadata transmitted from the IPTV server 110 via the network 130. The metadata client database 122 retains the metadata received by the metadata reception section 121. The user interface processing section 123 inputs an instruction from the user. The IPTV media client 124 receives the content transmitted from the IPTV server 110 via the network 130 based on the instruction from the user interface processing section 123 and reproduces it.

Next, processing of distributing the ServiceInformation metadata from the IPTV server 110 to the IPTV client terminal 120 and updating it will be described while referring to a flowchart of FIG. 34.

First, in the IPTV server 110, the metadata generation section 111 generates ServiceInformation metadata of a broadcast channel (Step S1). The generated ServiceInformation metadata of the broadcast channel is stored in the metadata server database 112.

The metadata distribution section 113 reads out the ServiceInformation metadata from the metadata server database 112, generates an update notification message containing this ServiceInformation metadata (Step S2), and distributes the update notification message to the IPTV client terminal 120 via the network 130 (Step S3).

The metadata reception section 121 in the IPTV client terminal 120 receives the update notification message transmitted from the IPTV server 110 via the network 130 (Step S4) and registers the ServiceInformation metadata contained in the received update notification message in the metadata client database 122 (Step S5).

After that, when updated ServiceInformation metadata is generated by the metadata generation section 111 in the IPTV server 110 (Step S6), the updated ServiceInformation metadata is stored in the metadata server database 112.

The metadata distribution section 113 reads out the updated ServiceInformation metadata from the metadata server database 112, generates an update notification message containing the updated ServiceInformation metadata (Step S7), and distributes it to the IPTV client terminal 120 via the network 130 (Step S8).

Upon receiving the update notification message containing the updated ServiceInformation metadata transmitted from the IPTV server 110 via the network 130 (Step S9), the metadata reception section 121 in the IPTV client terminal 120 retrieves ServiceInformation metadata whose fragment ID matches that of the ServiceInformation metadata contained in the received update notification message from among the existing ServiceInformation metadata registered in the metadata client database 122, and updates the existing ServiceInformation metadata using the ServiceInformation metadata contained in the update notification message (Step S10).

Next, the processing of distributing and updating the ServiceInformation metadata will be described in more detail while taking the ServiceInformation metadata before and after the update respectively shown in FIGS. 31 and 32 as an example.

FIG. 35 is a processing sequence of the IPTV server 110, and FIG. 36 is a processing sequence of the IPTV client terminal 120.

First, the metadata generation section 111 generates ServiceInformation metadata of the channel-B (FIG. 35: Step S11). The ServiceInformation metadata of the channel-B is a hierarchical part of the ServiceInformation element 72 below the serviceId attribute 74 whose value is "Channel-B" in FIG. 31. Subsequently, ServiceInformation metadata 34 of the channel-B generated by the metadata generation section 111 is registered in the metadata server database 112. In addition, at this time, a value "1234" of the fragmentId attribute 75 and a value "1001" of the fragmentVersion attribute 76 that are contained in the ServiceInformation metadata of the channel-B are stored in the metadata server database 112 as update management information 35.

Further, the metadata generation section 111 generates ServiceInformation metadata of the channel-C (FIG. 35: Step S12). The ServiceInformation metadata of the channel-C is a hierarchical part of the ServiceInformation element 73 below the serviceId attribute 74 whose value is "Channel-C" in FIG. 31. Subsequently, ServiceInformation metadata 36 of the channel-C generated by the metadata generation section 111 is registered in the metadata server database 112. In addition, at this time, a value "5678" of the fragmentId attribute 75 and a value "1010" of the fragmentVersion attribute 76 that are contained in the ServiceInformation metadata of the channel-C are stored in the metadata server database 112 as update management information 37.

Next, the metadata distribution section 113 reads out from the metadata server database 112 the ServiceInformation metadata 34 of the channel-B and the ServiceInformation metadata 36 of the channel-C, creates an update notification message 38 storing those pieces of ServiceInformation metadata 34 and 36 as updateDetail, and distributes it to the IPTV client terminal 120 via the network 130 (FIG. 35: Step S13).

In the IPTV client terminal 120, the metadata reception section 121 receives the update notification message 38 transmitted from the IPTV server 110 via the network 130 (FIG. 36: Step S14). The metadata reception section 121 registers in the metadata client database 122 the ServiceInformation metadata 34 of the channel-B and the ServiceInformation metadata 36 of the channel-C stored in the received update notification message 38 as updateDetail. At this time, the value "1234" of the fragmentId attribute 75 and the value "1001" of the fragmentVersion attribute 76 that are contained in the ServiceInformation metadata of the channel-B are stored as client-side update management information 39, and the value "5678" of the fragmentId attribute 75 and the value "1010" of the fragmentVersion attribute 76 that are contained in the ServiceInformation metadata of the channel-C are stored as client-side update management information 41.

An operation carried out thereafter in a case where the channel-B and the channel-C are subsumed as a single channel pack-D and the price is changed to 600 yen a month altogether is as follows.

The metadata generation section 111 generates ServiceInformation metadata of the channel-B on which a content of the change is reflected (FIG. 35: Step S15). The changed ServiceInformation metadata of the channel-B is a hierarchical part of the ServiceInformation element 72a below the serviceId attribute 74 whose value is "Channel-B" in FIG. 32. Specifically, as shown in FIG. 41, in the changed ServiceInformation metadata of the channel-B, the values of the fragmentId attribute 75 and the Name element 77 are the same as those from before the change. The value of the fragmentVersion attribute 76 is updated to a value that indicates the latest version after the update. The PurchaseItem element 91 that has been present before the update is deleted at the time of the change, and the ServicePackRef element 93 for defining the reference to the parental ServiceInformation (ServiceInformation metadata of channel pack-D) is added instead.

Subsequently, the updated ServiceInformation metadata 34' of the channel-B is registered in the metadata server database 112. At this time, the value "1234" of the fragmentId attribute 75 and the value "1011" of the fragmentVersion attribute 76 that are contained in the ServiceInformation metadata 34' of the channel-B are stored in the metadata server database 112 as server-side update management information 35'.

Further, the metadata generation section 111 generates ServiceInformation metadata of the channel-C on which the content of the change is reflected (FIG. 35: Step S16). The updated ServiceInformation metadata of the channel-C is a hierarchical part of the ServiceInformation element 73a below the serviceId attribute 74 whose value is "Channel-C" in FIG. 32. Specifically, as shown in FIG. 41, in the changed ServiceInformation metadata of the channel-C, the values of the fragmentId attribute 75 and the Name element 77 are the same as those from before the change. The value of the fragmentVersion attribute 76 is updated to a value that indicates the latest version after the update. The PurchaseItem element 91 that has been present previously is deleted at the time of the change, and the ServicePackRef element 93 for defining the reference to the parental ServiceInformation (ServiceInformation metadata of channel pack-D) is added instead.

Subsequently, ServiceInformation metadata 36' of the channel-C generated by the metadata generation section 111 is registered in the metadata server database 112. Further, at this time, the value "5678" of the fragmentId attribute 75 and the updated value "1011" of the fragmentVersion attribute that are contained in the ServiceInformation metadata 36' of the channel-C are stored in the metadata server database 112 as server-side update management information 37'.

After that, the metadata generation section 111 generates ServiceInformation metadata of the channel pack-D subsuming the channel-B and the channel-C (FIG. 35: Step S17). The ServiceInformation metadata of the channel pack-D is a hierarchical part of the ServiceInformation element 92 below the serviceId attribute whose value is "ServicePack-D" in FIG. 32. Specifically, in creating the ServiceInformation metadata of the channel pack-D, the metadata generation section 111 newly generates a value "ServicePack-D" of the serviceId attribute 74, a value "1375" of the fragmentId attribute 75, a value "1011" of the fragmentVersion attribute 76, the Name element 77, and the PurchaseItem element 94.

Subsequently, ServiceInformation metadata 42 of the channel pack-D generated by the metadata generation section 111 is registered in the metadata server database 112. Further, at this time, the value "1375" of the fragmentId attribute 75 and the value "1011" of the fragmentVersion attribute 76 that are contained in the ServiceInformation metadata 42 of the channel pack-D are stored in the metadata server database 112 as server-side update management information 43.

Next, the metadata distribution section 113 reads out from the metadata server database 112 the updated ServiceInformation metadata 34' of the channel-B, the updated ServiceInformation metadata 36' of the channel-C, and the ServiceInformation metadata 42 of the channel pack-D, creates an update notification message 44 storing those pieces of ServiceInformation metadata 34', 36' and 42 as updateDetail, and distributes it to the IPTV client terminal 120 via the network 130 (FIG. 35: Step S18).

In the IPTV client terminal 120, the metadata reception section 121 receives the update notification message 44 transmitted from the IPTV server 110 via the network 130 (FIG. 36: Step S19). The metadata reception section 121 replaces the ServiceInformation metadata 34 of the channel-B and the ServiceInformation metadata 36 of the channel-C already registered in the metadata client database 122 with the ServiceInformation metadata 34' of the channel-B and the ServiceInformation metadata 36' of the channel-C stored in the update notification message 44 as updateDetail, and newly registers in the metadata client database 122 the ServiceInformation metadata 42 of the channel pack-D stored in the update notification message 44 as updateDetail.

Accompanying this, among the pieces of update management information 39 of the ServiceInformation metadata of the channel-B that are stored in the metadata client database 122, the update management information 39 whose value "1001" of the fragmentVersion attribute 76 is updated to "1011" is stored as update management information 39'. In addition, among the pieces of update management information 41 of the ServiceInformation metadata of the channel-C that are stored in the metadata client database 122, the update management information 41 whose value "1010" of the fragmentVersion attribute 76 is updated to "1011" is stored as update management information 41'. Furthermore, update management information 45 of the ServiceInformation metadata of the channel pack-D is newly stored in the metadata client database 122.

More specifically, the update of the metadata client database 122 above is carried out as follows.

Descriptions will be given while taking the update of the ServiceInformation metadata of the channel-B as an example. The metadata reception section 121 acquires the value "1234" of the fragmentId attribute 75 contained in the ServiceInformation metadata 34' of the channel-B that is stored in the update notification message 44 as update Detail. The metadata reception section 121 next compares the value of the fragmentId attribute 75 with the update management information 39 and 41 stored in the metadata client database 122, and judges whether ServiceInformation metadata having the same fragmentId attribute 75 as the ServiceInformation metadata of the channel-B acquired from the update notification message 44 is stored in the metadata client database 122. When no relevant ServiceInformation metadata exists in the metadata client database 122, the metadata reception section 121 newly registers in the metadata client database 122 the ServiceInformation metadata of the channel-B acquired from the update notification message 44 as ServiceInformation metadata of a new channel, and stores update management information.

When the relevant ServiceInformation metadata exists in the metadata client database 122, the metadata reception section 121 compares the values of the fragmentVersion attributes 76 of those two. Upon judging that the version of the ServiceInformation metadata 34' of the channel-B acquired from the update notification message 44 is newer, the metadata reception section 121 replaces the already-registered ServiceInformation metadata 34 of the channel-B with the ServiceInformation metadata 34' of the channel-B acquired from the update notification message 44. Then, the metadata reception section 121 rewrites the value "1011" of the fragmentVersion attribute 76 contained in the ServiceInformation metadata 34' of the channel-B acquired from the update notification message 44 in the existing update management information 39, to thus obtain new update management information 39'.

This operation similarly applies in the case of updating the ServiceInformation metadata of the channel-C. In addition, the same holds true also for the case of updating the ServiceInformation metadata of the channel pack-D.

(Third Embodiment)

In the second embodiment above, the updated ServiceInformation metadata has been stored as updateDetail in the update notification message and the IPTV client terminal 120 has been notified of the update of the metadata. However, there is another method of distributing ServiceInformation metadata as follows. For example, it is also possible to store, as updateDetail of the update notification message, a query (retrieval request sentence with respect to database) that targets ServiceInformation metadata instead of the ServiceInformation metadata itself, and notify the IPTV client terminal 120 of the update of the metadata. In this case, the IPTV client terminal 120 can acquire the ServiceInformation metadata by transmitting the retrieval request that uses the query to the IPTV server 110. Hereinafter, the method above will be described as a third embodiment.

FIG. 37 is a diagram showing a structure of the IPTV system 100 according to the third embodiment. As shown in the figure, the IPTV system 100 is different from that of the second embodiment in that a metadata query processing section 115 is added to the IPTV server 110. The metadata query processing section 115 carries out processing of retrieving relevant ServiceInformation metadata from the metadata server database 112 based on a query request received from the IPTV client terminal 120, and transmitting it as a response to the IPTV client terminal 120.

Next, while referring to a flowchart of FIG. 38, distribution processing that uses a query of ServiceInformation metadata from the IPTV server 110 to the IPTV client terminal 120 and update processing thereof will be described.

First, in the IPTV server 110, the metadata generation section 111 generates ServiceInformation metadata of a broadcast channel (Step S21). The generated ServiceInformation metadata of the broadcast channel is stored in the metadata server database 112.

Subsequent to generation of a query that targets the ServiceInformation metadata stored in the metadata server database 112, the metadata distribution section 113 generates an update notification message containing that query (Step S22), and distributes the update notification message to the IPTV client terminal 120 via the network 130 (Step S23).

The metadata reception section 121 in the IPTV client terminal 120 receives the update notification message transmitted from the IPTV server 110 via the network 130, and extracts the query contained in the received update notification message (Step S24). Next, the metadata reception section 121 transmits a metadata retrieval request containing the extracted query to the IPTV server 110 (Step S25).

The metadata retrieval request transmitted from the IPTV client terminal 120 is received by the metadata query processing section 115. The metadata query processing section 115 transmits the query contained in the metadata retrieval request to the metadata server database 112 and acquires relevant ServiceInformation metadata from the metadata server database 112 (Step S26). The metadata query processing section 115 distributes the acquired ServiceInformation metadata to the IPTV client terminal 120 as a response to the metadata retrieval request (Step S27).

Upon acquiring the ServiceInformation metadata as the response to the metadata retrieval request, the metadata reception section 121 in the IPTV client terminal 120 registers it in the metadata client database 122 (Step S28).

When updated ServiceInformation metadata is generated by the metadata generation section 111 in the IPTV server 110 (Step S29), the updated ServiceInformation metadata is stored in the metadata server database 112.

Subsequent to generation of a query that targets the updated ServiceInformation metadata stored in the metadata server database 112, the metadata distribution section 113 generates an update notification message containing that query (Step S30) and distributes the update notification message to the IPTV client terminal 120 via the network 130 (Step S31).

The metadata reception section 121 in the IPTV client terminal 120 receives the update notification message transmitted from the IPTV server 110 via the network 130 and extracts the query contained in the received update notification message (Step S32). Next, the metadata reception section 121 transmits a metadata retrieval request containing the extracted query to the IPTV server 110 (Step S33).

The metadata retrieval request transmitted from the IPTV client terminal 120 is received by the metadata query processing section 115. The metadata query processing section 115 transmits the query contained in the metadata retrieval request to the metadata server database 112 and acquires the updated ServiceInformation metadata from the metadata server database 112 (Step S34). The metadata query processing section 115 distributes the acquired ServiceInformation metadata to the IPTV client terminal 120 as a response to the metadata retrieval request (Step S35).

Upon acquiring the updated ServiceInformation metadata as the response to the metadata retrieval request, the metadata reception section 121 in the IPTV client terminal 120 retrieves, from among the pieces of ServiceInformation metadata registered in the metadata client database 122, ServiceInformation metadata whose fragmentId matches that of the acquired ServiceInformation metadata, and updates the existing ServiceInformation metadata by the acquired ServiceInformation metadata (Step S36).

Next, the processing of distributing and updating the ServiceInformation metadata above will be described in more detail while taking the ServiceInformation metadata before and after the update shown in FIGS. 39 and 40 as an example.

FIG. 39 is a processing sequence in the IPTV server 110, and FIG. 40 is a processing sequence in the IPTV client terminal 120.

First, the metadata generation section 111 generates ServiceInformation metadata of the channel-B (FIG. 39: Step S41). The ServiceInformation metadata of the channel-B is a hierarchical part of the ServiceInformation element 72 below the serviceId attribute 74 whose value is "Channel-B" in FIG. 31. Subsequently, the ServiceInformation metadata 34 of the channel-B generated by the metadata generation section 111 is registered in the metadata server database 112. In addition, at this time, a value "1234" of the fragmentId attribute 75 and a value "1001" of the fragmentVersion attribute 76 that are contained in the ServiceInformation metadata of the channel-B are stored in the metadata server database 112 as the update management information 35.

Further, the metadata generation section 111 generates ServiceInformation metadata of the channel-C (FIG. 39: Step S42). The ServiceInformation metadata of the channel-C is a hierarchical part of the ServiceInformation element 73 below the serviceId attribute 74 whose value is "Channel-C" in FIG. 31. Subsequently, the ServiceInformation metadata 36 of the channel-C generated by the metadata generation section 111 is registered in the metadata server database 112.

In addition, at this time, a value "5678" of the fragmentId attribute 75 and a value "1010" of the fragmentVersion attribute 76 that are contained in the ServiceInformation metadata of the channel-C are stored in the metadata server database 112 as the update management information 37.

Next, the metadata distribution section 113 generates queries that target the ServiceInformation metadata 34 of the channel-B and the ServiceInformation metadata 36 of the channel-C from the metadata server database 112, creates an update notification message 38a storing those queries as updateDetail, and distributes the update notification message 38a to the IPTV client terminal 120 via the network 130 (FIG. 39: Step S43).

In the IPTV client terminal 120, the metadata reception section 121 receives the update notification message 38a transmitted from the IPTV server 110 via the network 130 (FIG. 40: Step S44). The metadata reception section 121 extracts the queries stored in the received update notification message 38a as updateDetail and transmits a metadata retrieval request containing those queries to the IPTV server 110 (FIG. 40: Step S45).

The metadata retrieval request transmitted from the IPTV client terminal 120 is received by the metadata query processing section 115. The metadata query processing section 115 transmits the queries contained in the metadata retrieval request to the metadata server database 112 and acquires, from the metadata server database 112, the ServiceInformation metadata 34 of the channel-B and the ServiceInformation metadata 36 of the channel-C. The metadata query processing section 115 distributes the acquired ServiceInformation metadata 34 of the channel-B and ServiceInformation metadata 36 of the channel-C to the IPTV client terminal 120 as a response to the metadata retrieval request.

In the IPTV client terminal 120, upon receiving the ServiceInformation metadata 34 of the channel-B and the ServiceInformation metadata 36 of the channel-C as a response to the metadata retrieval request (FIG. 40: Step S46), the metadata reception section 121 registers those pieces of ServiceInformation metadata 34 and 36 in the metadata client database 122. At this time, the value "1234" of the fragmentId attribute 75 and the value "1001" of the fragmentVersion attribute 76 that are contained in the ServiceInformation metadata of the channel-B are stored as the client-side update management information 39, and the value "5678" of the fragmentId attribute 75 and the value "1010" of the fragmentVersion attribute 76 that are contained in the ServiceInformation metadata of the channel-C are stored as the client-side update management information 41.

An operation carried out thereafter in a case where the channel-B and the channel-C are subsumed as a single channel pack-D and the price is changed to 600 yen a month altogether is as follows.

The metadata generation section 111 generates ServiceInformation metadata of the channel-B on which a content of the change is reflected (FIG. 39: Step S47).

The changed ServiceInformation metadata of the channel-B is a hierarchical part of the ServiceInformation element 72a below the serviceId attribute 74 whose value is "Channel-B" in FIG. 32. Specifically, as shown in FIG. 41, in the changed ServiceInformation metadata of the channel-B, the values of the fragmentId attribute 75 and the Name element 77 are the same as those from before the change. The value of the fragmentVersion attribute 76 is updated to a value that indicates the latest version after the update. The PurchaseItem element 91 that has been present previously is deleted at the time of the change, and the ServicePackRef element 93 for defining the reference to the parental ServiceInformation (ServiceInformation metadata of channel pack-D) is added instead.

Subsequently, the updated ServiceInformation metadata 34' of the channel-B is registered in the metadata server database 112. At this time, the value "1234" of the fragmentId attribute 75 and the value "1011" of the fragmentVersion attribute 76 that are contained in the ServiceInformation metadata 34' of the channel-B are stored in the metadata server database 112 as the server-side update management information 35'.

Further, the metadata generation section 111 generates ServiceInformation metadata of the channel-C on which the content of the change is reflected (FIG. 39: Step S48). The changed ServiceInformation metadata of the channel-C is a hierarchical part of the ServiceInformation element 73a below the serviceId attribute 74 whose value is "Channel-C" in FIG. 32.

Specifically, as shown in FIG. 41, in the changed ServiceInformation metadata of the channel-C, the values of the fragmentId attribute 75 and the Name element 77 are the same as those from before the change. The value of the fragmentVersion attribute 76 is updated to a value that indicates the latest version after the update. The PurchaseItem element 91 that has been present previously is deleted at the time of the change, and the ServicePackRef element 93 for defining the reference to the parental ServiceInformation (ServiceInformation metadata of channel pack-D) is added instead.

Subsequently, the ServiceInformation metadata 36' of the channel-C generated by the metadata generation section 111 is registered in the metadata server database 112. Further, at this time, the value "5678" of the fragmentId attribute 75 and the updated value "1011" of the fragmentVersion attribute 76 that are contained in the ServiceInformation metadata 36' of the channel-C are stored in the metadata server database 112 as the server-side update management information 37'.

After that, the metadata generation section 111 generates ServiceInformation metadata of the channel pack-D subsuming the channel-B and the channel-C (FIG. 39: Step S49). The ServiceInformation metadata of the channel pack-D is a hierarchical part of the ServiceInformation element 92 below the serviceId attribute 74 whose value is "ServicePack-D" in FIG. 32. Specifically, in creating the ServiceInformation metadata of the channel pack-D, the metadata generation section 111 newly generates a value "ServicePack-D" of the serviceId attribute 74, a value "1375" of the fragmentId attribute 75, a value "1011" of the fragmentVersion attribute 76, the Name element 77, and the PurchaseItem element 94.

Subsequently, the ServiceInformation metadata 42 of the channel pack-D generated by the metadata generation section 111 is registered in the metadata server database 112. Further, at this time, the value "1375" of the fragmentId attribute 75 and the value "1011" of the fragmentVersion attribute 76 that are contained in the ServiceInformation metadata 42 of the channel pack-D are stored in the metadata server database 112 as the server-side update management information 43.

Next, the metadata distribution section 113 generates a query that targets the updated ServiceInformation metadata 34' of the channel-B, a query that targets the updated ServiceInformation metadata 36' of the channel-C, and a query that targets the ServiceInformation metadata 42 of the channel pack-D, that are stored in the metadata server database 112, creates an update notification message 44a storing those queries as updateDetail, and distributes the update notification message 44a to the IPTV client terminal 120 via the network 130 (FIG. 39: Step S50).

In the IPTV client terminal 120, the metadata reception section 121 receives the update notification message 44a transmitted from the IPTV server 110 via the network 130 (FIG. 40: Step S51). The metadata reception section 121 extracts the queries stored in the received update notification message 44a as updateDetail and transmits a metadata retrieval request containing those queries to the IPTV server 110 (FIG. 40: Step S52).

The metadata retrieval request transmitted from the IPTV client terminal 120 is received by the metadata query processing section 115. The metadata query processing section 115 transmits the queries contained in the metadata retrieval request to the metadata server database 112 and acquires, from the metadata server database 112, the updated ServiceInformation metadata 34' of the channel-B, the updated ServiceInformation metadata 36' of the channel-C, and the ServiceInformation metadata 42 of the channel pack-D. The metadata query processing section 115 distributes the acquired pieces of ServiceInformation metadata 34', 36', and 42 to the IPTV client terminal 120 as a response to the metadata retrieval request.

In the IPTV client terminal 120, upon receiving the updated ServiceInformation metadata 34' of the channel-B, the updated ServiceInformation metadata 36' of the channel-C, and the ServiceInformation metadata 42 of the channel pack-D as a response to the metadata retrieval request (FIG. 40: Step S53), the metadata reception section 121 replaces the ServiceInformation metadata 34 of the channel-B and the ServiceInformation metadata 36 of the channel-C that are already registered in the metadata client database 122 with the received pieces of ServiceInformation metadata 34' and 36' of the channel-B and the channel-C, respectively, and newly registers the received ServiceInformation metadata 42 of the channel pack-D in the metadata client database 122.

Accompanying this, among the pieces of update management information 39 of the ServiceInformation metadata of the channel-B that are stored in the metadata client database 122, the update management information 39 whose value "1001" of the fragmentVersion attribute 76 is updated to "1011" is stored as the update management information 39'. In addition, among the pieces of update management information 41 of the ServiceInformation metadata of the channel-C that are stored in the metadata client database 122, the update management information 41 whose value "1010" of the fragmentVersion attribute 76 is updated to "1011" is stored as the update management information 41'. Furthermore, update management information 45 of the ServiceInformation metadata of the channel pack-D is newly stored in the metadata client database 122.

Modified Example 2 of Second Embodiment

In the ServiceInformation in the second embodiment, the PurchaseItem element and the ServicePackRef element have been newly introduced for describing the structure of the channel pack subsuming the plurality of broadcast channels. However, description of a similar structure is also possible even as follows.

FIG. 42 is a diagram showing an example of a case where the structure of the channel pack is replaced not with the ServiceInformation metadata but with GroupInformation metadata.

Originally, GroupInformation is used when describing attributes of groups obtained by grouping a plurality of programs (contents) described in ProgramInformation, or designed to describe information on a group obtained by combining a plurality of pieces of GroupInformation describing a program group to make such a group. The GroupInformation originally contains the PurchaseItem element describing the information on the price. Therefore, by using the GroupInformation, the PurchaseItem element does not need to be newly introduced as in the case of using the ServiceInformation. In this regard, the GroupInformation can be used for describing the structure of the channel pack. However, according to a definition of the GroupInformation in TV-Anytime, a child of the GroupInformation is normally ProgramInformation or GroupInformation that have a memberOf element (ProgramInformation/memberOf or GroupInformation/memberOf) as an element storing a pointer for referencing its own parental GroupInformation. In this regard, the ServiceInformation is employed for the metadata of the broadcast channels so that, by describing the reference to the GroupInformation metadata of the channel pack as the parent as a value of the memberOf element, the structure of the channel pack subsuming the plurality of broadcast channels can be described in the same manner as in the second embodiment.

FIG. 43 is a diagram showing a specific example of a case where metadata equivalent to that of FIG. 32 is described using GroupInformation metadata.

As shown in the figure, the ServiceInformation metadata after the change contains the ServiceInformationTable element 71a and a GroupInformationTable element 97. The ServiceInformationTable element 71a includes the ServiceInformation elements 72a and 73a of the plurality of broadcast channels. The ServiceInformation elements 72a and 73a of the respective broadcast channels each include the serviceId attribute 74 for identifying a service, the fragmentId attribute 75 for identifying a fragment, the fragmentVersion attribute 76 that indicates a version of the fragment, the Name element 77 describing the name of the broadcast channel, and the memberOf element 93.

On the other hand, the Group InformationTable element 97 includes a Groupinformation element 98. The Groupinformation element 98 includes a groupId attribute 151 for identifying a group, a fragmentId attribute 152 for identifying a fragment, a fragmentVersion attribute 153 that indicates a version of the fragment, a GroupType element 99 describing a group type, and a BasicDescription element 141. The BasicDescription element 141 includes a PurchaseItem element 142. The PurchaseItem element 142 includes a Price element 143 describing a price and a Purchase element 144 describing information on the price, such as monthly payment.

The present invention is not limited only to the above embodiments, and it is of course possible to add various updates without departing from the gist of the present invention.

BRIEF DESCRIPTION OF DRAWINGS

[FIG. 2] A diagram showing an example of an XML schema that defines a format of an update notification message.

[FIG. 8] A diagram showing a full-update notification message of transactionId=01 (initial state), data on which the full-update information is reflected, and a model thereof.

[FIG. 9] A diagram showing a differential-update notification message of transactionId=02, data on which the differential update is reflected, and a model thereof.

[FIG. 10] A diagram showing a differential-update notification message of transactionId=03, data on which the differential update is reflected, and a model thereof.

[FIG. 12] A diagram showing a full-update notification message of transactionId=04, data on which the full update is reflected, and a model thereof.

[FIG. 32] A diagram showing an example of ServiceInformation metadata after update, with respect to FIG. 31.

Figure 1:
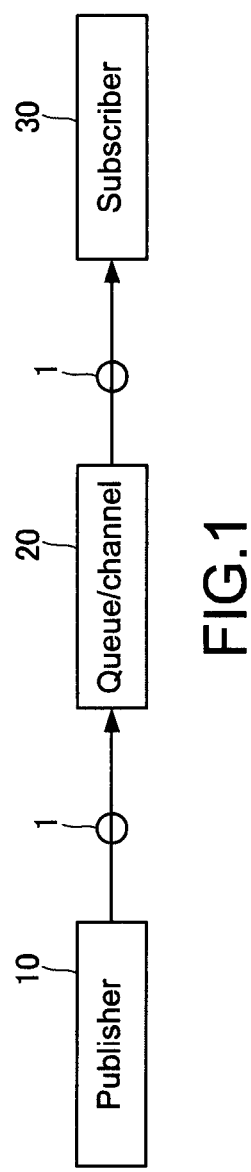
[FIG. 1] A diagram showing a model of an update notification distribution system of a content or metadata of the content according to an embodiment of the present invention.
Figure 3:
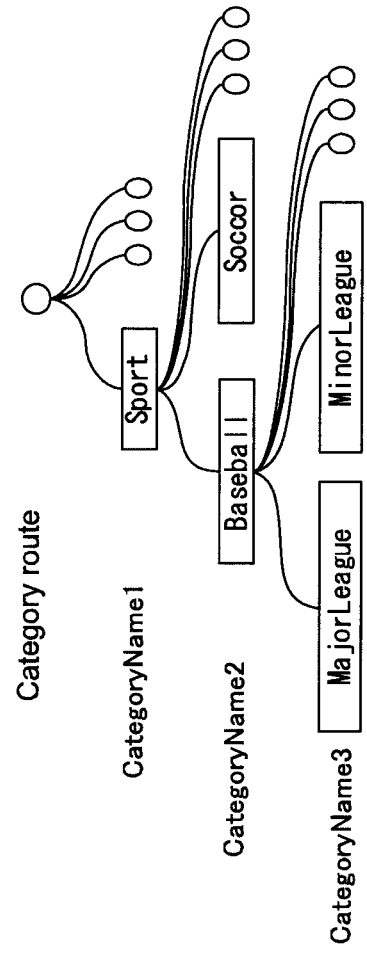
[FIG. 3] A diagram showing an example of a category hierarchy of an SNS-X site.
Figure 4:
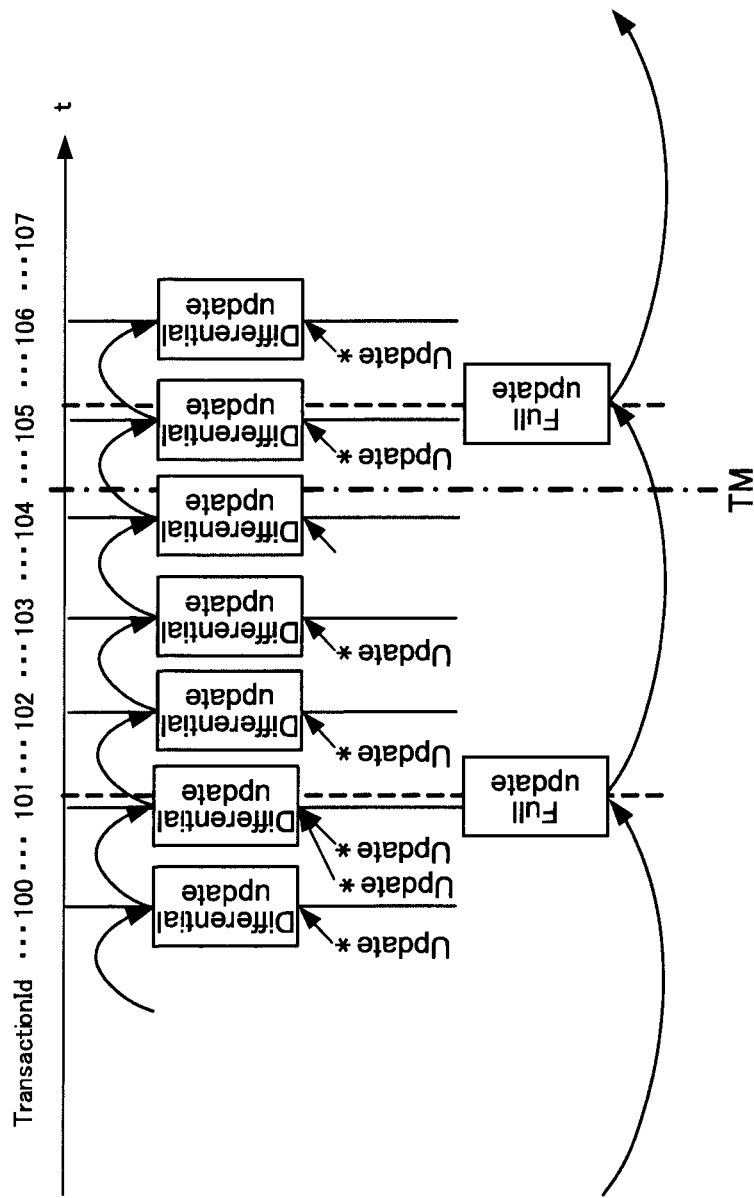
[FIG. 4] A sequence diagram of update processing using both a full-update and a differential-update.
Figure 5:
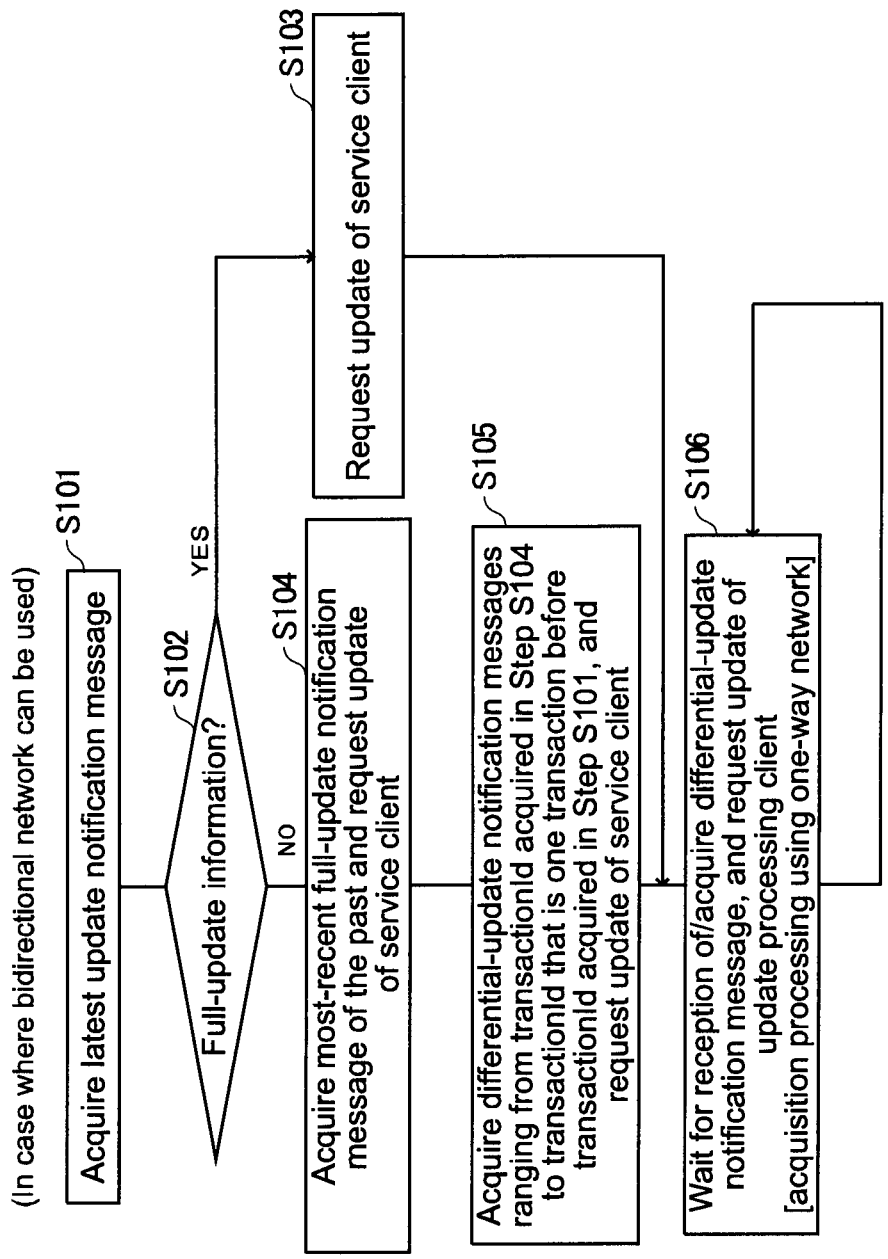
[FIG. 5] A diagram showing a processing sequence of a subscriber in a case where data synchronization is carried out.
Figure 6:
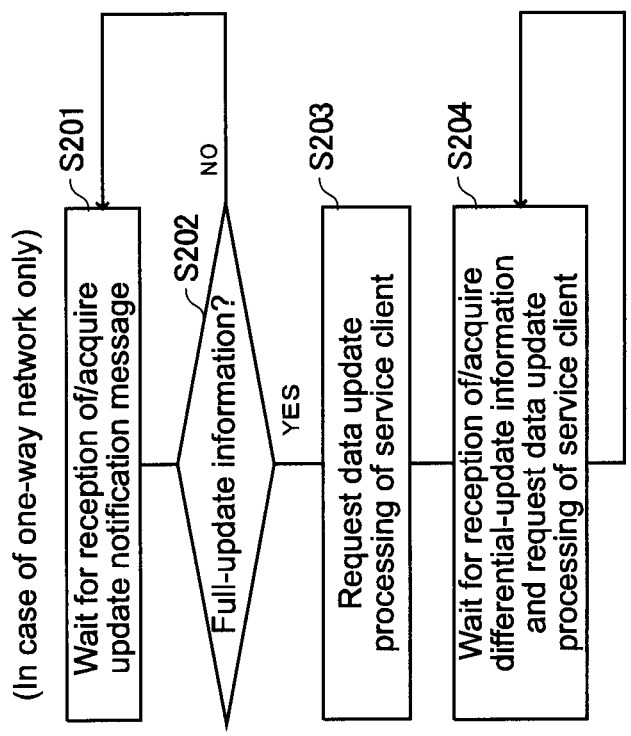
[FIG. 6] A diagram showing a processing sequence of the subscriber in a case where the data synchronization is carried out in an environment that can only use a one-way network.
Figure 7:
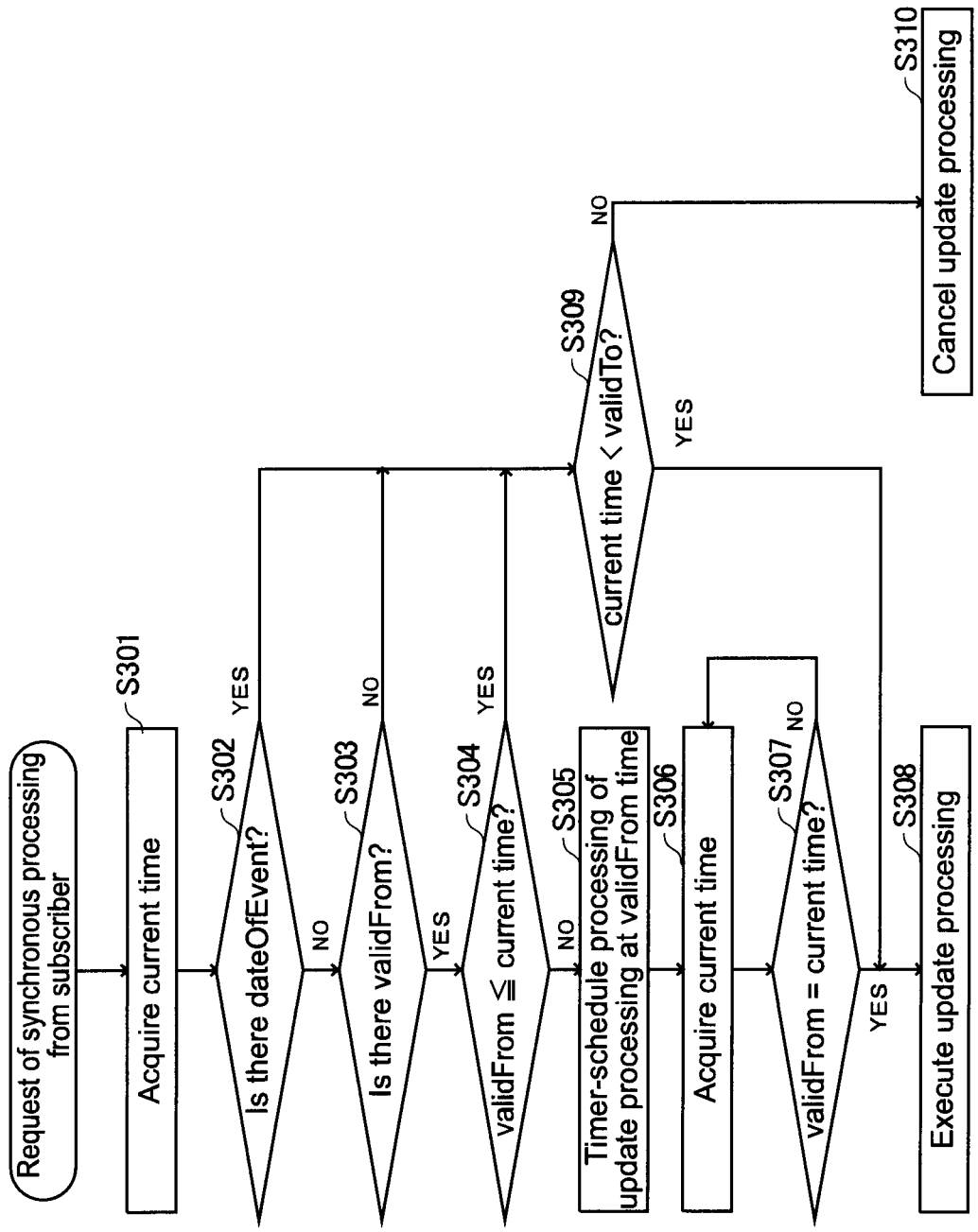
[FIG. 7] A flowchart on time control of the update processing in a service client.
Figure 11:
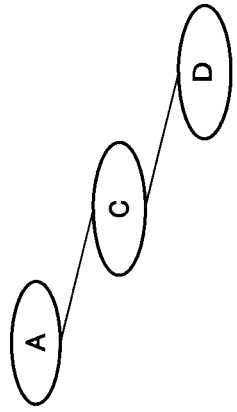
[FIG. 11] A diagram showing a differential-update notification message of transactionId=04, data on which the differential update is reflected, and a model thereof.
Figure 13:
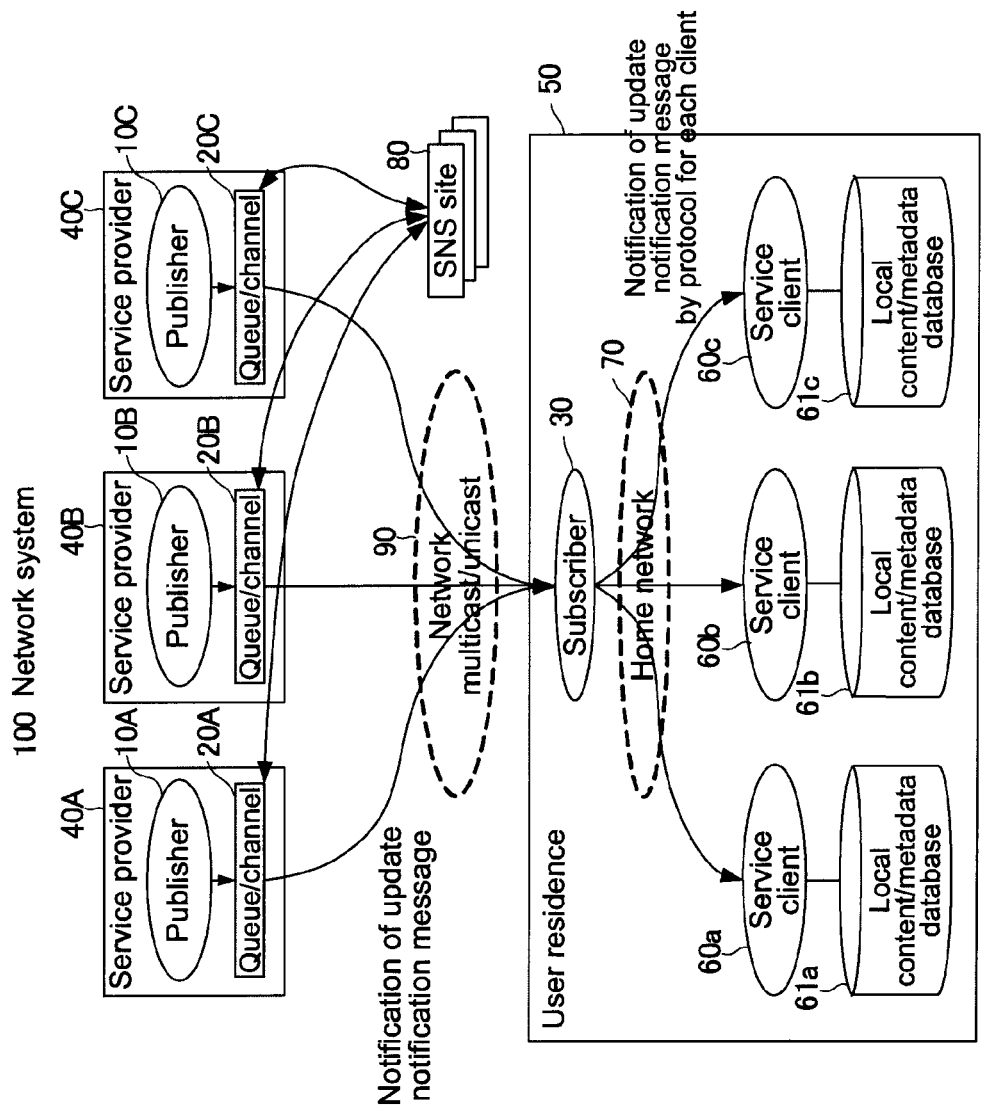
[FIG. 13] A block diagram showing a structure of a network system as the embodiment of the present invention.
Figure 14:
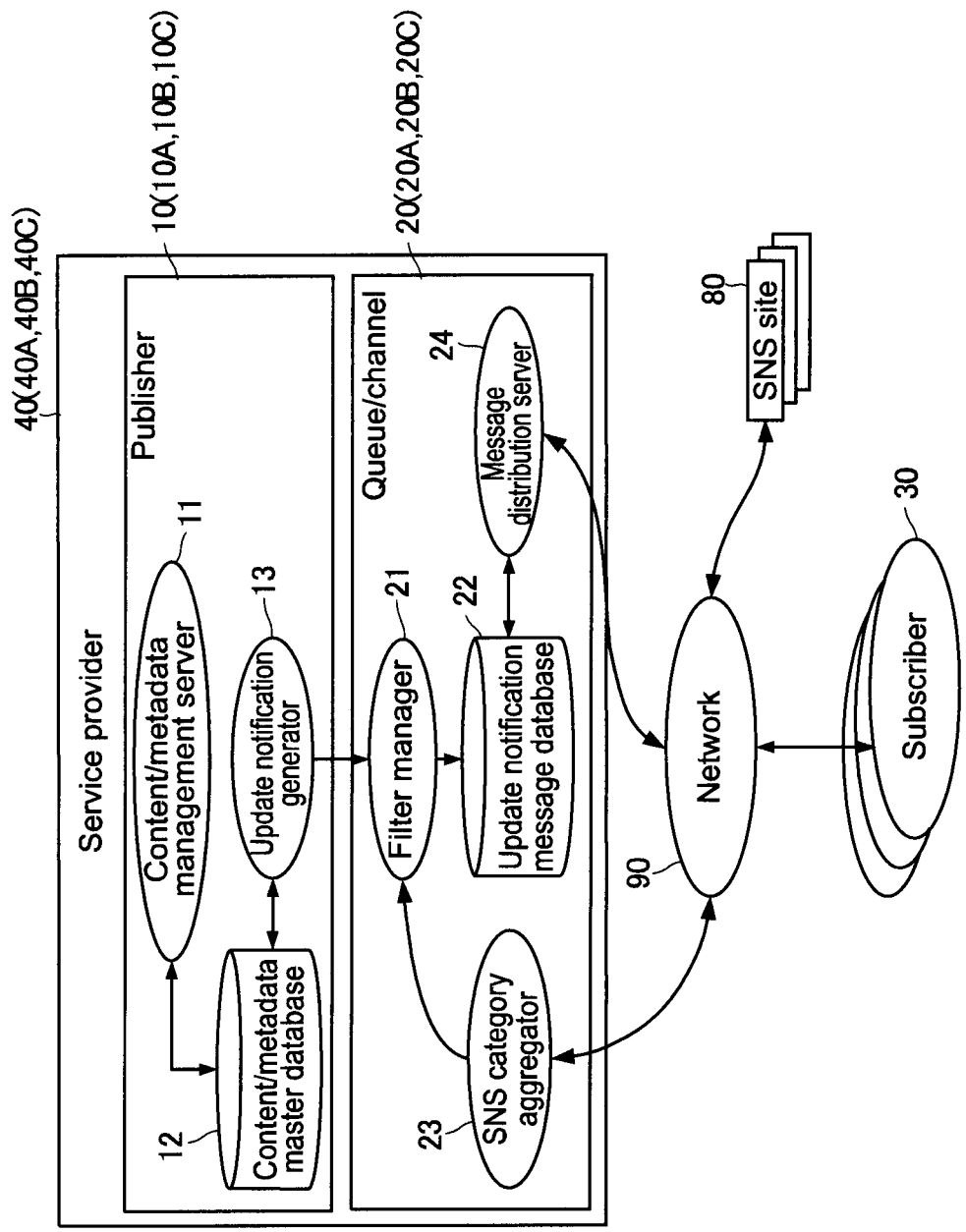
[FIG. 14] A diagram showing a structure of a service provider.
Figure 15:
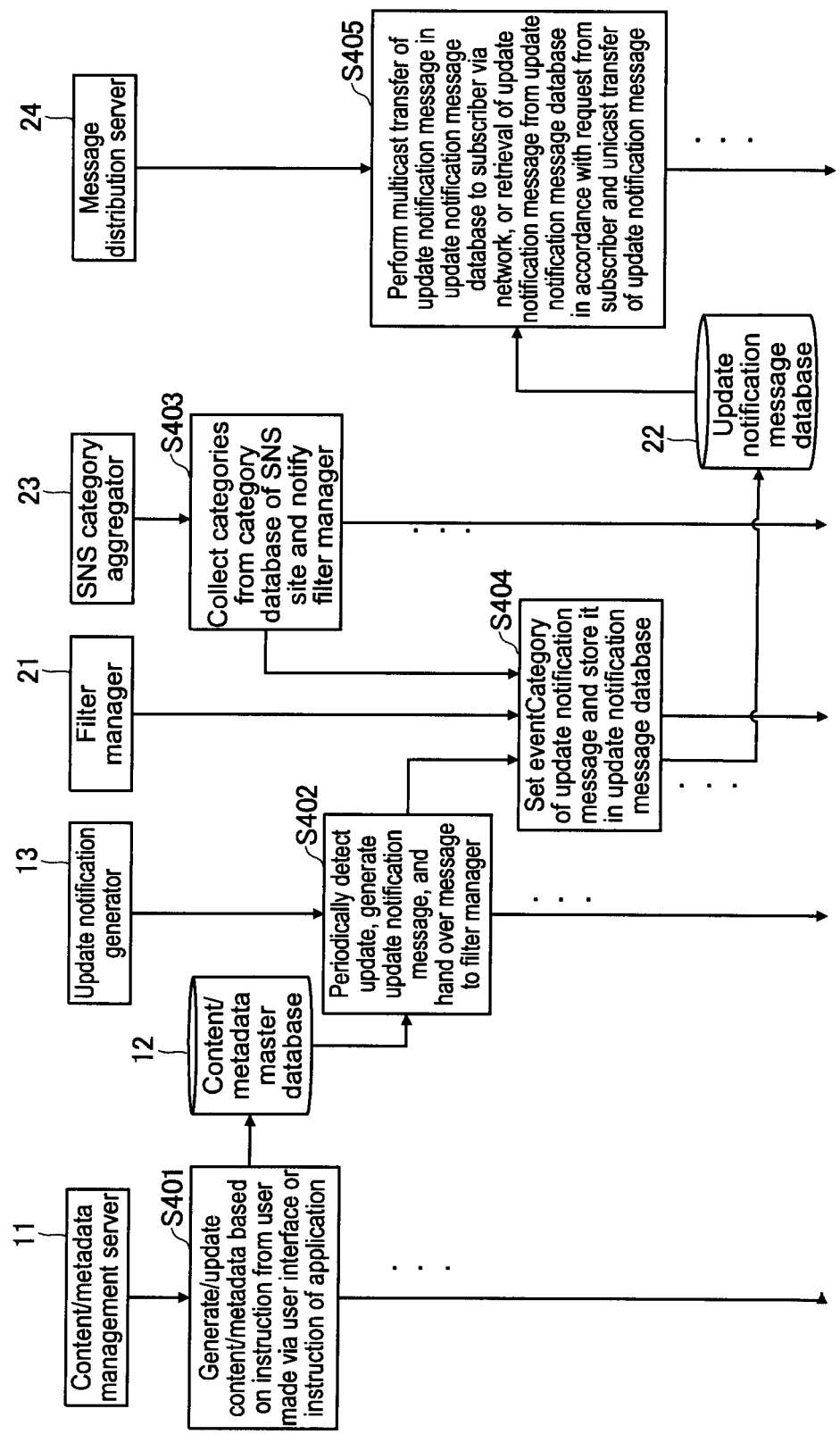
[FIG. 15] A processing sequence diagram of the service provider.
Figure 16:
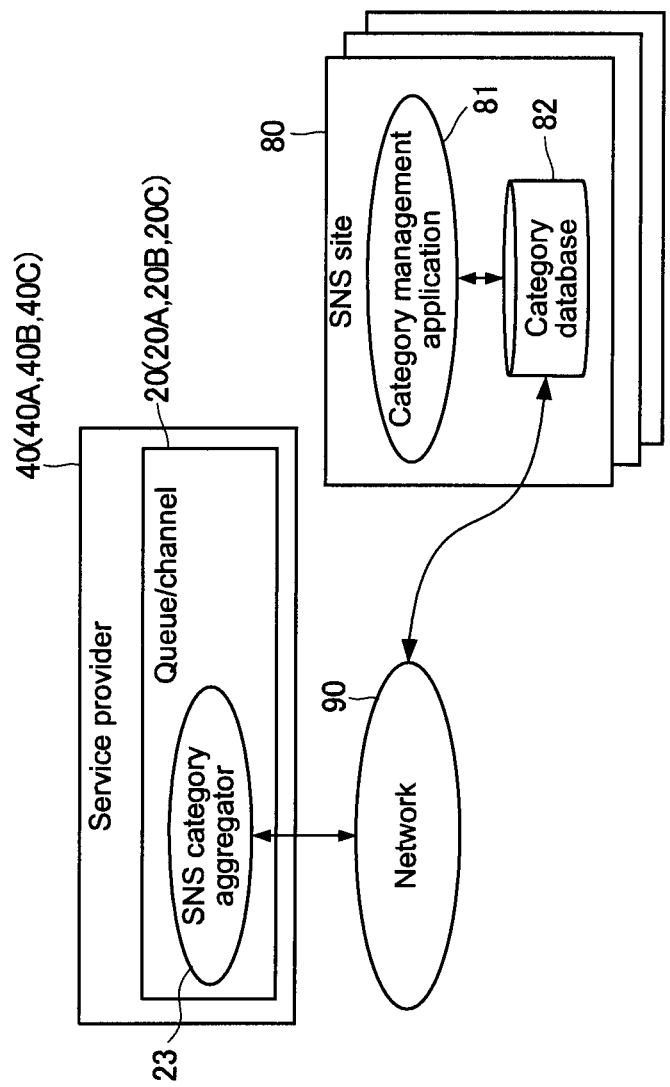
[FIG. 16] A diagram showing a structure of an SNS category aggregator and an SNS site.
Figure 17:
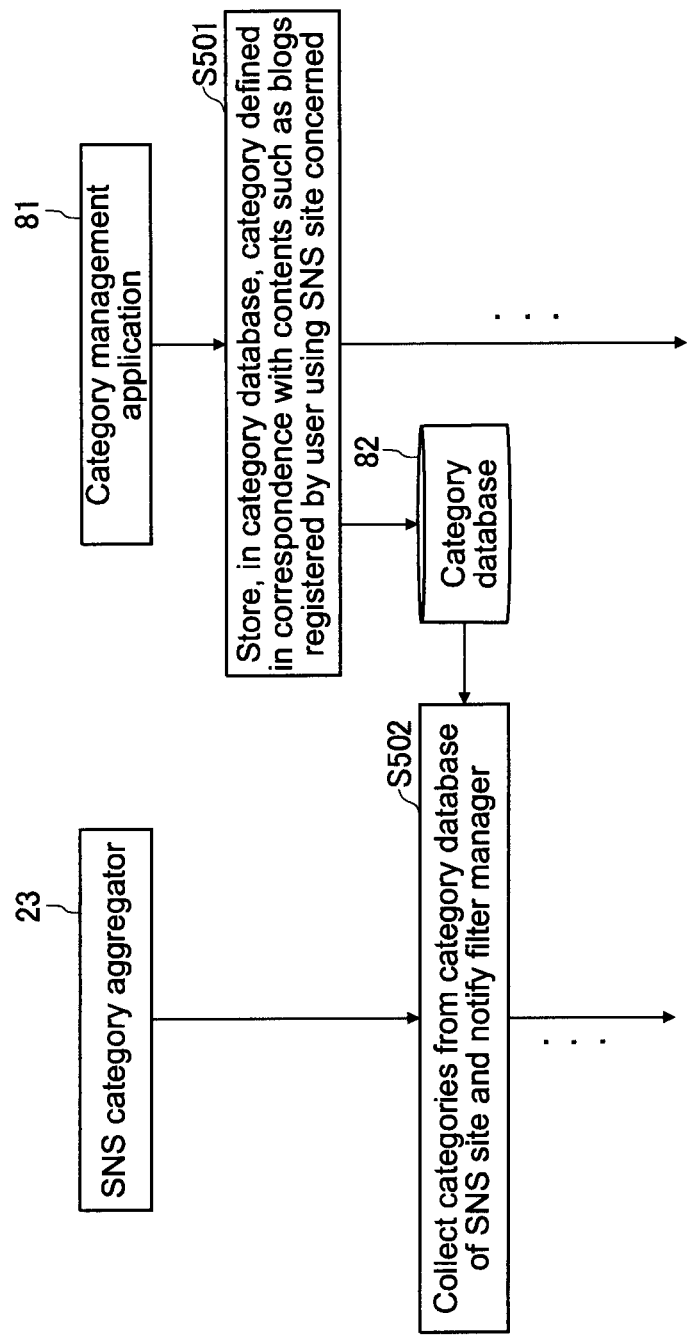
[FIG. 17] A sequence diagram of processing of the SNS category aggregator, for collecting categories from a category database of the SNS site.
Figure 18:
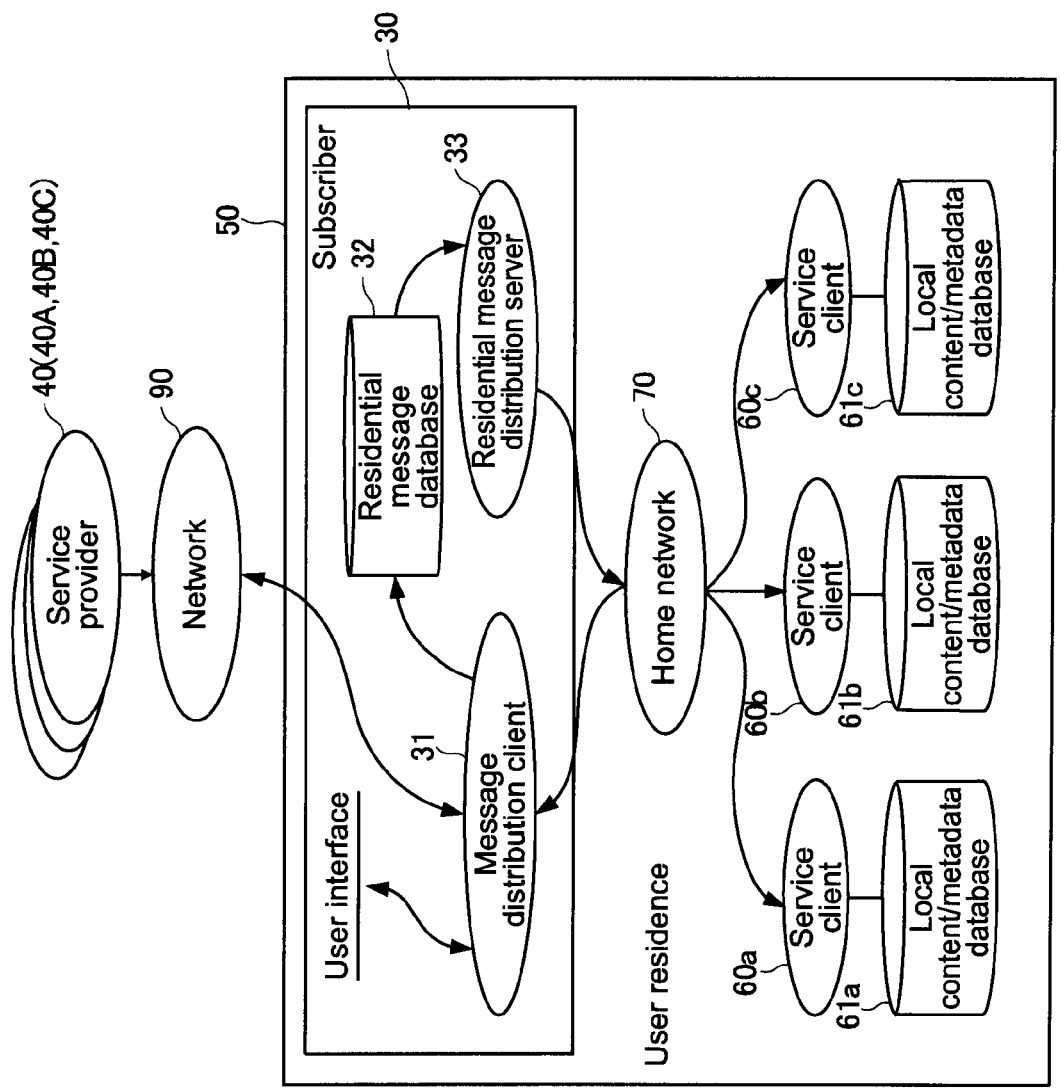
[FIG. 18] A diagram showing a structure of a home-network-side appliance.
Figure 19:
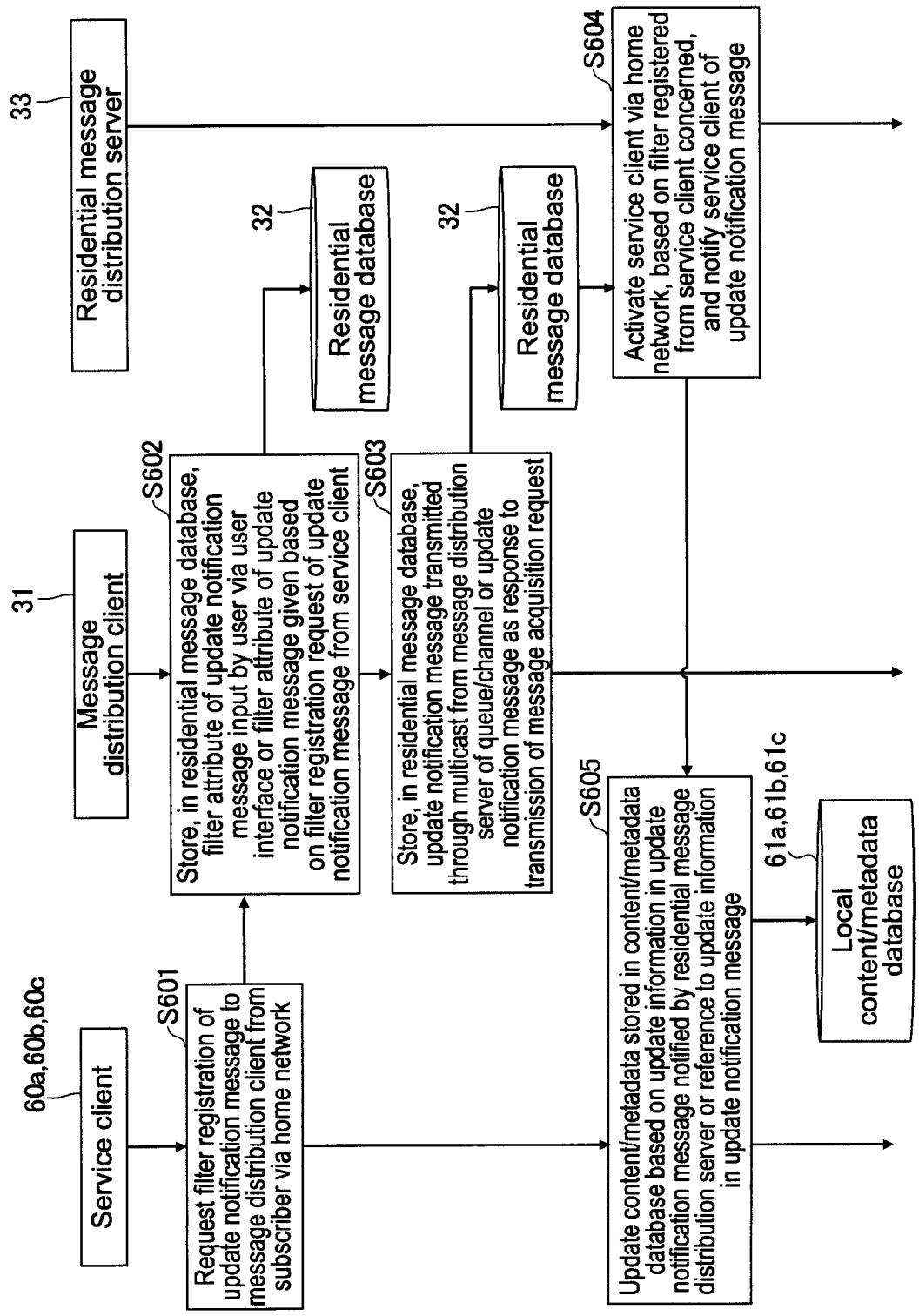
[FIG. 19] A diagram showing a processing sequence diagram of the home-network-side appliance.
Figure 20:
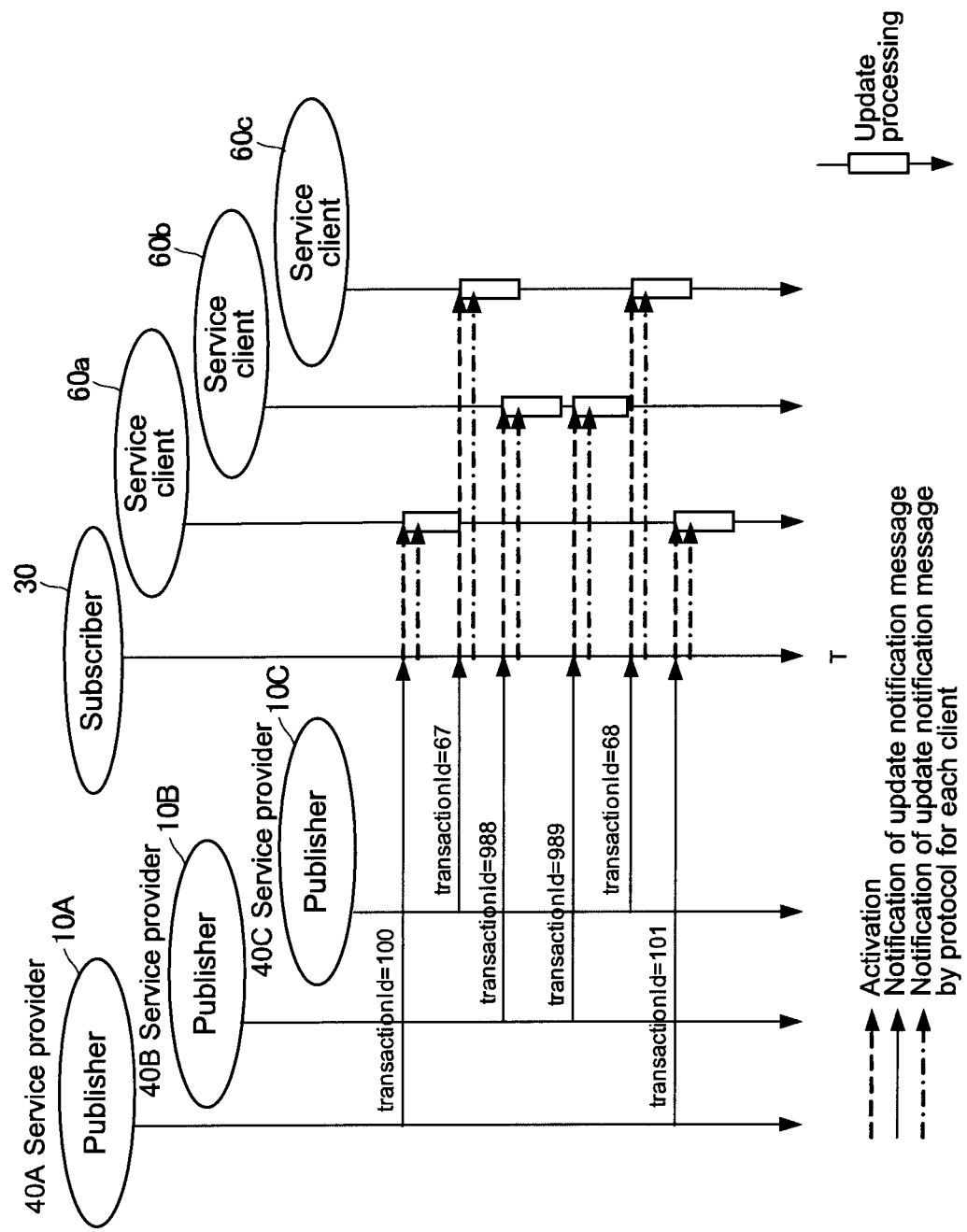
[FIG. 20] A diagram showing an example of notification of the update notification message among a plurality of service providers and a plurality of service clients.
Figure 21:
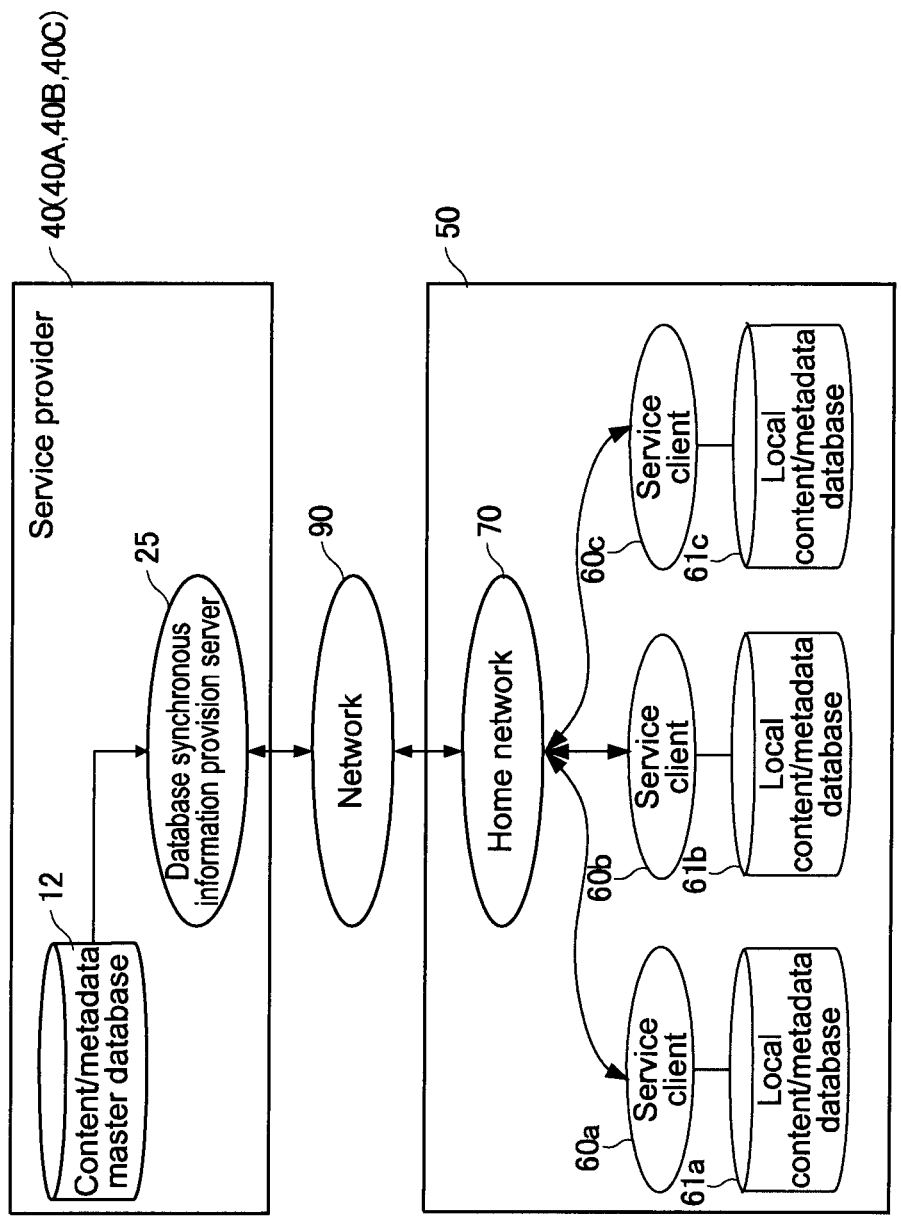
[FIG. 21] A diagram showing a structure for content/metadata update processing that is based on a reference to the update information within the update notification message.
Figure 22:
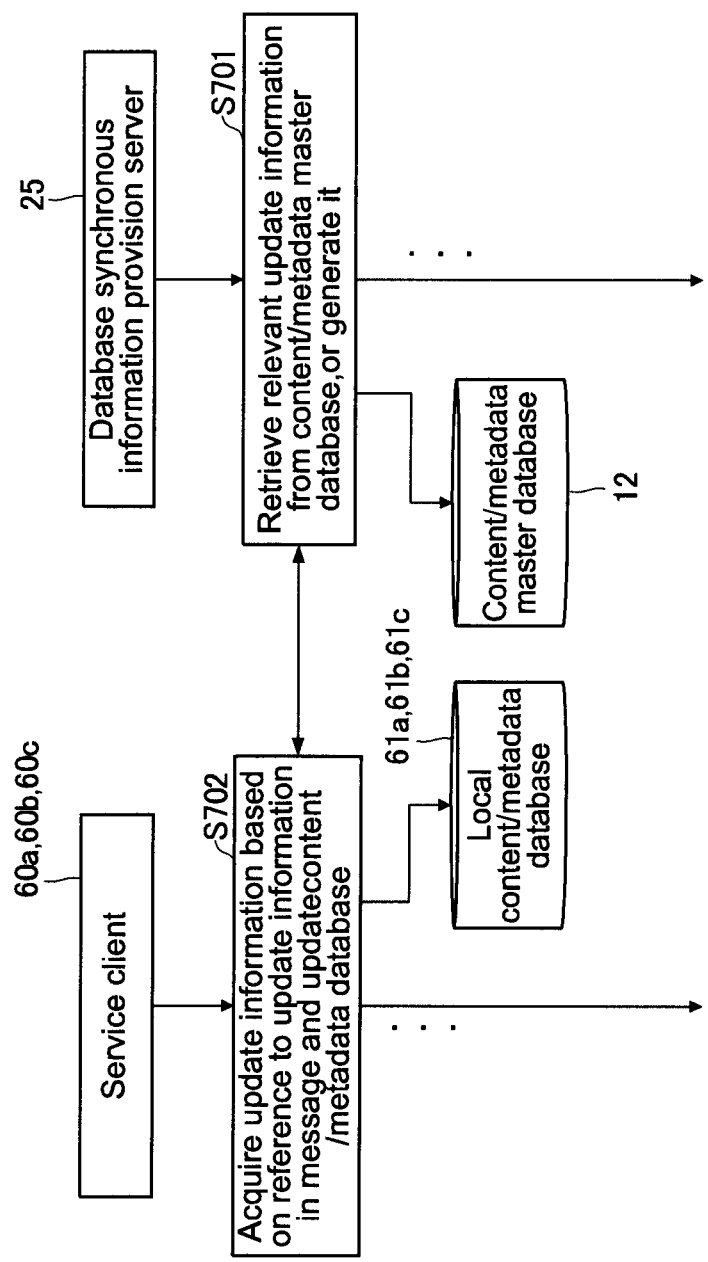
[FIG. 22] A sequence diagram of the content/metadata update processing that is based on the reference to the update information within the update notification message.
Figure 23:
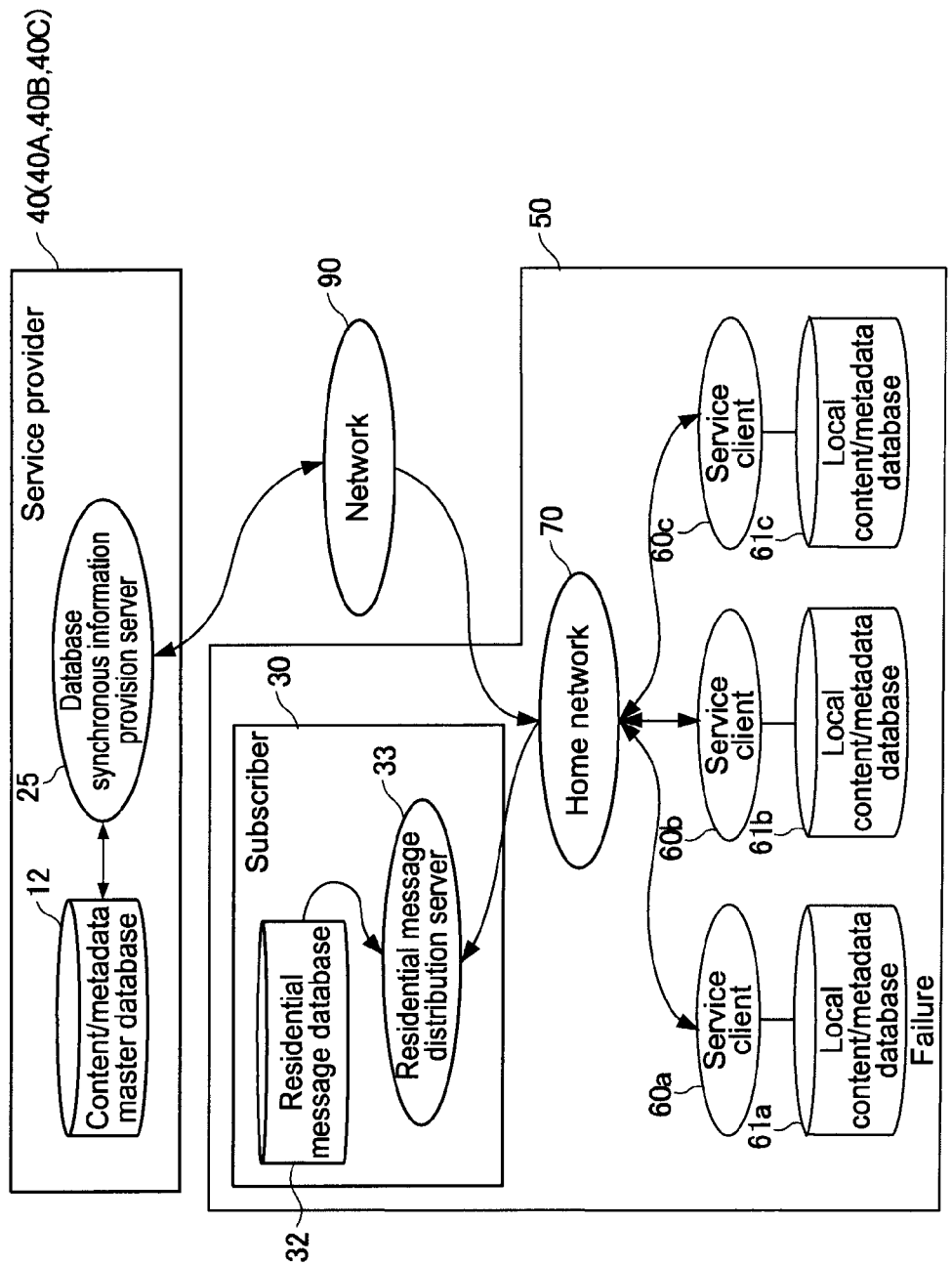
[FIG. 23] A diagram showing a structure for failure recovery processing in a case where a failure occurs in a local content/metadata database of the service client.
Figure 24:
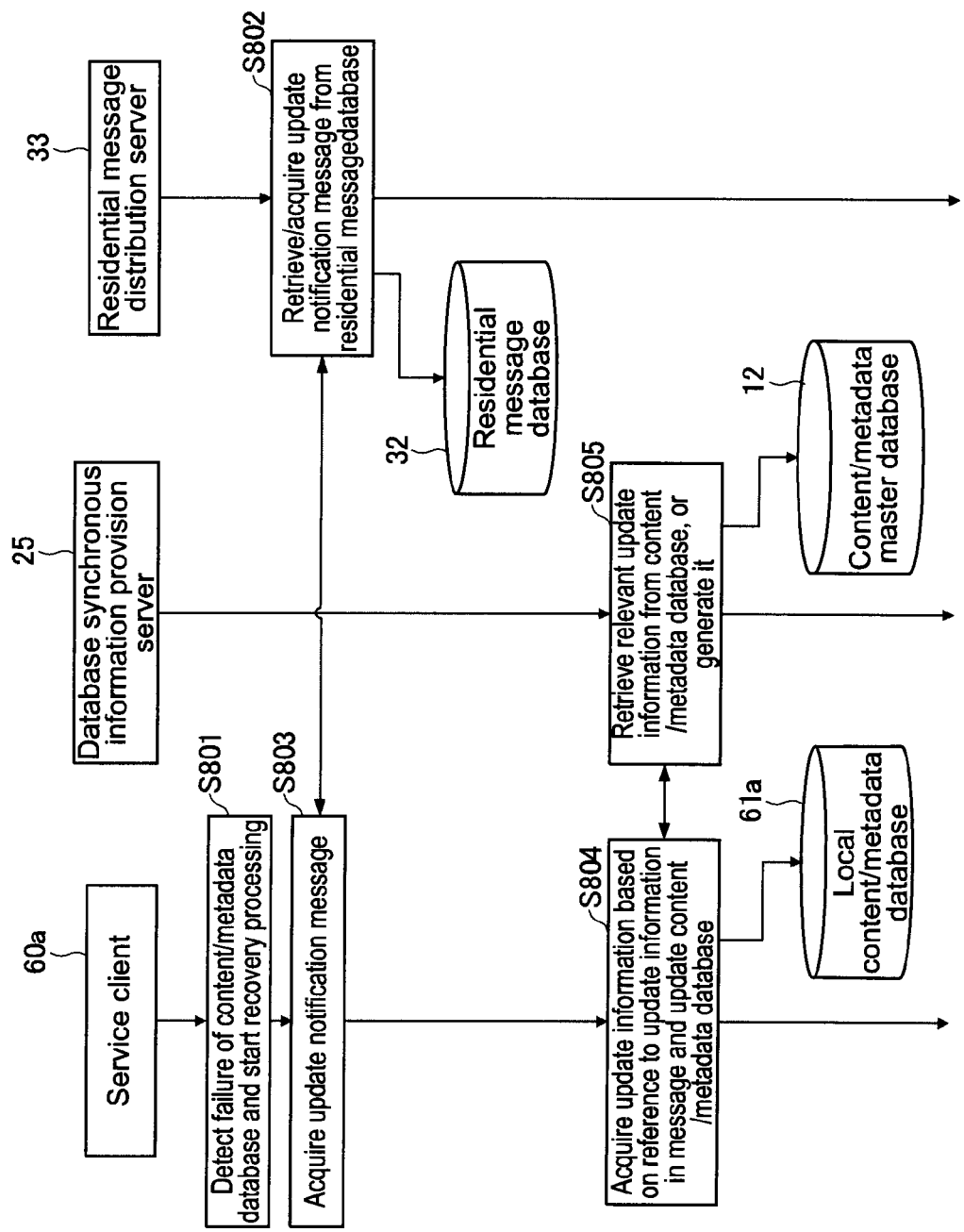
[FIG. 24] A sequence diagram of the failure recovery processing.
Figure 25:
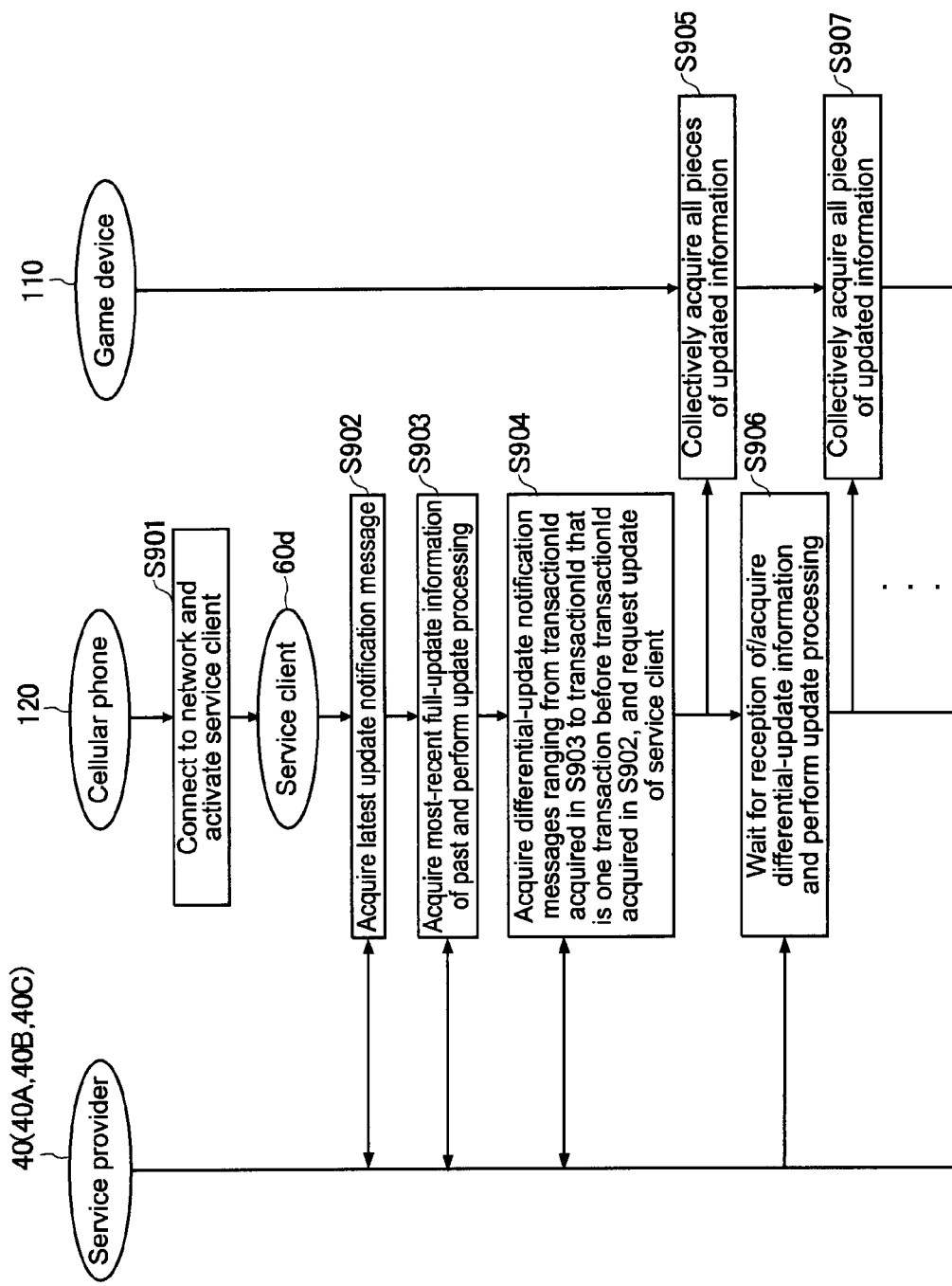
[FIG. 25] A diagram showing an update sequence in a form in which a service client implemented on a cellular phone representatively carries out the update processing of the content or metadata stored in a game device.
Figure 26:
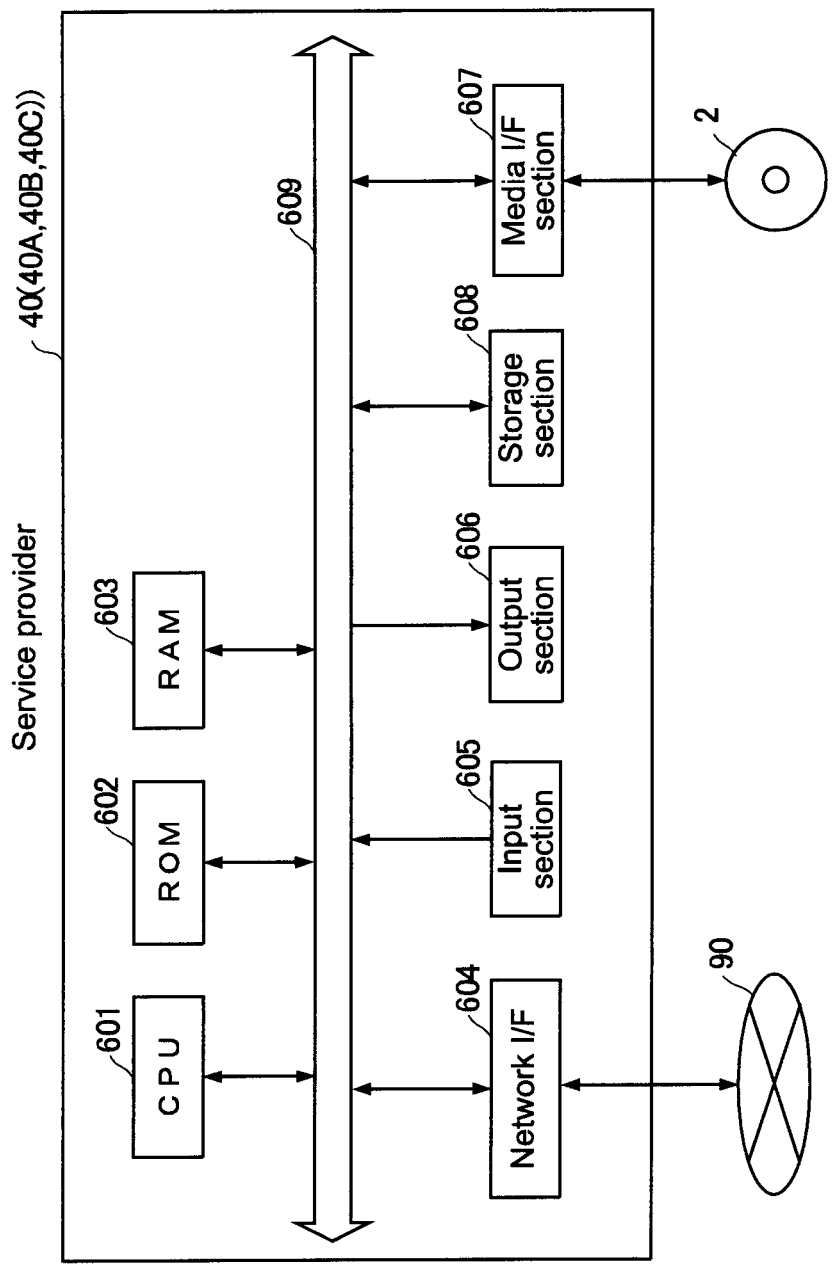
[FIG. 26] A diagram showing a hardware structure for realizing the service provider.
Figure 27:
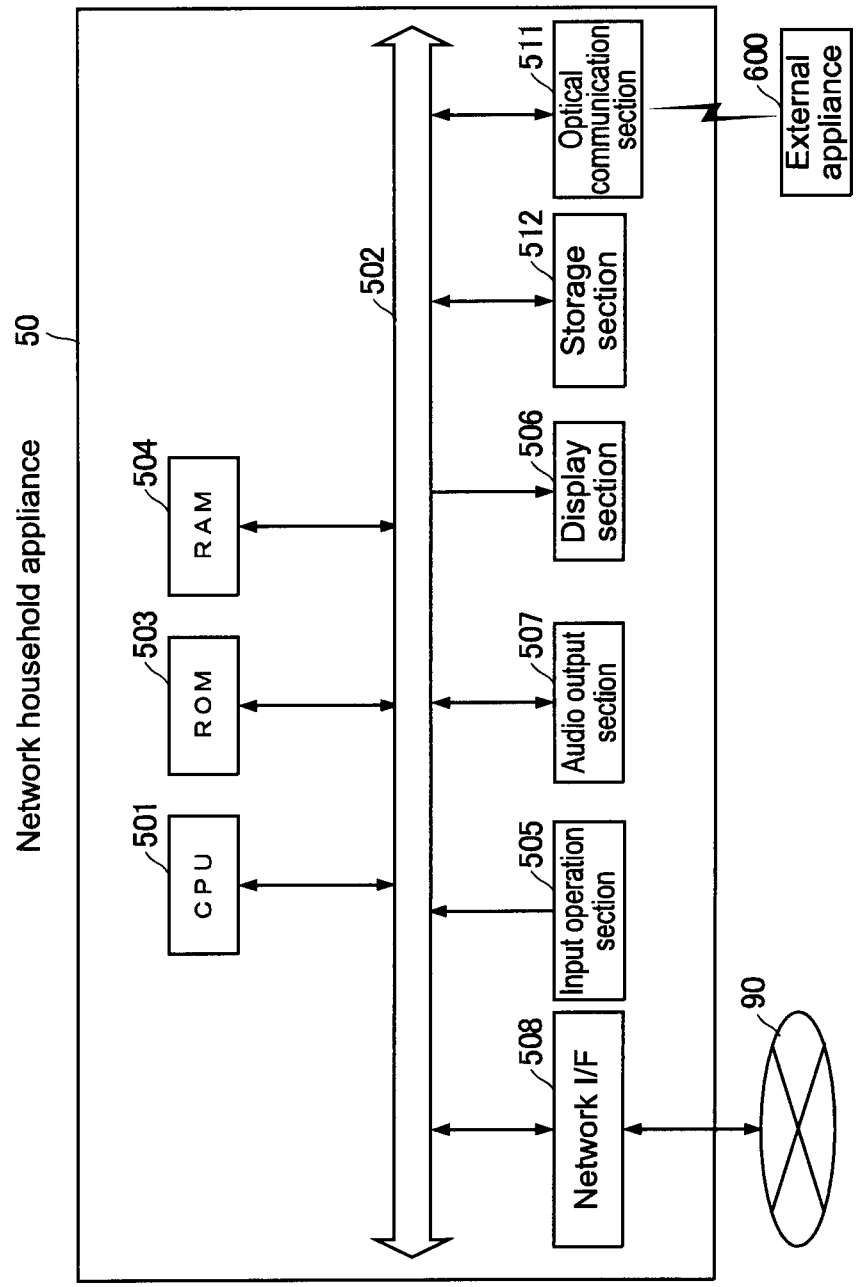
[FIG. 27] A block diagram showing a hardware structure of a network household appliance in which the subscriber or the service client is implemented.
Figure 28:
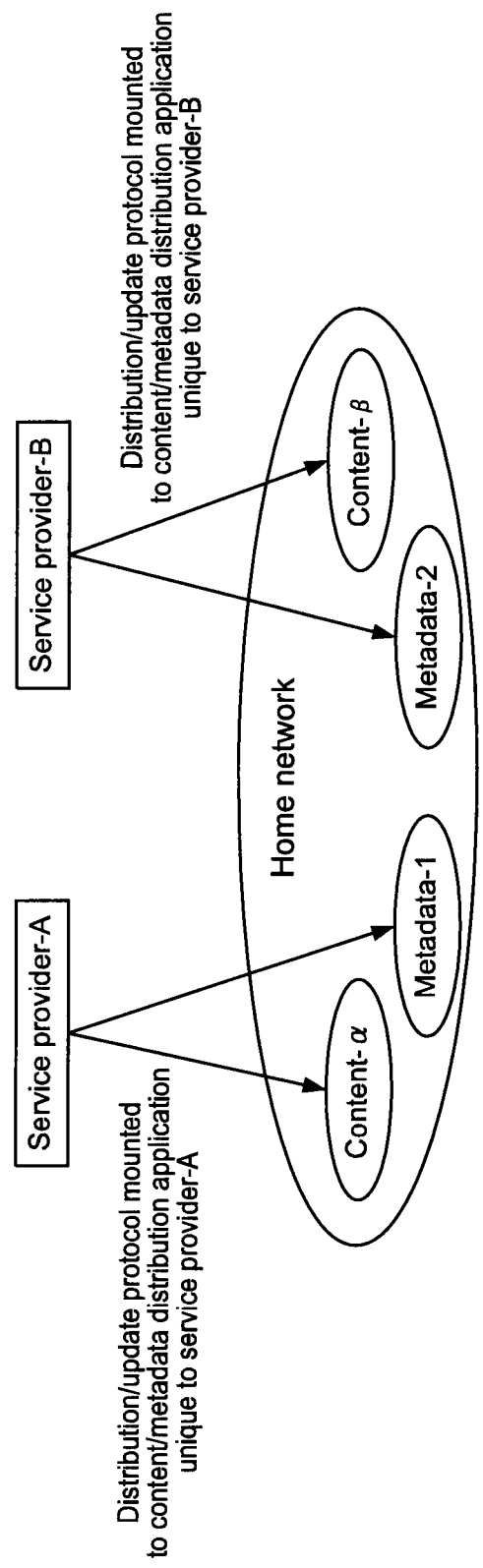
[FIG. 28] A diagram related to problems on unconformity in content/metadata synchronous management.
Figure 29:
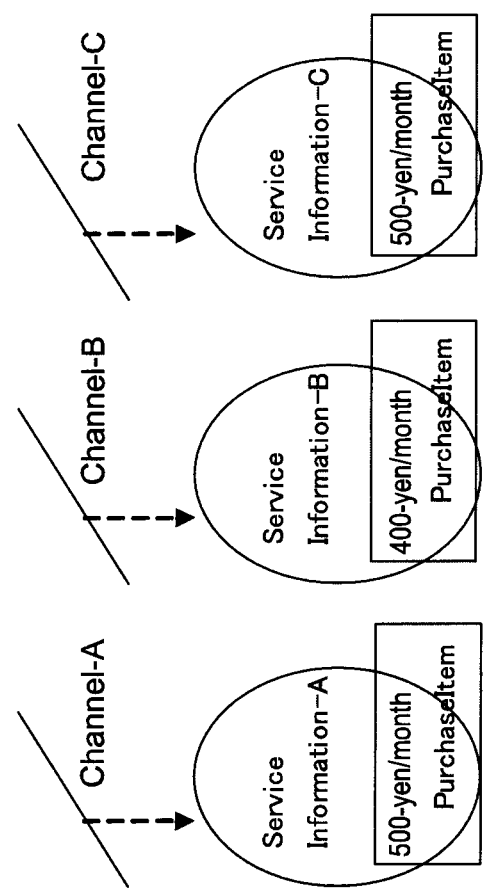
[FIG. 29] An example of ServiceInformation metadata in which information on a broadcast channel service is described as a fragment of TV-Anytime metadata.
Figure 30:
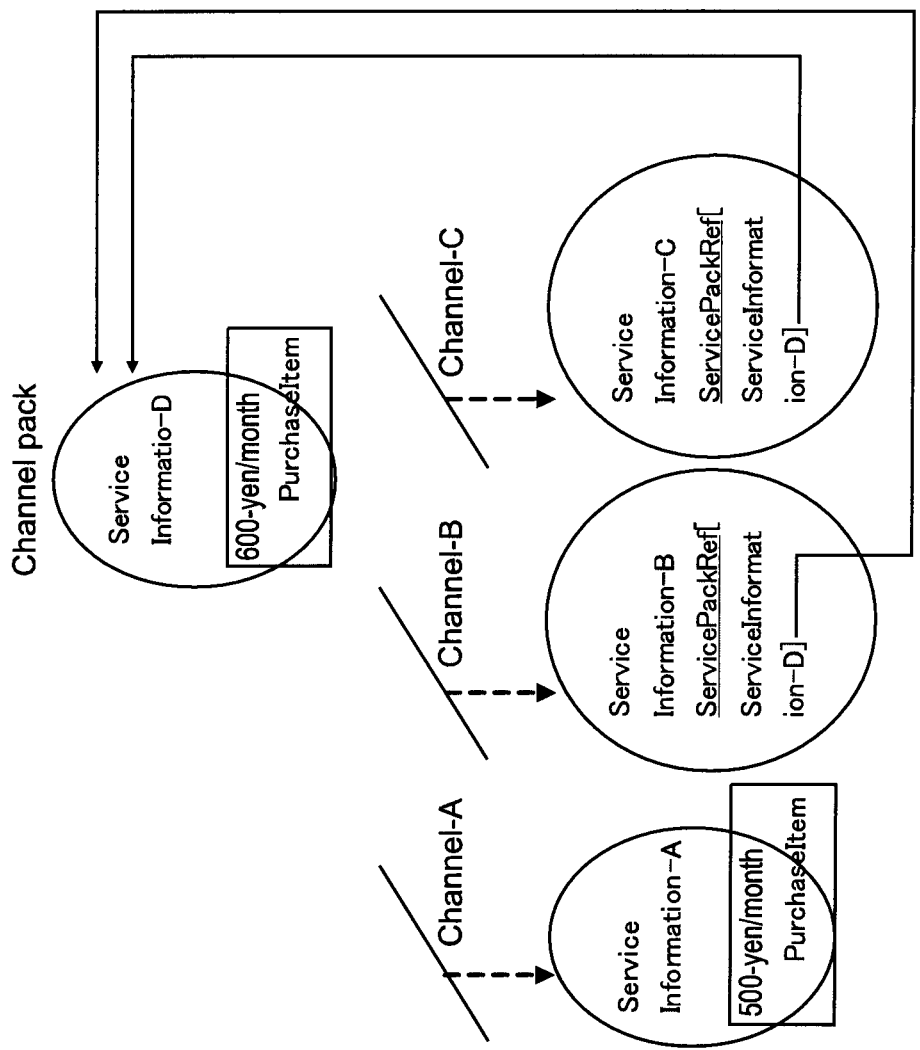
[FIG. 30] An example of ServiceInformation metadata in a case where a plurality of broadcast channels are put together as one and a price is changed.
Figure 31:
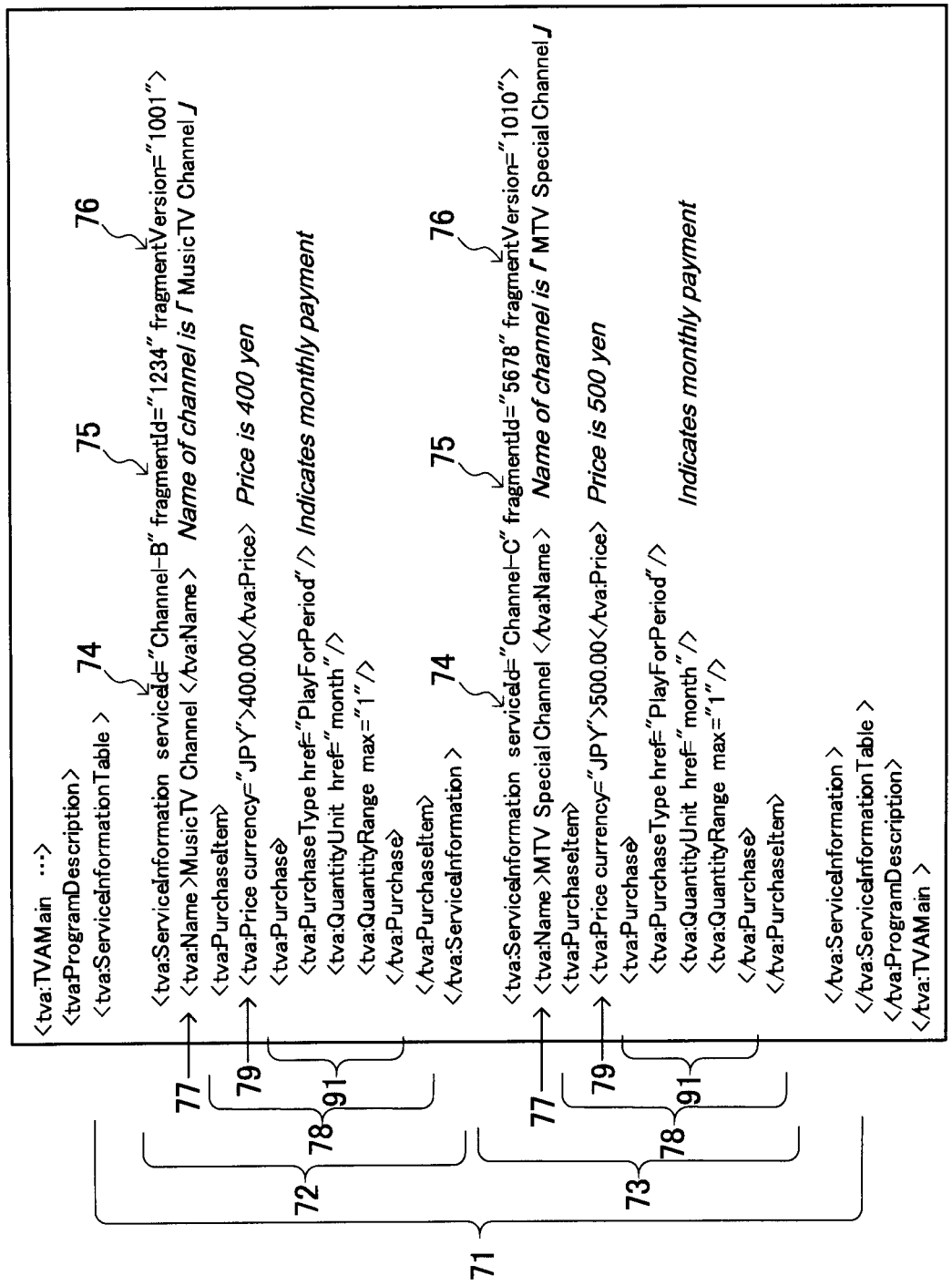
[FIG. 31] A diagram showing an example of ServiceInformation metadata before update.
Figure 33:
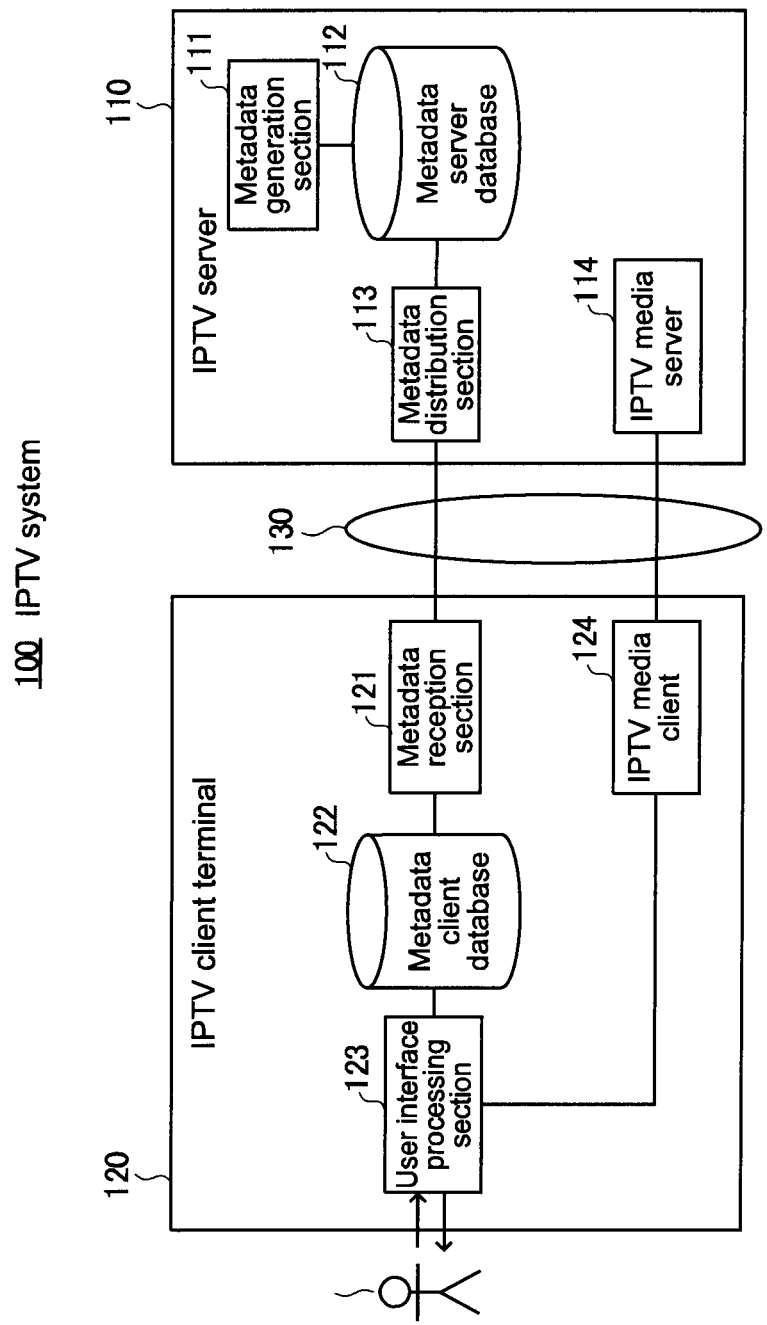
[FIG. 33] A diagram showing a structure of an IPTV system according to a second embodiment.
Figure 34:
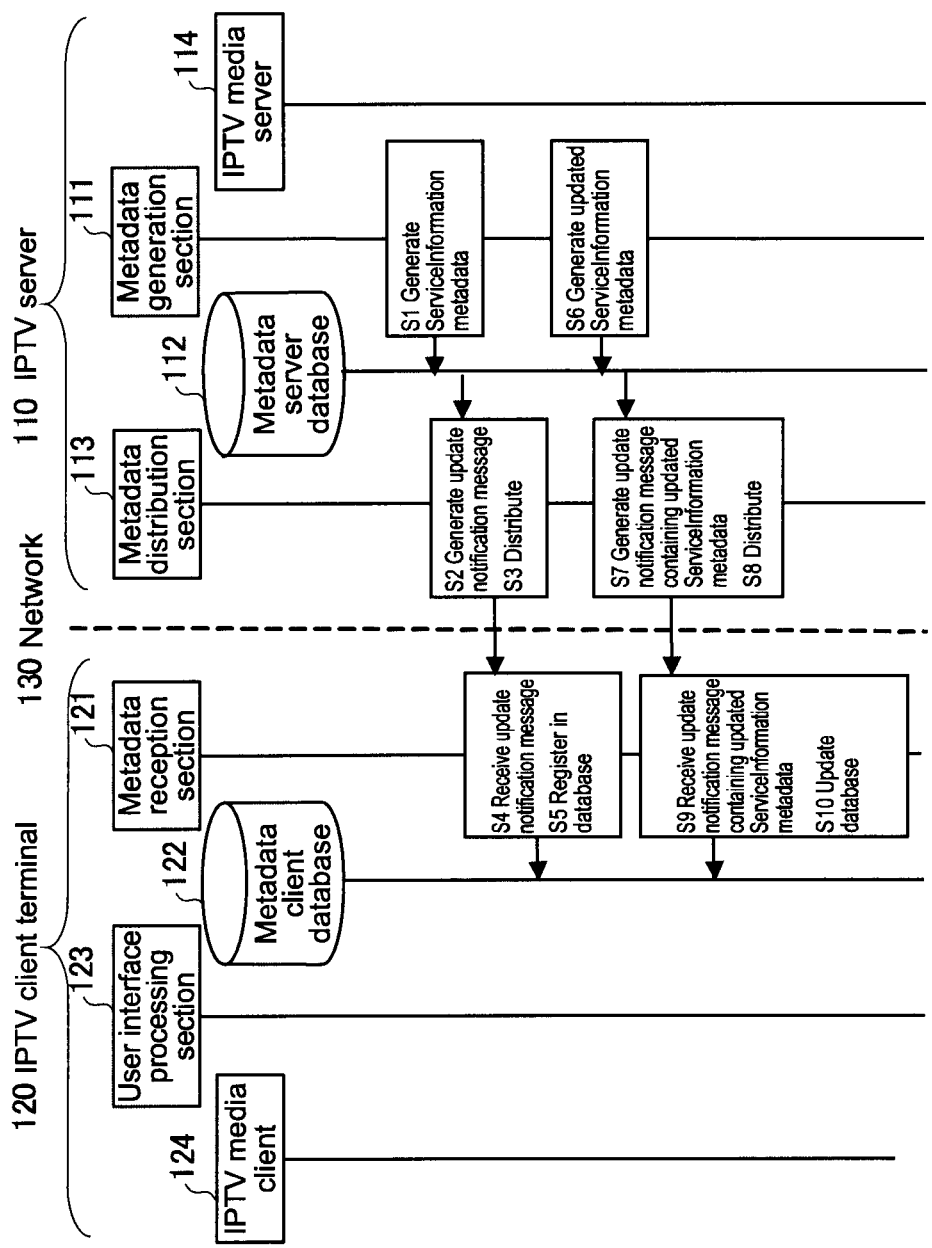
[FIG. 34] A sequence diagram showing processing of distributing ServiceInformation metadata from an IPTV server to an IPTV client terminal and updating it in the IPTV system of the second embodiment.
Figure 35:
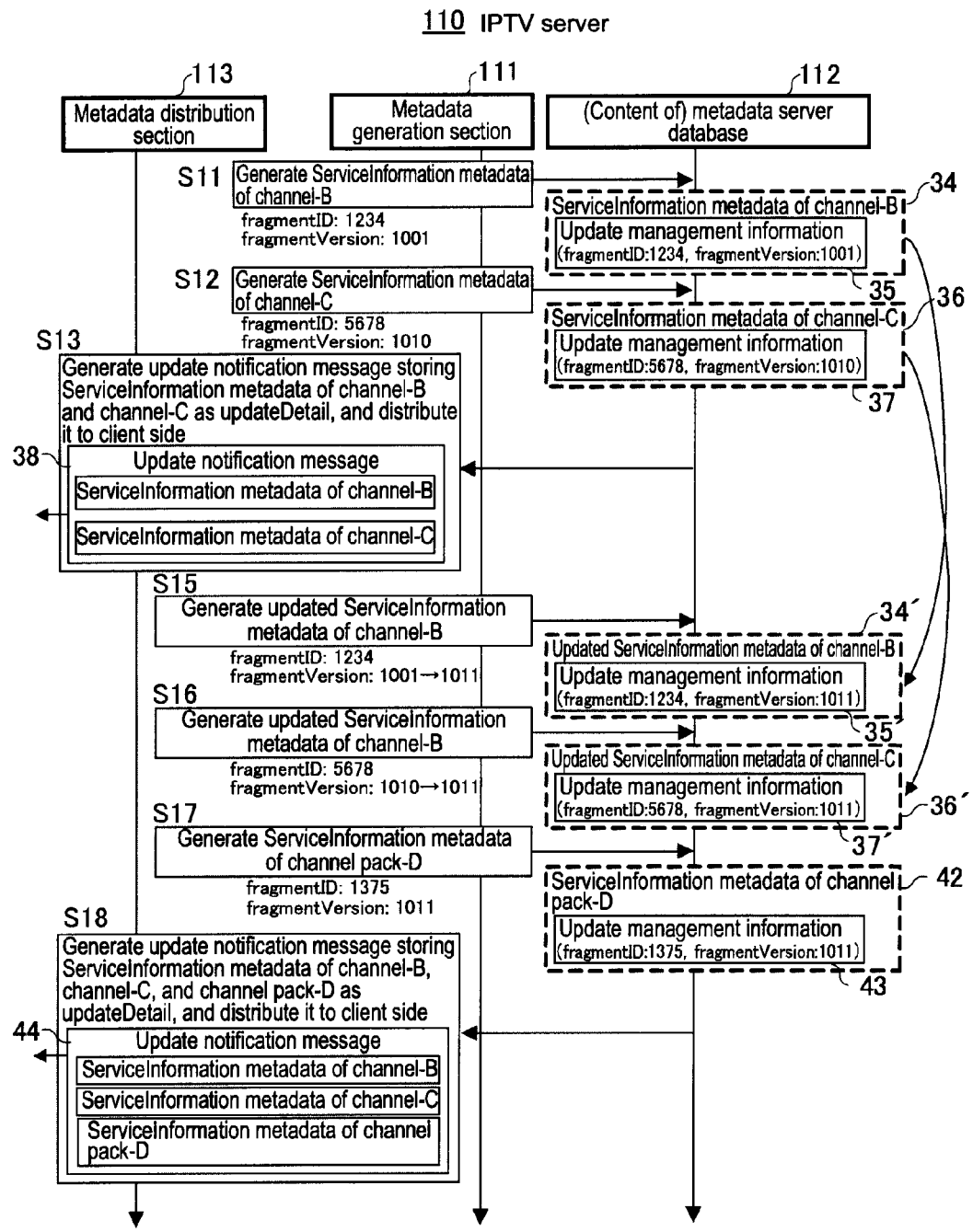
[FIG. 35] A sequence diagram showing a specific example of the processing of the IPTV server in FIG. 34.
Figure 36:
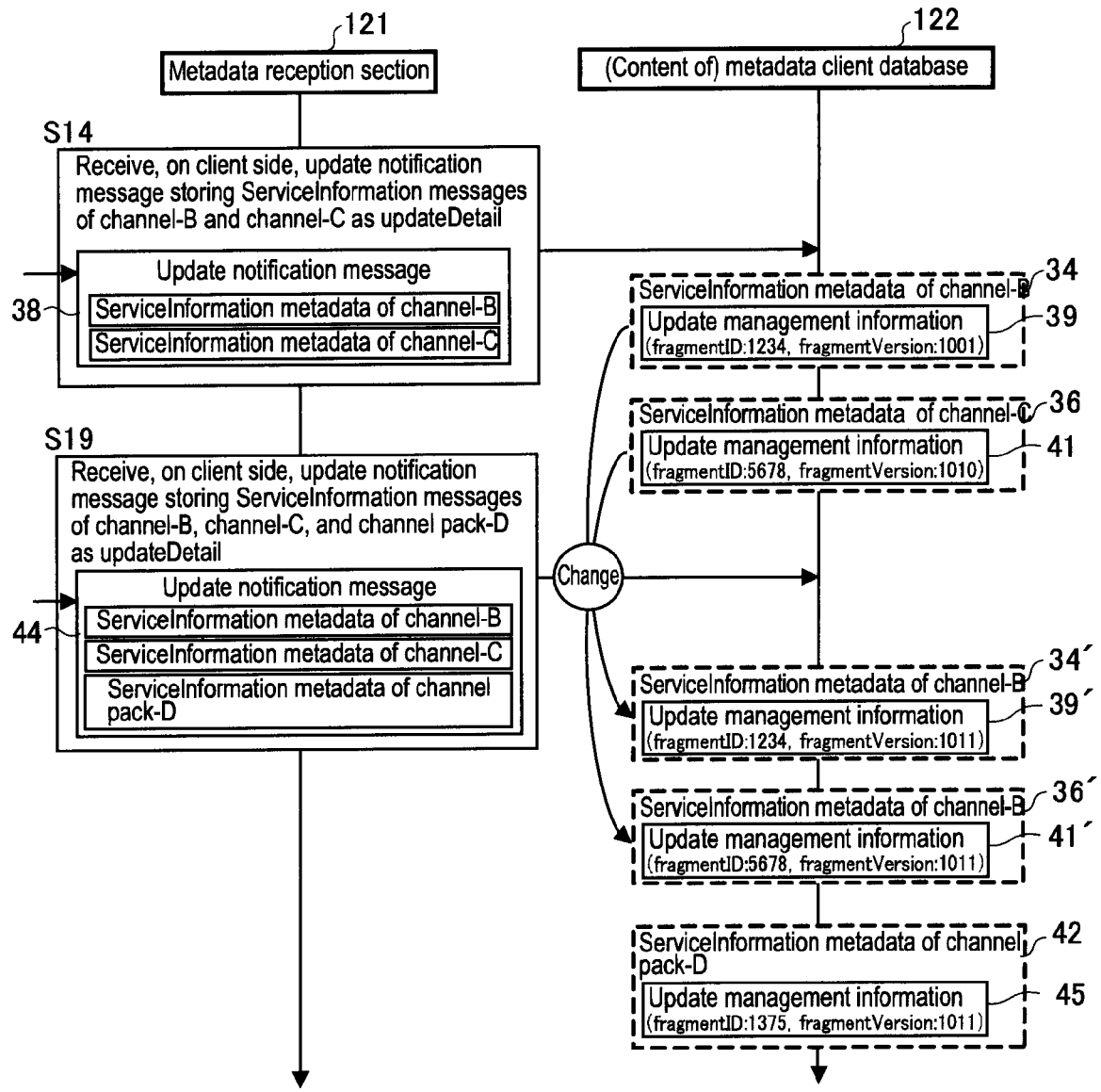
[FIG. 36] A sequence diagram showing a specific example of the processing of the IPTV client terminal in FIG. 34.
Figure 37:
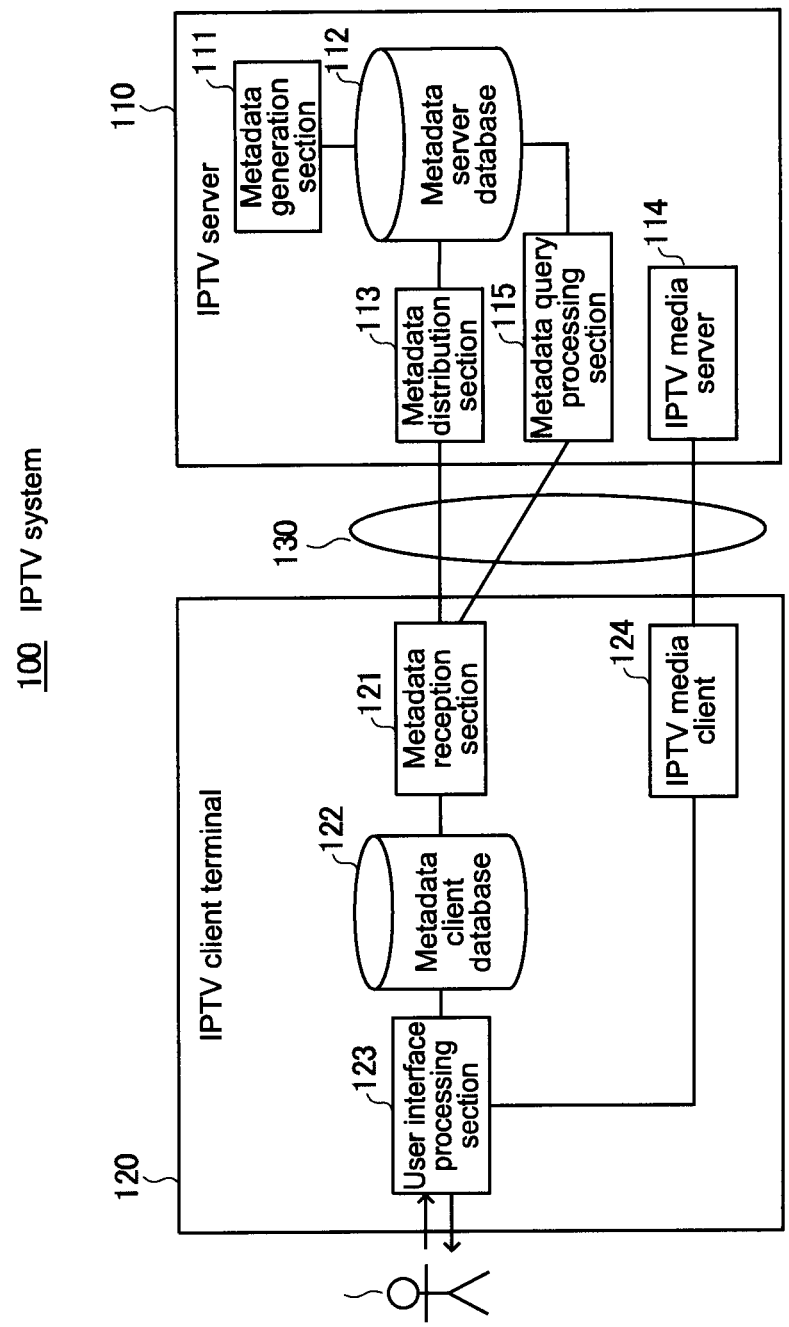
[FIG. 37] A diagram showing a structure of an IPTV system according to a third embodiment.
Figure 38:
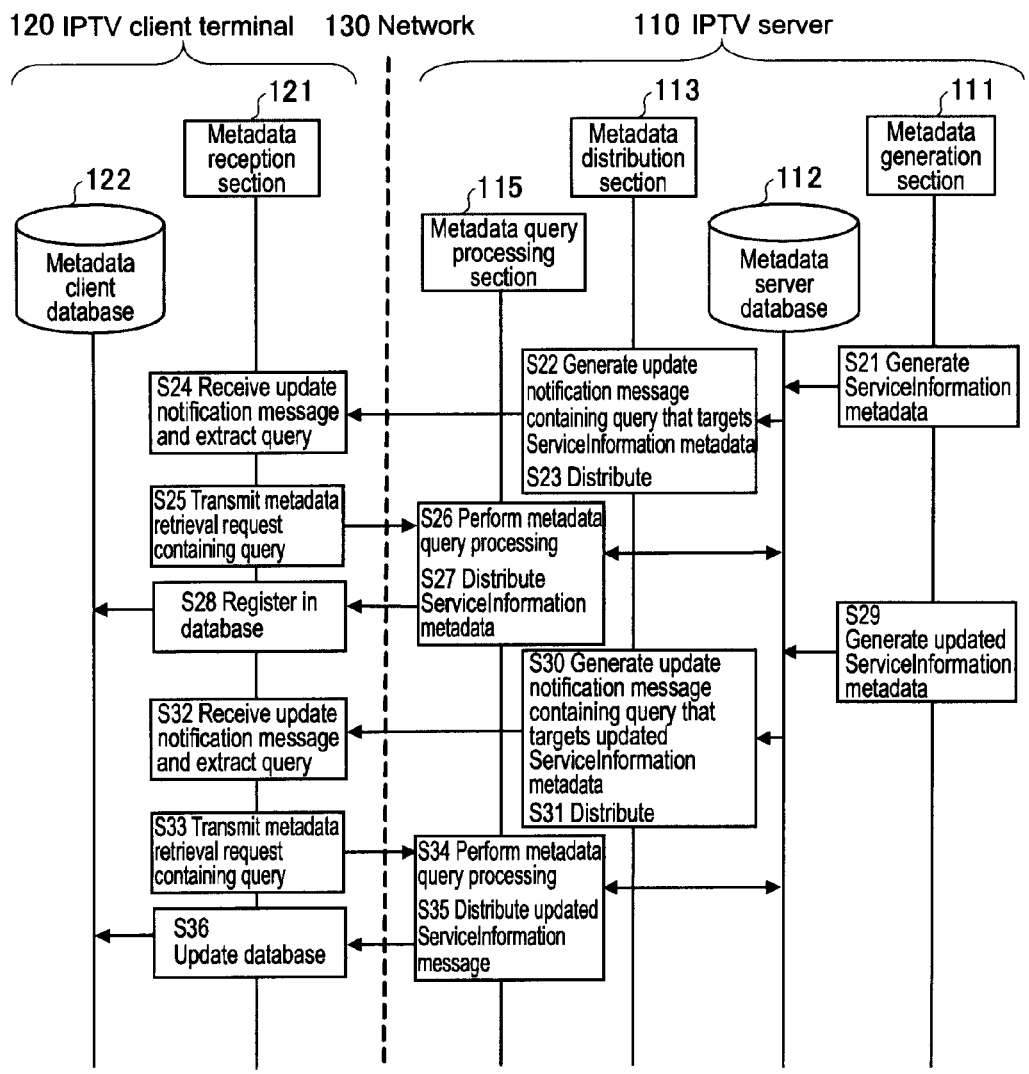
[FIG. 38] A sequence diagram showing processing of distributing ServiceInformation metadata from an IPTV server to an IPTV client terminal and updating it in the IPTV system of the third embodiment.
Figure 39:
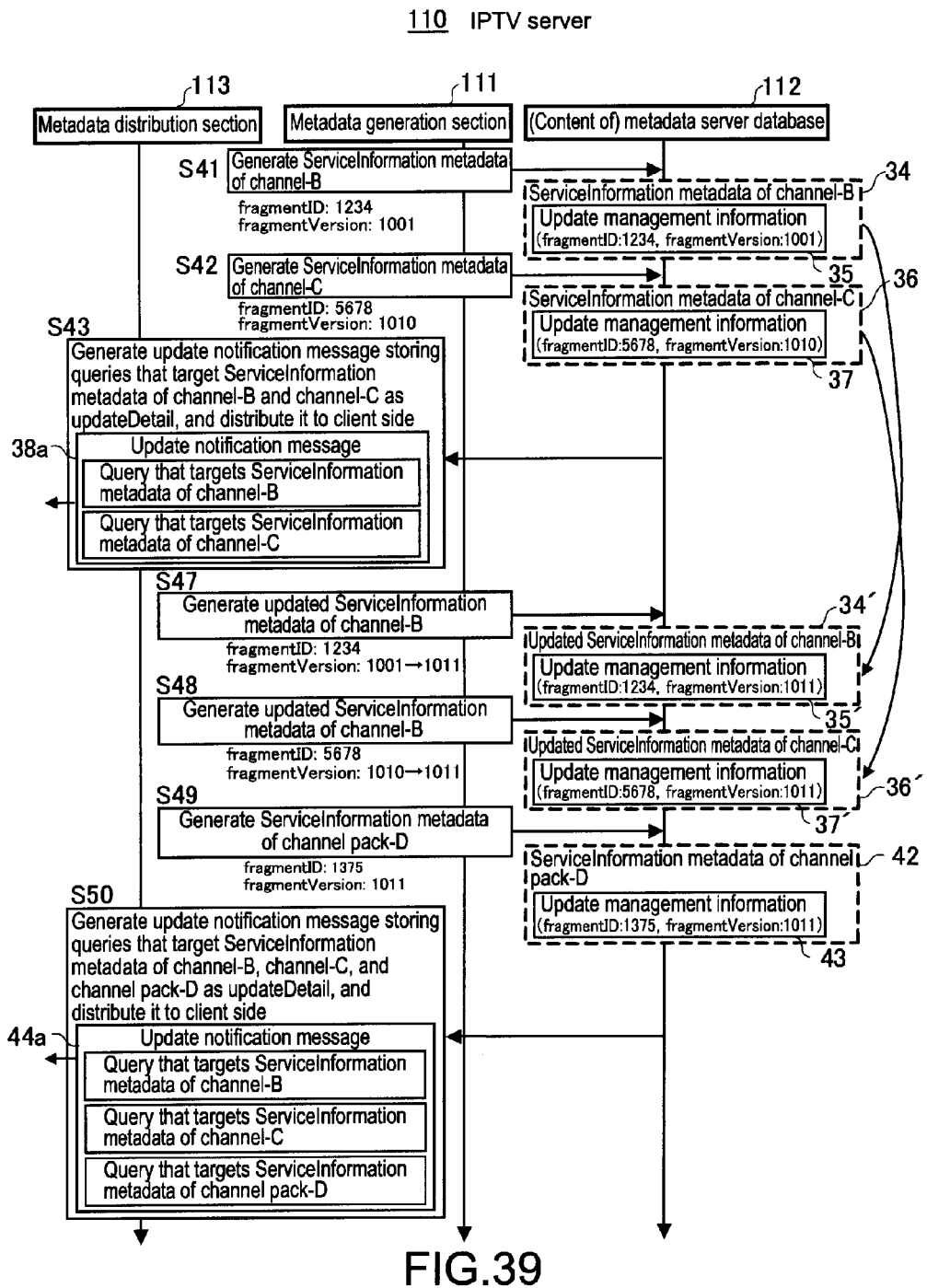
[FIG. 39] A sequence diagram showing a specific example of the processing of the IPTV server in FIG. 38.
Figure 40:
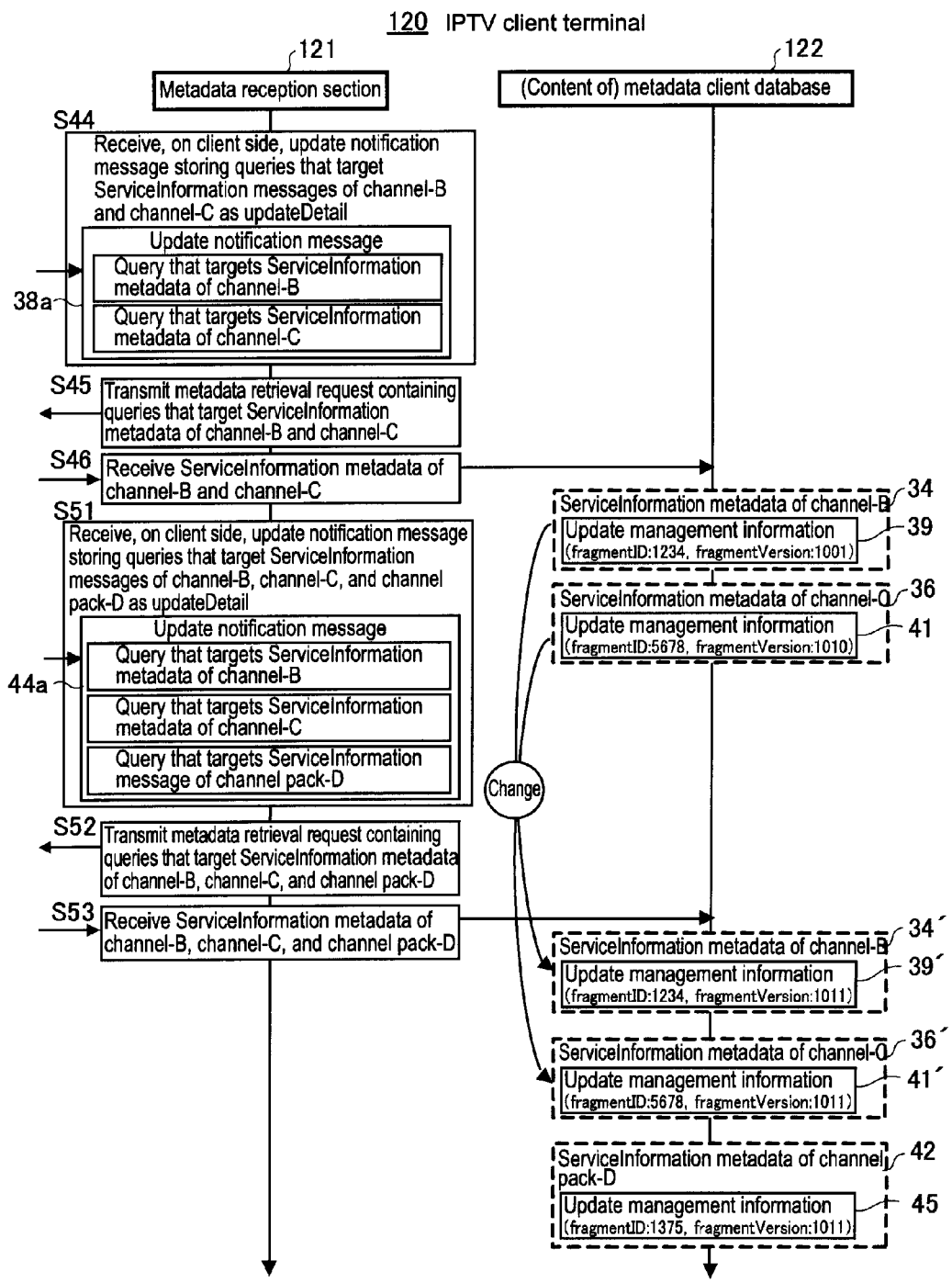
[FIG. 40] A sequence diagram showing a specific example of the processing of the IPTV client terminal in FIG. 38.
Figure 41:
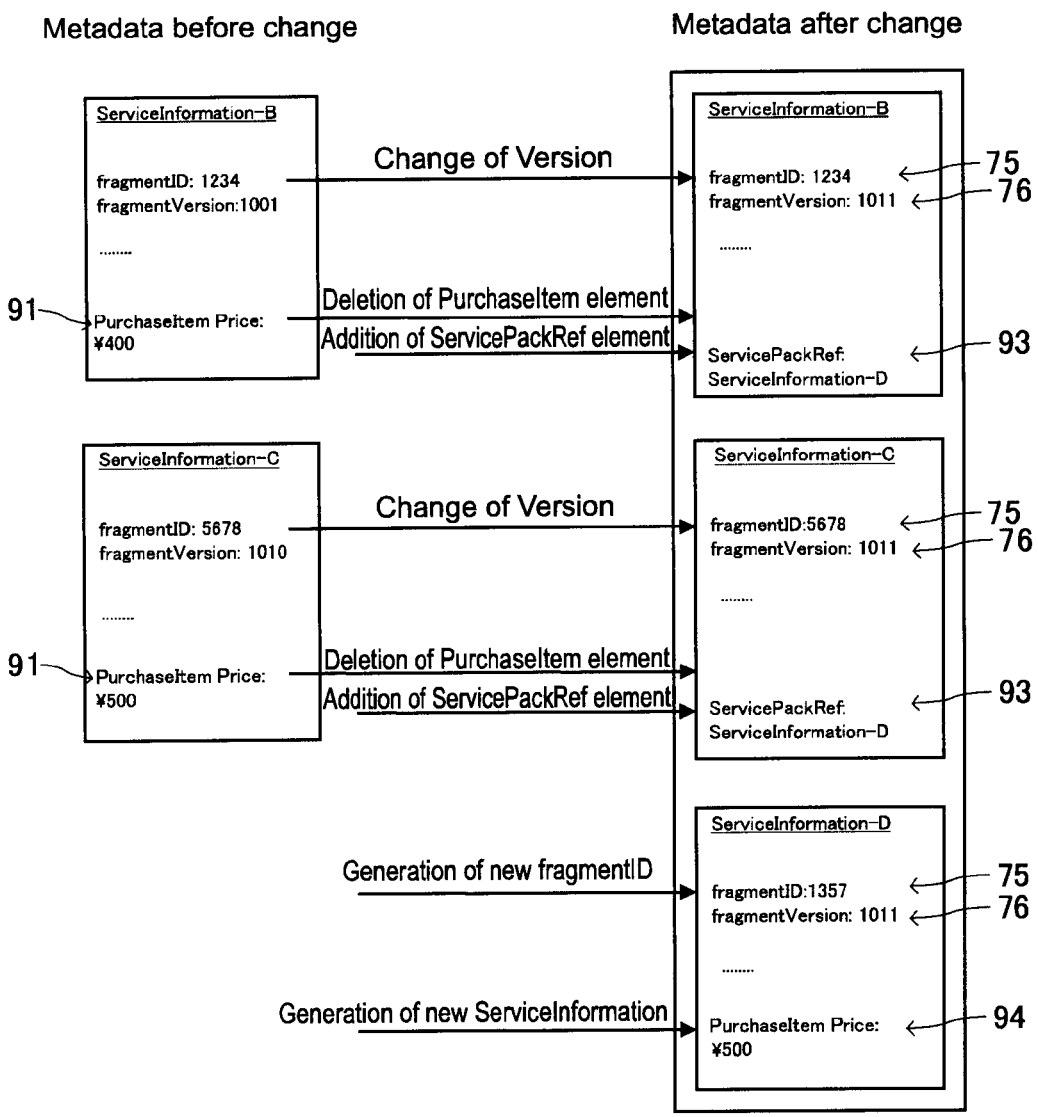
[FIG. 41] A diagram for explaining update processing of the
ServiceInformation metadata shown in FIG. 30.
Figure 42:
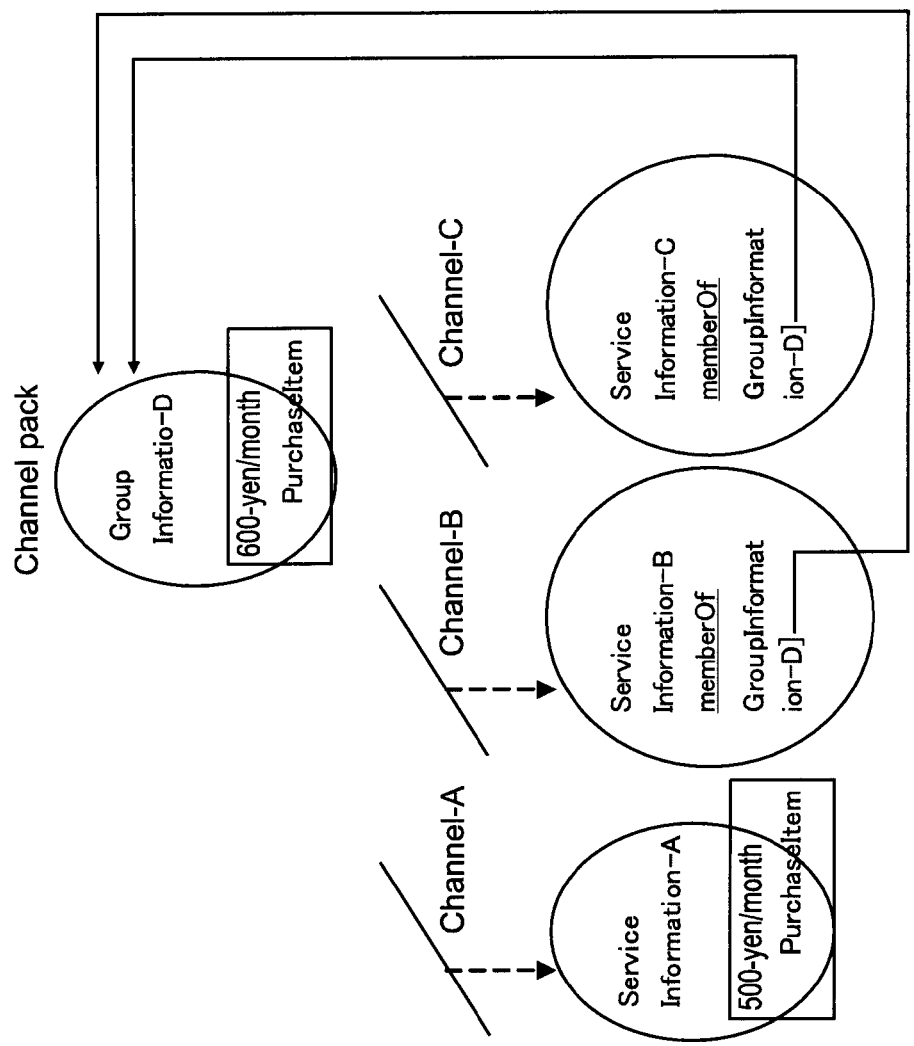
[FIG. 42] A diagram showing an example of ServiceInformation metadata in a case where a channel pack structure is replaced by Groupinformation metadata.
Figure 43:
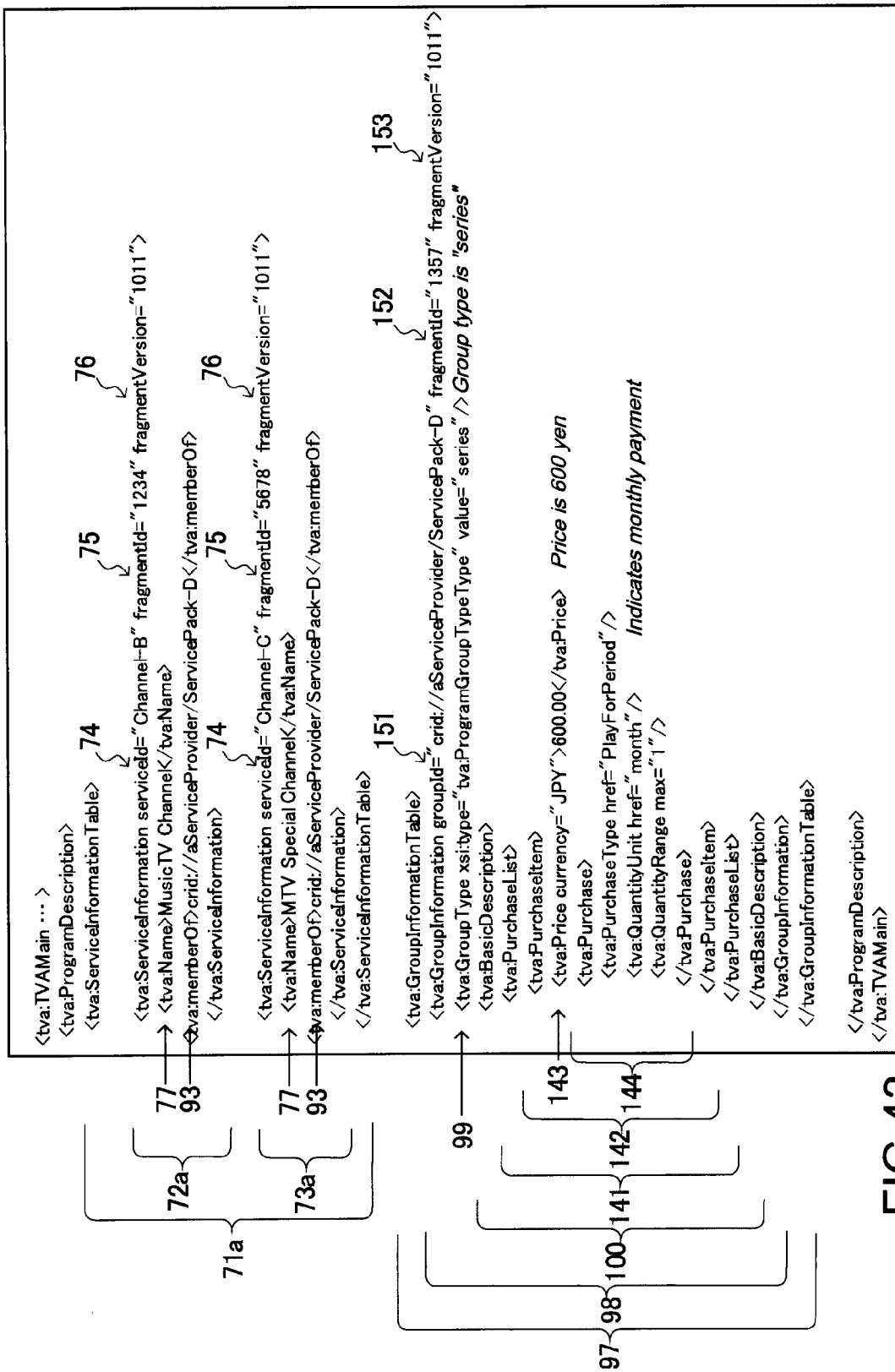
[FIG. 43] A diagram showing a specific example in a case where metadata equivalent to that of FIG. 32 is described using the Groupinformation metadata.
Figure 44:
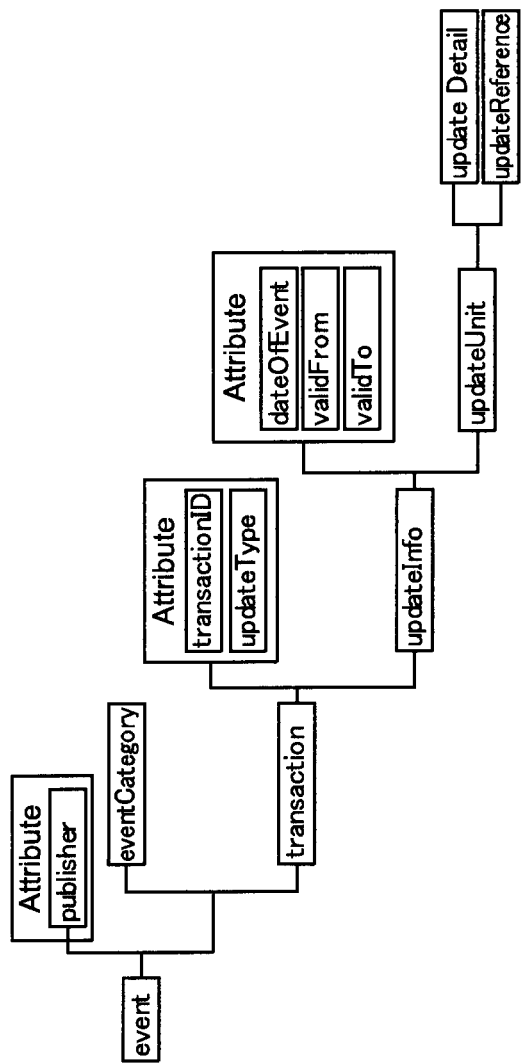
[FIG. 44] A diagram showing a data structure of the update notification message.

DESCRIPTION OF SYMBOLS 1 update notification message
10A, 10B, 10C publisher
11 content/metadata management server
12 content/metadata management server
13 update notification generator
20A, 20B, 20C queue/channel
21 filter manager
22 update notification message database
23 SNS category aggregator
24 message distribution server
25 database synchronous information provision server
30 subscriber
31 message distribution client
32 residential message database
33 residential message distribution server
40A, 40B, 40C service provider
50 home-network-side appliance
60a, 60b, 60c service client
61a, 61b, 61c local content/metadata database
70 home network
80 SNS site
90 network
100 network system
110 game device
120 cellular phone

The invention claimed is:

1. A network system, comprising:
one or more computers to function as:
an update notification message generator for generating, for each of a plurality of services, an update notification message that stores update information of a content or metadata of the content, or a reference to the update information;
a filter attribute setting unit for setting, in the update notification message for each service delivered from the update notification message generator, a filter attribute for categorizing the message;
an update notification message accumulation unit to accumulate the update notification message in which the filter attribute has been set by the filter attribute setting unit;
a local content/metadata storage unit in a home network appliance that stores a content of a specific service or metadata thereof;
an update unit including an application corresponding to the specific service, for updating the content or the metadata in the local content/metadata storage unit using the update information; and
an update information provision unit for managing in advance a correspondence between the application and the filter attribute, specifying, based on the filter attribute set in the update notification message acquired from the update notification message accumulation unit via a network and the correspondence, an application that provides the update information within the update notification message, and providing the update information by activating the application,
wherein the update notification message generator generates, as the update information, full-update information as a full-update content of the content or the metadata and differential-update information as an update content of only a differential update while periodically switching them, and setting, in the update notification message, attribute information that indicates an update method of the update information of each update notification message, and
wherein the update information provision unit acquires, from the update notification message accumulation unit via the network, based on the attribute information set in the update notification message accumulated in the update notification message accumulation unit, the update notification message necessary for synchronizing the content or the metadata in the local content/metadata storage unit with the content or the metadata on a side of a provider of the service.

2. The network system according to claim 1,
wherein the filter attribute includes information for specifying the service.

3. The network system according to claim 1,
wherein the filter attribute includes information for specifying a category of the content.

4. The network system according to claim 1,
wherein the update notification message stores, as the update information, the update information of the content or the metadata,
the network system further comprising:
a second update notification message accumulation unit to accumulate the update notification message acquired from the update notification message accumulation unit by the update information provision unit via the network, wherein the update information provision unit acquires, from the second update notification message accumulation unit, the update notification message necessary for synchronizing the content or the metadata in the local content/metadata storage unit with the content or the metadata on a side of a provider of the service.

5. A content/metadata synchronous processing method, implemented by one or more computers, comprising the steps of:
generating, by the one or more computers functioning as an update notification message generator, for each of a plurality of services, an update notification message that stores update information of a content or metadata of the content, or a reference to the update information;
setting, by the one or more computers functioning as a filter attribute setting unit, in the update notification message for each service delivered from the update notification message generator, a filter attribute for categorizing the message;
accumulating, in an update notification message accumulation unit, the update notification message in which the filter attribute has been set;
updating, using the update information, the content or the metadata in a local content/metadata storage unit in a home network appliance that stores a content or metadata of a specific service, by an update unit including an application corresponding to the specific service;
managing in advance, by the one or more computers functioning as an update information provision unit, a correspondence between the application and the filter attribute, specifying, based on the filter attribute set in the update notification message acquired from the update notification message accumulation unit via a network and the correspondence, an application that provides the update information within the update notification message, and providing the update information by activating the application;
generating, by the update notification message generator, as the update information, full-update information as a full-update content of the content or the metadata and differential-update information as an update content of only a differential update while periodically switching them, and setting, in the update notification message, attribute information that indicates an update method of the update information of each update notification message, and
acquiring, by the update information provision unit, from the update notification message accumulation unit via the network, based on the attribute information set in the update notification message accumulated in the update notification message accumulation unit, the update notification message necessary for synchronizing the content or the metadata in the local content/metadata storage unit with the content or the metadata on a side of a provider of the service.

6. The network system according to claim 1,
wherein the update information of the metadata includes information on an update with an element of the metadata as a unit.

7. The network system according to claim 1,
wherein the update information of the metadata includes metadata in a fragment unit.

8. The network system according to claim 7,
wherein the metadata in the fragment unit includes ServiceInformation metadata of TV-Anytime and includes high-order fragment metadata and low-order fragment metadata having hierarchy, the low-order fragment metadata containing an element for defining a reference to the high-order fragment metadata.

* * * * *